US012680923B2

(12) United States Patent
Shah et al.

(10) Patent No.: US 12,680,923 B2
(45) Date of Patent: Jul. 14, 2026

(54) AUTOMATED STAINING SYSTEM AND REACTION CHAMBER

(71) Applicant: Sakura Finetek U.S.A., Inc., Torrance, CA (US)

(72) Inventors: Amit D. Shah, Redondo Beach, CA (US); Scott Webster, Redondo Beach, CA (US); Cristina R. Flores, Downey, CA (US); Chen Yu Cheng, Hsinchu City (TW); Chia Hsien Lin, Kaohsiung City (TW); Chih Shun Chuang, Hsinchu City (TW); Nicholas John Booker, Box Hill (AU); Andrew Douglas Watkins, Fairfield (AU); Rebecca Jean Bartel, Mont Albert North (AU); Chester John Henderson, Preston (AU); Erico Von Bueren, Lomita, CA (US); Hwai-Jyh Michael Yang, Cerritos, CA (US)

(73) Assignee: SAKURA FINETEK U.S.A., INC., Torrance, CA (US)

(*) Notice: Subject to any disclaimer, the term of this patent is extended or adjusted under 35 U.S.C. 154(b) by 1001 days.

(21) Appl. No.: 17/790,040

(22) PCT Filed: Dec. 31, 2020

(86) PCT No.: PCT/US2020/067754
§ 371 (c)(1),
(2) Date: Jun. 29, 2022

(87) PCT Pub. No.: WO2021/138617
PCT Pub. Date: Jul. 8, 2021

(65) Prior Publication Data
US 2023/0055997 A1    Feb. 23, 2023

Related U.S. Application Data

(60) Provisional application No. 62/956,015, filed on Dec. 31, 2019.

(51) Int. Cl.
*G01N 1/31* (2006.01)
*G01N 35/00* (2006.01)
*G01N 35/04* (2006.01)

(52) U.S. Cl.
CPC ......... *G01N 1/312* (2013.01); *G01N 35/0099* (2013.01); *G01N 2001/315* (2013.01);
(Continued)

(58) Field of Classification Search
CPC .............. G01N 1/312; G01N 35/0099; G01N 2001/315; G01N 2035/00138;
(Continued)

(56) References Cited

U.S. PATENT DOCUMENTS

| | | |
|---|---|---|
| 5,767,882 A | 6/1998 | Kaplinsky et al. |
| 5,852,458 A | 12/1998 | Scheffelin et al. |

(Continued)

FOREIGN PATENT DOCUMENTS

| | | |
|---|---|---|
| CN | 101228429 A | 7/2008 |
| CN | 102770746 A | 11/2012 |

(Continued)

OTHER PUBLICATIONS

Sakura Finetek U.S.A., Inc., Related Application, Int'l PCT Application No. PCT/US2020/67754, Int'l Search Report and Written Opinion, Date: May 3, 2021.

(Continued)

*Primary Examiner* — Charles Capozzi
*Assistant Examiner* — Michael Stanley Gzybowski
(74) *Attorney, Agent, or Firm* — William Thomas Babbitt, Esq.

(57) ABSTRACT

A processor assembly including: an exposure station operable to expose a sample on a slide; a print station operable to apply a reagent to the exposed sample through a thermal inkjet process; and a robotic transfer mechanism to transfer
(Continued)

the slide from the exposure station to the print station. Also, a reagent cartridge including: a body defining a container having a volume therein; a nonmetallic bag in the container operable to contain a reagent; and a printhead at a base of the body, the printhead coupled to an outlet of the bag. Further, a method including exposing a sample on a slide in a processor assembly; robotically transferring the slide to a printing station of the processor assembly; and applying a reagent to the exposed sample at the printing station by a thermal inkjet printing process.

16 Claims, 25 Drawing Sheets

(52) U.S. Cl.
CPC .............. *G01N 2035/00138* (2013.01); *G01N 2035/00752* (2013.01); *G01N 2035/0401* (2013.01); *G01N 2035/0405* (2013.01)

(58) Field of Classification Search
CPC . G01N 2035/00752; G01N 2035/0401; G01N 2035/0405; G01N 2035/0413; G01N 2035/0427; B41J 2/17513; B41J 2/1752; B41J 29/02; B41J 29/38; B01L 9/52; B01L 2200/04; B01L 2200/16; B01L 2200/18; B01L 2300/021; B01L 2300/0822

See application file for complete search history.

(56) References Cited

U.S. PATENT DOCUMENTS

| | | | | |
|---|---|---|---|---|
| 10,241,124 | B2 * | 3/2019 | Augstein ........... | B01L 3/502715 |
| 2005/0186114 | A1 | 8/2005 | Reinhardt et al. | |
| 2009/0047184 | A1 | 2/2009 | Takeuchi | |
| 2009/0155841 | A1 | 6/2009 | Yamasaki | |
| 2010/0030364 | A1 | 2/2010 | Fujimoto et al. | |
| 2010/0304989 | A1 * | 12/2010 | Von Hoff .............. | G16H 50/20 |
| | | | | 506/9 |
| 2012/0163680 | A1 | 6/2012 | Lefebvre | |
| 2013/0073941 | A1 | 3/2013 | Evans et al. | |
| 2013/0224088 | A1 | 8/2013 | Britz | |
| 2014/0273088 | A1 | 9/2014 | Winther | |
| 2014/0329270 | A1 * | 11/2014 | Favaloro ................ | G01N 1/312 |
| | | | | 435/283.1 |
| 2016/0024583 | A1 | 1/2016 | Whitney et al. | |
| 2017/0089937 | A1 | 3/2017 | Lefebvre et al. | |
| 2018/0031588 | A1 | 2/2018 | Nakajima et al. | |
| 2018/0052082 | A1 | 2/2018 | Groll et al. | |
| 2018/0252623 | A1 * | 9/2018 | Dyson-Holland ... | G02B 21/362 |
| 2019/0023484 | A1 | 1/2019 | Shin | |
| 2019/0234843 | A1 | 8/2019 | Capps et al. | |
| 2019/0271618 | A1 | 9/2019 | Bui et al. | |

FOREIGN PATENT DOCUMENTS

| | | | |
|---|---|---|---|
| CN | 104053995 | A | 9/2014 |
| CN | 105793690 | A | 7/2016 |
| CN | 107533080 | A | 1/2018 |
| CN | 109844490 | A | 6/2019 |
| CN | 109890981 | A | 6/2019 |
| EP | 0913260 | A2 | 5/1999 |
| EP | 2969968 | A1 | 1/2016 |
| EP | 3534139 | A1 | 9/2019 |
| JP | H09218932 | A | 8/1997 |
| JP | H10-296992 | A | 11/1998 |
| JP | 2001242175 | A | 9/2001 |
| JP | 2009506300 | A | 2/2009 |
| JP | 2013-513782 | A | 4/2013 |
| JP | 2015500983 | A | 1/2015 |
| JP | 2018-517895 | A | 7/2018 |
| JP | 2019536010 | A | 12/2019 |
| WO | 2010/151760 | A2 | 12/2010 |
| WO | 2017193134 | A1 | 11/2017 |
| WO | 2018073283 | A1 | 4/2018 |
| WO | 2021138606 | A1 | 7/2021 |

OTHER PUBLICATIONS

Related Application, European Patent Application No. 20909992.8, Communication Pursuant To Rule 161(2) AND 162 EPC. Dated Aug. 9, 2022.
Related Application, European Patent Application No. 20909992.8, Communication Pursuant To Rule 164(1) EPC, Partial Supplemental European Search Report, Dated Dec. 7, 2023.
Related Application, Canadian Patent Appl. No. 3166395, Notice of Rejection, Dated Jul. 6, 2023.
Related Application, Canadian Patent Appl. No. 3166395, Notice of Rejection, Dated Dec. 6, 2023.
Related Application, Japanese Patent Application No. 2022-540667, Notice of Rejction, Dated Aug. 3, 2023.
Related Application, Japanese Patent Application No. 2022-540667, Notice of Rejection, Dated Jan. 22, 2024.
Related Application, Chinese Patent Application No. 202080097577. 2, Notice of Rejection, Dated Sep. 27, 2023.
Related Application, Chinese Patent Application No. 202080097577. 2, Notice of Second Rejection, Dated Apr. 28, 2024.
Related Application, Australian Patent Application No. 2020417834, Examination report No. 1, Dated May 25, 2023.
Related Application, Australian Patent Application No. 2024200066, Examination report No. 1, Dated Jan. 28, 2025.
Related Application, Japanese Patent Appl. No. 2022-540666, Notice of Reasons for Refusal, Dated: Jul. 21, 2023.
Related Application, Japanese Patent Appl. No. 2022-540666, Notice of Reasons for Refusal, Dated: Dec. 1, 2023.
Related Application, Canadian patent application No. 3166408, Canadian Examiner's Report, Dated: Dec. 12, 2023.
Related Application, Brazilian patent application No. BR112022012447-3, Preliminary Office Action, Dated: Mar. 26, 2024.
Related Application, Australian patent application No. 2020418169, Examination Report No. 1, Dated Jan. 16, 2024.
Related Application, European patent application No. 20909548.8-1001, Communication Pursuant to Article 94(3) EPC, Dated: Jul. 29, 2024.
Related Application, Chinese patent application No. 2020800914980, First Office Action, Dated: Oct. 31, 2023.
Related Application, Chinese patent application No. 2020800914980, Second Office Action, Dated: Jun. 28, 2024.
Related Application, Chinese patent application No. 2020800914980, Third Office Action, Dated: Aug. 15, 2024.
Sakura Finetek U.S.A., Inc., Related Application, Int'l PCT Application No. PCT/US2020/67736, Int'l Search Report and Writton Opinion, Date: May 3, 2021.
Related Application, European Patent Application No. 20909992-2001, Communication pursuant to Article 94(3) EPC, Dated: Feb. 10, 2025.
Related Application, Japanese Patent Application No. 2024-169859, Notice of Rejection, Dated: May 21, 2025.
Related Application, Japanese Patent Application No. 2024-169859, Notice of Rejection, Dated: Sep. 16, 2025.

* cited by examiner

AUTOMATED STAINING SYSTEM AND REACTION CHAMBER

CROSS-REFERENCE TO RELATED APPLICATIONS

The present application is a national stage of International Patent Application No. PCT/US20/67754, titled "Automated Staining System and Reaction Chamber," filed Dec. 31, 2020, which claims priority from U.S. Provisional Patent Application No. 62/956,015, filed Dec. 31, 2019, the contents of which are incorporated in this disclosure by reference in their entirety.

BACKGROUND

Field

An automated system for depositing reagents on biological specimens.

Background

In various settings, processing and testing of biological specimens is required for diagnostic purposes. Generally speaking, pathologists and other diagnosticians collect and study samples from patients, and utilize microscopic examination, and other devices to assess the samples at cellular levels. Numerous processing steps typically are involved in pathology and other diagnostic processes, including the collection of biological samples such as blood and tissue, preparing the samples, preparation of microscope slides, staining samples on microscope slides, examination, re-testing or re-staining, collecting additional samples, re-examination of the samples, and ultimately the offering of diagnostic findings.

Sample (e.g., tissue) staining processors or stainers can be operated with varying levels of automation to process human or animal tissue specimens for histology or pathology uses. Various types of chemical reagents can be used at various stages of tissue processing and various systems have been developed for delivering reagents to specimen containing slides. Examples of known reagent delivery systems include small quantity release dispensers, manual pouring into reagent vats, or via bulk containers connected with a stainer via tubing.

There are various disadvantages of known systems. For example, manually pouring into, or draining, reagent vats is susceptible to cross contamination, is time consuming and requires pouring accuracy, thereby decreasing the overall efficiency and accuracy of the tissue processing system. Another disadvantage is that manually pouring and draining reagents can be sloppy, requiring clean-up of spills and consequential instrument down-time. A further disadvantage is that manually selecting and applying the correct reagent introduces significant risk of human error and increased possibility of reagent selection errors and application errors resulting in false positive or negative assay results, leading not only to a decrease in test accuracy and operational efficiency but also misdiagnosis.

BRIEF DESCRIPTION OF THE DRAWINGS

The embodiments of the invention are illustrated by way of example and not by way of limitation in the figures of the accompanying drawings in which like references indicate similar elements. It should be noted that references to "an"

or "one" embodiment in this disclosure are not necessarily to the same embodiment, and such references mean at least one.

DETAILED DESCRIPTION

In the following paragraphs, the invention will be described in detail by way of example with reference to the accompanying drawings. Throughout this description, the embodiments and examples shown should be considered as exemplars, rather than as limitations on the present invention. Furthermore, reference to various aspects of the embodiments disclosed herein does not mean that all claimed embodiments or methods must include the referenced aspects.

Figure 1:
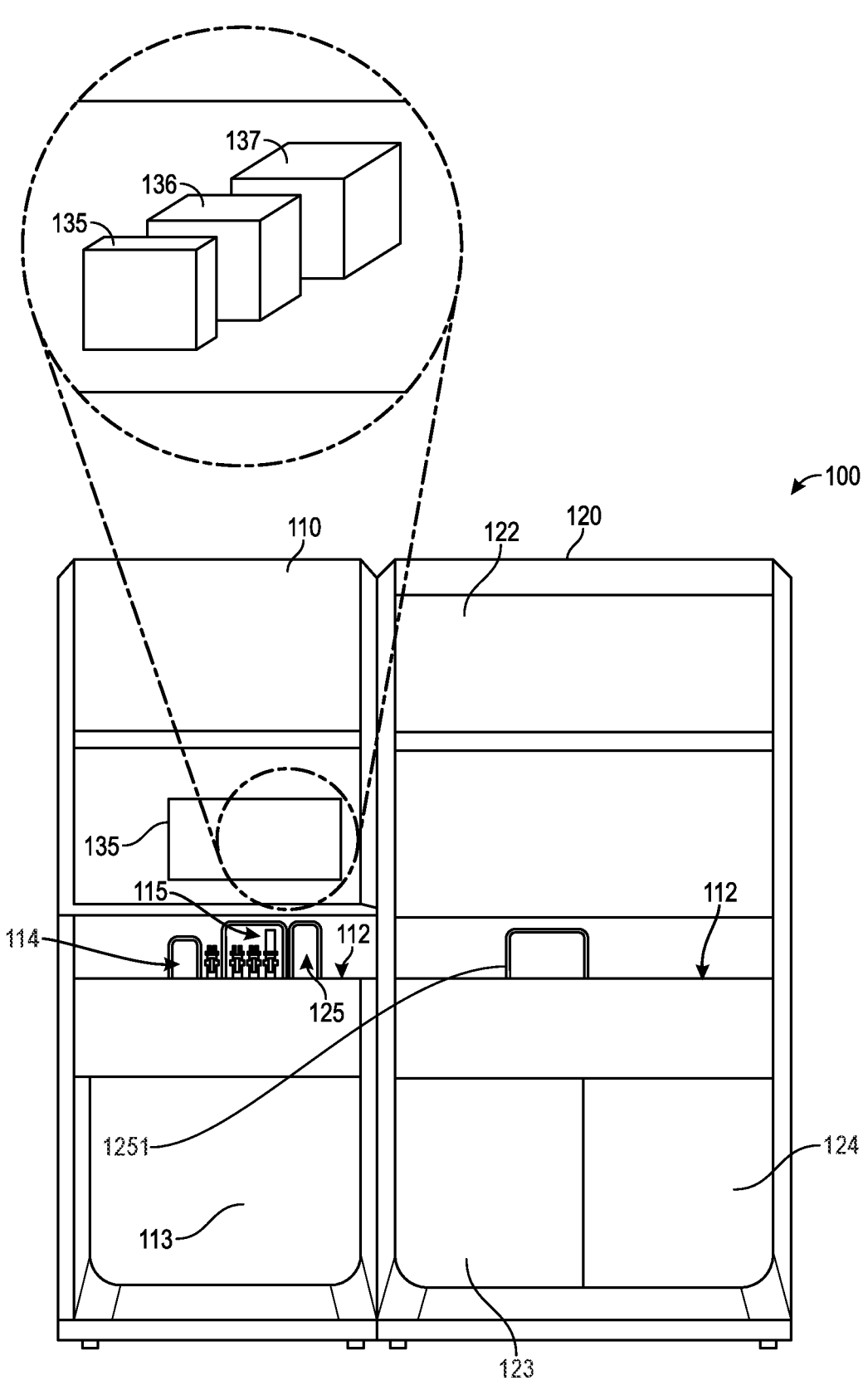
FIG. 1 illustrates a perspective view of a sample processing system also referred to as a processor assembly or processing assembly.

FIG. 1 illustrates a perspective view of a sample processing system also referred to as a processor assembly. Processing assembly 100 may be a modular assembly including core module 110 connected with and in communication with staining module 120. Alternatively, the modular assembly may include a module of each of a core sub-module (core module 110) and a staining sub-module (staining module 120). For clarity of discussion, the following description of processing assembly 100 will reference core module 110 and staining module 120 as if they are separate modules that come together to form processing assembly 100.

Core module 110 and staining module 120 each includes an external housing that contains interior compartments for enclosing and storing various components of processing assembly 100 to provide for the automatic processing of samples (biological samples (e.g., tissue samples)) on respective slides. Core module 110 may include areas including but not limited to components to sort slides into a desired processing order or processing collection, dewax and bake specimens (e.g., tissue samples) on slides from a microtomy unit and optionally dehydrate specimens (samples) on slides following printing of a reagent or reagents thereon. Staining module 120 may be, for example, an immunohistochemical staining unit. In general, immunohistochemical staining involves the process of selectively identifying antigens (e.g., proteins) in cells of a tissue section or cytology specimen by introducing antibodies that bind (e.g., specifically bind) to the antigens. Visualization of antibody-antigen interaction can be accomplished, for example, by conjugating antibodies or other staining reagents to an enzyme that can catalyze a color-producing reaction or a fluorophore that exhibits a fluorescence when viewed under appropriate illumination conditions. Staining module 120 may include an antigen retrieval station to expose antigens in a specimen, a printing station to deposit one or more reagents on specimens (samples) on slides, a reagent cabinet to store reagents when not in use in the printing station and optionally a coverslipper or coverslippers to apply a coverslip to a specimen on a slide.

Referring to FIG. 1, the front side exterior view of core module 110 of processing assembly 100 includes shelf or landing 112 on which one or more baskets of specimen or microscope slides may be disposed and loaded into core module 110 through inlet opening 115 and discharged from core module 110 through outlet opening 125. A specimen or microscope slide is generally a thin flat piece of glass typically 75 millimeters long (a length dimension) by 26 millimeters wide (a width dimension) (e.g., 3 inches long by 1 inch wide) and of about one millimeter in thickness (0.04 inches thick). Representatively, a slide basket may be a 10-slide or 20-slide TISSUE-TEK PRISMA® slide basket commercially available from Sakura Finetek USA, Inc. A length dimension of a specimen slide is longer than a height dimension of a TISSUE-TEK PRISMA® slide basket. When a slide or slides are disposed in a TISSUE-TEK PRISMA® slide basket, they are oriented lengthwise so that an end of a slide protrudes from a TISSUE-TEK PRISMA® slide basket. Each of inlet opening 115 and outlet opening 125 may be dimensioned to receive/discharge one slide basket at a time or multiple slide baskets at a time (e.g., three or four slide baskets). The front side exterior view of core module 110 also shows opening 114 adjacent inlet opening 115. Opening 114 is dimensioned to receive or discharge empty baskets therethrough. Accordingly, opening 114 may have a height dimension that is greater than a height dimension of an empty TISSUE-TEK PRISMA® slide basket, but less than a height dimension of a TISSUE-TEK PRISMA® slide basket with a slide or slides therein. By making the height dimension of opening less than a height of a TISSUE-TEK PRISMA® slide basket with a slide or slides therein, the risk of mistakenly placing a slide basket containing slides through opening 114 is reduced.

FIG. 1 shows core module 110 also includes interface 135 positioned on a front side of core module 110 above shelf 112. Interface 135 is a computer interface including, for example, a graphic user interface, that is electronically linked to a controller or processor associated with the operation of processing assembly 100. An inset of FIG. 1 shows controller or processor 136 connected to interface 135 and memory 137 coupled to processor or computer 136. Interface 135 may serve to allow operation and control of core module 110 and core module 120 of processing assembly 100 from a human end as well as may provide feedback information about the operations of core module 110 and core module 120. Below shelf 112 of core module 110 is drawer or door 113 that provides access to a bottom portion of the module where bulk reagents and waste may be stored. Processor 136 may be electrically or wirelessly linked to a network, such as laboratory information system (LIS) that records, manages and stores data for clinical laboratories.

FIG. 1 shows staining module 120 connected to core module 110 in a side-by-side arrangement. Staining module 120 includes shelf 112 and opening 1251 extending from shelf 112 that provides access to the staining module to deliver or discharge reagent cartridges (e.g., inkjet reagent cartridges). Above opening 1251 may be window or windows 122 providing visual access to the interior of staining module 120 (an interior compartment within which sample processing occurs). Window or windows 122 may be fixed to the body of the module so that the window(s) cannot be opened or may be fixed to the body in a way that the one or more windows may be opened (e.g., a hinged connection on one end or edge). Where window or windows 122 may be opened, window or windows 122 may be used to gain access to components within staining module 120. Below window or windows 122 and shelf 112 of staining module 120 is drawer or door 123 and drawer or door 124 that provide access to a bottom portion of the module where bulk reagents and waste containers may be stored. Bulk reagents may be dispensed into stations in core module 110 or staining module 120 via plumbing including a pump or pumps (not shown). Examples of bulk reagents that can be dispensed either alone or in combination with other bulk reagents include, without limitation, the following: Tris Buffered Saline (TBS), Saline Sodium Citrate (SSC), distilled water, dewaxing solution, alcohol or xylene. The pump or pumps may be connected to conduits that, for example, feed tanks in either module.

Figure 2:
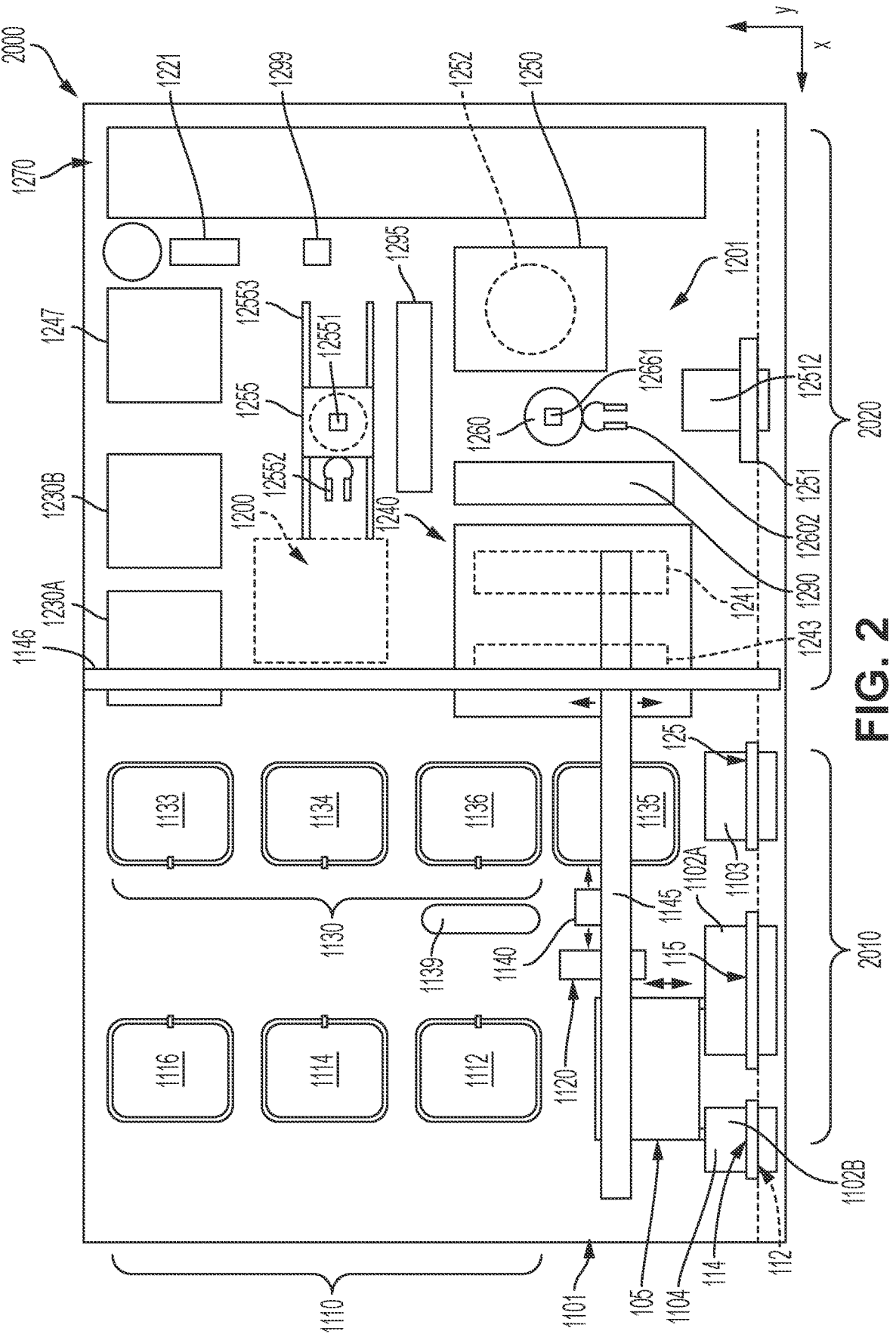
FIG. 2 shows a top view of the processing assembly of FIG. 1 with a top exterior portion of the processor assembly removed to expose the interior compartments of the processor assembly.

FIG. 2 shows a top front side view of processing assembly 100 with a top exterior portion of the external housing of core module 110 and staining module 120 removed. Referring to FIG. 2, processing assembly 100 includes shelf 112 that transitions to generally horizontal processing platform 1101 in core module 110 that includes sorting station 105, slide identification station 1120, exposure or baking and dewaxing station 1110, and dehydration station 1130. Representatively, when a basket of slides is introduced into core module 110 (e.g., through inlet opening 115 (see FIG. 1)), the basket is brought to sorting station 105 or slide identification station 1120. Sorting station 105 may contain one or more empty baskets. Empty baskets may be introduced into core module 110 through opening 114. At slide identification station 1120, a label of each slide in a slide basket containing one or more slides is individually identified (e.g., scanned, read and/or imaged). Information gained by identification process is communicated to controller or processor 136. A sorting process may then be implemented where, a slide is returned to the basket after being scanned, read and/or imaged or the slide is placed in another basket. Slide sorting may allow slides of a particular patient (a case) to be placed together in one basket as opposed to being placed with slides from one or more other cases. Alternatively or additionally, slides may be sorted according to a treatment process the slides will undergo in processing assembly 100. For example, slide processing protocols may require that a sample on a slide be subjected to one of at least two possible antigen retrieval processes before staining. Representatively, some samples require an antigen retrieval process in lower pH (e.g., sodium citrate, pH 4-6) while other samples require an antigen retrieval process at higher pH (e.g., tris-EDTA, pH 8-12). Processing assembly 100 contemplates that an antigen retrieval be performed while a slide or slides is/are in a basket. Therefore, slides with samples that require a lower pH for antigen retrieval could be put in one basket at sorting station 105, while slides with samples that require a higher pH for antigen retrieval could be put in another basket. A slide may be transferred by robot mechanism 1140 that is operable to move in an x-direction along rail 1145. Rail 1145 may be arranged perpendicular to and be slidably attached to rail 1146 so that rail 1145 is operable to move in a y-direction between the front and back of processing assembly 100. Rail 1146 may be attached at each end to the front and rear of sidewall of processor 100.

Once samples on slides are identified and the slides optionally sorted into a desired slide basket, the slide basket is transported from sorting station 105 or slide identification station 1120 to baking and dewaxing station 1110 where the slides in a slide basket are processed as a group to adhere a sample to a slide and then expose the sample (a first exposure). A slide basket may be transported from slide sorting station 105 or identification station 1120 to and through baking and dewaxing station 1110 by robot mechanism 1140. Following adherence and dewaxing of samples on slides in a slide basket, the slide basket is transported from core module 110 to staining module 120 again using robot mechanism 1140.

Still referring to FIG. 2, staining module 120 includes generally horizontal processing platform 1201 that includes glass coverslipper station 1230A, film coverslipper station 1230B, antigen retrieval station 1240 and printing station 1270. Representatively, a basket of slides is automatically introduced/transported into staining module 120 (e.g., from core module 110) using robot mechanism 1140. Once inside staining module 120, a basket of slides may be delivered to antigen retrieval station 1240. At antigen retrieval station 1240, the slides may be subjected to an antigen retrieval process at elevated temperature and pressure to expose antigenic sites in or on a sample (a second exposure). From antigen retrieval station 1240, slides are individually transported to printing station 1270. At printing station 1270, slides are individually washed and then an inkjet printing process is performed to print a reagent such as antibodies that bind to targeted exposed antigens on a sample and other enzymes and reagents which may provide colored appearance for identification and subsequent verification of proper application of the reagent to the specimen via the vision system. Slides may be printed one-by-one utilizing robot mechanism 1255 that moves on rails 12553 to load an individual slide into a printer. Following a printing process at printing station 1270, slides are loaded into a slide basket. The slide basket is then transported back to core module 110 and held in buffer or run through a dehydration process at dehydration station 1130. A buffering or dehydration process may be performed simultaneously on any slides in the slide basket. Following a dehydration process, the slide basket containing processed slides may optionally be brought to glass coverslipper station 1230A or film coverslipper station 1230B and a coverslip may be added to each of the slides in the slide basket. Following optional coverslipping, the slide basket may be discharged through outlet 125 in core module 110.

Figure 3:
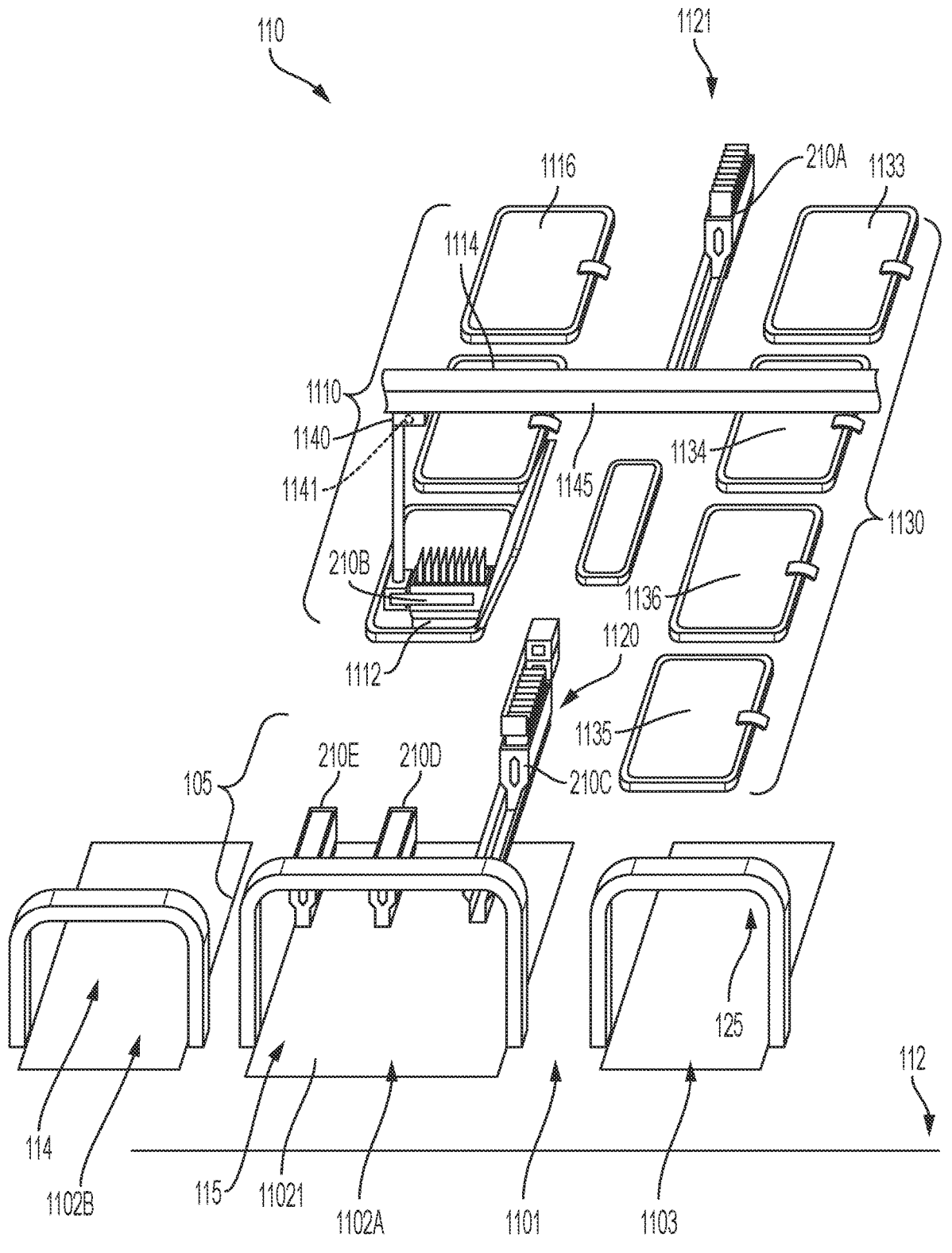
FIG. 3 shows a top front side magnified view of a core module or portion of the processing assembly of FIG. 1 with a top exterior portion of the external housing removed to expose the interior compartment of the module and shows slide baskets inside the core module or portion.

FIG. 3 shows a top front side magnified view of core module 110 of processing assembly 100 with a top exterior portion of the external housing removed to expose the interior compartment of the module. For illustration purposes, FIG. 3 shows five slide baskets (slide basket 210A, slide basket 210B, slide basket 210C, slide basket 210D, and slide basket 210E). Slide baskets 210D and 210E are in sorting station 105 of core module 110; slide basket 210C is in slide identification station 1120; slide basket 210B is in baking and dewaxing station 1110; and slide basket 210A is in slide identification station 1121. In this illustration, slide baskets 210A, 210B and 210C each contain slides while slide baskets 210D and 210E are empty. The presence of at least slide baskets 210A, 210B and 210C inside core module 110 at different stations indicates that the core module and processing assembly 100 more generally can process multiple slides (e.g., multiple slide baskets containing one or more slides) at different stations therein at the same or similar times. An example of a slide basket is a 10-slide or 20-slide TISSUE-TEK PRISMA® slide basket commercially available from Sakura Finetek USA, Inc. These slide baskets may accommodate a removable handle that attaches at each end. In the discussion that follows, while in processing assembly 100, a slide basket may not have a handle.

As noted above, slide basket 210C is positioned inside inlet 115 in slide identification station 1120. When loading, an operator or robot may deliver one or more slide baskets, such as one or more 10-slide or 20-slide TISSUE-TEK PRISMA® slide baskets to inlet 115. A robot apparatus operable to deliver slide baskets to processing assembly 100 is described in Application No. PCT/IB2020/059562, filed 12 Oct. 2020 and titled "Automatic Transfer Between Tissue Processing Modules," which is incorporated herein by reference. On processing platform 1101 within inlet 115 and a portion of shelf 112 may be conveyor 1102A such as a belt conveyor system. Conveyor 1102A may include two or more pulleys with a closed loop of belt 11021 that rotates about the pulleys. The pulleys are disposed below shelf 112/ processing platform 1101 so that an upper or exposed side of belt 11021 may be in a plane with shelf 112/processing platform 1101. Belt 11021 may have a width approximately as wide as inlet 115 to allow three or more baskets to be placed thereon and may have an outer (upper) surface that is in a plane similar to the plane of processing platform 1101. One or both pulleys may be connected to a motor to rotate the pulley(s) forward (into core module 110) or backward (out of core module 110). A motor may be connected to processor 136. Executable instructions in processor 136 may include instructions to cause belt 11021 to move forward or backward. A sensor on a side of inlet 115 (e.g., a photo-eye sensor) may sense the presence of the baskets and communicate with processor 136. In response to the presence of one or more baskets (e.g., slide basket 210C, slide basket 210D and slide basket 210E) at inlet 115, executable instructions in processor 136 may cause one or both pulleys of conveyor system 1102 to rotate and belt 11021 and bring the one or more slide baskets to sorting station 105. Alternatively, a sensor or sensors in conveyor 1102A may detect the presence of a slide basket or baskets thereon and cause conveyor 1102A to operate. Slide baskets that are introduced at inlet 115 may contain one or more slides. More than one slide basket may be introduced at one time to sorting station 105 through inlet 115 and conveyor 1102A. Once slide baskets containing slides are brought into core module 110, executable instructions in processor 136 may include instructions to direct robot mechanism 1140 to grasp and transfer a slide basket containing slides (e.g., slide basket 210C) to a location within sorting station 105. FIG. 2 and FIG. 3 show a robotic transfer assembly including rail or track 1145 and robot mechanism 1140 attached to a bottom of the rail or track. Robot mechanism 1140 is operable to move in an x-direction along rail or track 1145. Rail or track 1145 may be attached to rail or track 1146 and is slidable in a y-direction thereon. Rail or track 1146 may be fixed to opposing front and back walls of core module 110 or where core module 110 and staining module 120 are one unified module, to opposing front and back walls of staining module 120. The positioning of rail or track 1146 and a length of rail or track 1145 allow robot mechanism 1140 to be moved to a position above conveyor 1102A and separately to a position above sorting station 105. Robot mechanism 1140 may include an end effector that may securely grasp or engage a slide basket. For example, an end effector of robot mechanism 1140 may have projecting arms, blades or forks operable to grasp on opposite sides of a slide basket to then transport the slide basket between conveyor 1102A and sorting station 105. Robot mechanism 1140 includes robot controller 1141 (see FIG. 3) that may control robot motion (e.g., movement of robot mechanism 1140 on track 1145) and processing tasks to be performed by robot mechanism 1140. Robot controller 1141 is linked either through hardwiring or wirelessly to processor 136. Machine readable program instructions are transmitted between processor 136 and robot controller 1141 (e.g., from processor 136 to robot controller 1141) to direct robot controller and robot mechanism 1140 to perform a desired protocol. Robot controller 1141 may transmit a signal or signals back to processor 136 confirming the instructions and/or after completing an action directed by processor 136. In this instance, the program instructions transmitted from processor 136 to robot controller 141 may be to move to a position over a slide basket (e.g., slide basket 210C) on conveyor 1102A and grasp or otherwise engage the slide basket by, for example, grasping opposite sides of the slide basket and take the slide basket to sorting station 105.

In addition to introducing slide baskets that contain slides, it may be desirable to introduce one or more empty slide baskets into core module 110 and have such one or more empty baskets present in sorting station 105. An empty slide basket provides a destination for a slide or slides in a sorting operation. In the illustration shown in FIG. 3, slide basket 210D and slide basket 210E are empty. Slide basket 210D and slide basket 210E may have been introduced into core module 110 through opening 114 that may have a height dimension that is greater than a height dimension of an empty slide basket (e.g., an empty TISSUE-TEK PRISMA® slide basket), but less than a height dimension of the same slide basket with a slide or slides therein. On processing platform 1101 within inlet 114 and a portion of shelf 112 may be conveyor 1102B such as a belt conveyor system similar to conveyor 1102A. Executable instructions in processor 136 or a sensor or sensors in conveyor 1102B may cause conveyor 1102B to operate to bring the one or more empty slide baskets to sorting station 105. Once an empty slide basket is brought into core module 110, executable instructions in processor 136 may include instructions to direct robot mechanism 1140 to grasp or otherwise engage an empty slide basket (e.g., slide basket 210D, slide basket 210E) on conveyor 1102B and transfer the empty slide basket to a location within sorting station 105. Empty slide baskets may be positioned in a designated area of sorting station 105 separate from any slide baskets containing slides so that an empty slide basket location is known.

Executable instructions in processor 136 may also include instructions to direct robot mechanism 1140 to transfer a slide basket containing slides (e.g., slide basket 210C) from sorting station 105 to slide identification station 1120. module, to opposing front and back walls of staining module 120. The positioning of rail or track 1146 and a length of rail or track 1145 allow robot mechanism 1140 to be moved to a position above sorting station 105 and separately to a position above slide identification station 1120. In this instance, the program instructions transmitted from processor 136 to robot controller 141 may be to move to a position over slide basket 210C in sorting station 105 and grasp or otherwise engage the slide basket by, for example, grasping opposite sides of the slide basket and take slide basket 210C to slide identification station 1120, In FIG. 3, slide basket 210C has been brought by robot mechanism 1140 from sorting station 105 to slide identification station 1120.

First slide identification station 1120 representatively may include a scanning and/or imaging apparatus similar to that described in U.S. patent application Ser. No. 16/370,879, titled "Stand Alone Slide Identification Reader," filed 29 Mar. 2019 and incorporated herein in its entirety. U.S. patent application Ser. No. 16/370,879 describes a device that accepts a basket of slides such as a 10-slide or 20-slide TISSUE-TEK PRISMA® slide basket and automatically individually lifts each slide in a basket to read and/or capture an image of a label on the slide.

Figure 4:
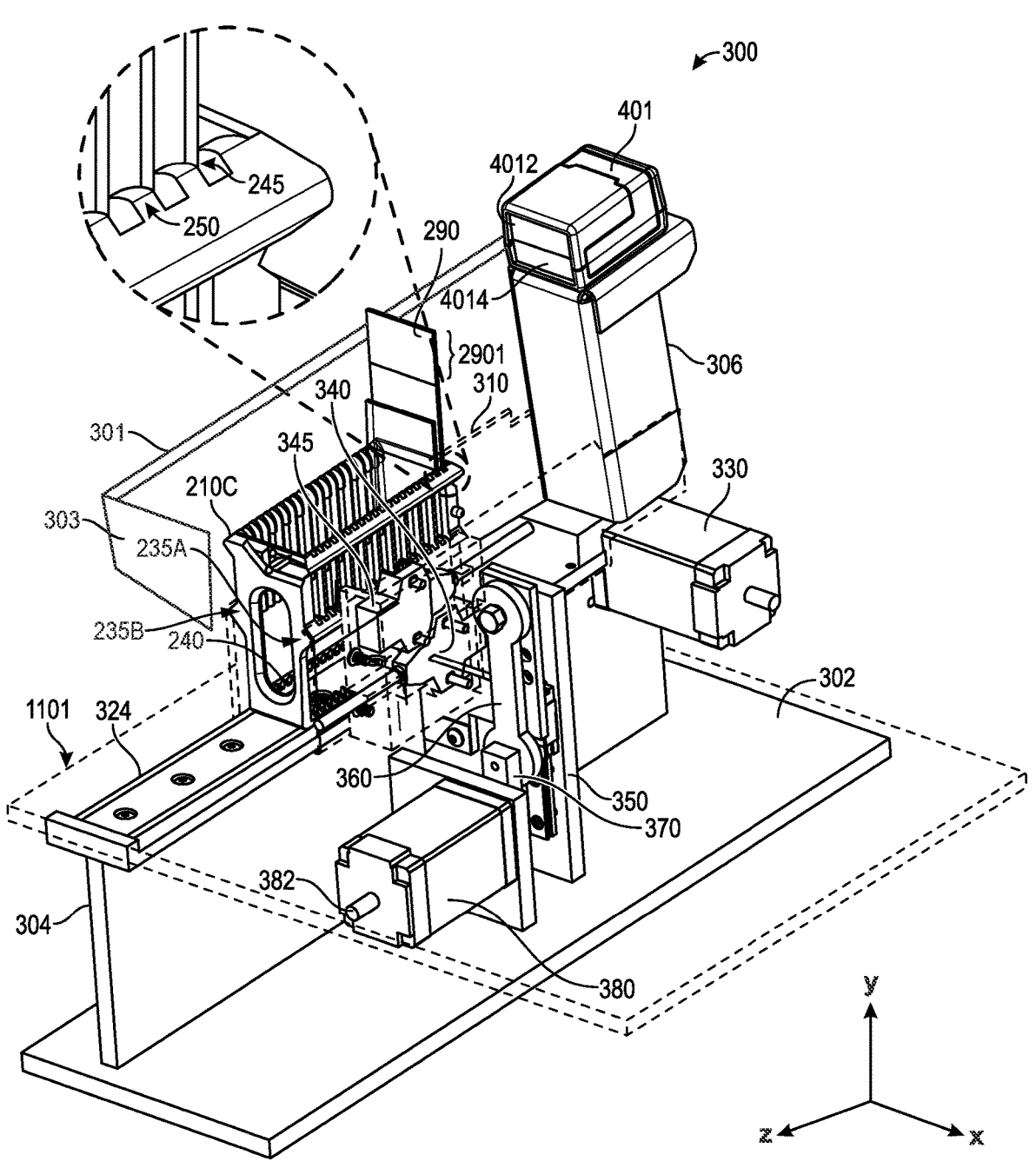
FIG. 4 shows a top left side perspective view of a scanning and/or imaging apparatus that can be positioned in a slide identification station of the core module or portion of the processing assembly of FIG. 1.

FIG. 4 shows a top left side perspective view of a scanning and/or imaging apparatus that can be positioned in slide identification station 1120. Slide identification station 1120 is situated adjacent or near input 115 of core module 110 and includes apparatus 300 that is similar to an apparatus described in U.S. patent application Ser. No. 16/370, 879 with an exterior housing removed. Apparatus 300 includes track 324 onto which slide basket 210C may be placed either manually or robotically in core module 110. Slide basket 210C is shown with only two slides in the slide basket in order to illustrate features of the slide identification system. FIG. 4 shows apparatus 300 includes base 302 that is representatively shown having a rectangular plate shape. Projecting perpendicularly from base 302 is support 304 that also has a rectangular plate shape. Disposed on support 304 is track 324 and tray 310 (shown in dashed lines). Projecting from support 304 above tray 310 at one end of tray 310 is pedestal 306. Sensor 401 is mounted on pedestal 306. Connected to and projecting a distance from pedestal 306 equivalent to at least a length of the slide basket is bracket 301 that holds screen 303 at its opposite end.

Tray 310 representatively is a relatively thin aluminum material. The sidewalls of tray 310 project perpendicularly from its base and are spaced to accommodate basket 210C. Slide basket 210C includes sidewall support 235A and sidewall support 235B on opposite sides thereof. Sidewall supports 235A and 235B are arrow shaped with a tip of the arrow pointed outward (away from basket 210). The sidewalls of tray 310 have a shape to accommodate a shape of sidewall supports 235A and 235B so that slide basket 210C fits within tray 310.

Figure 5:
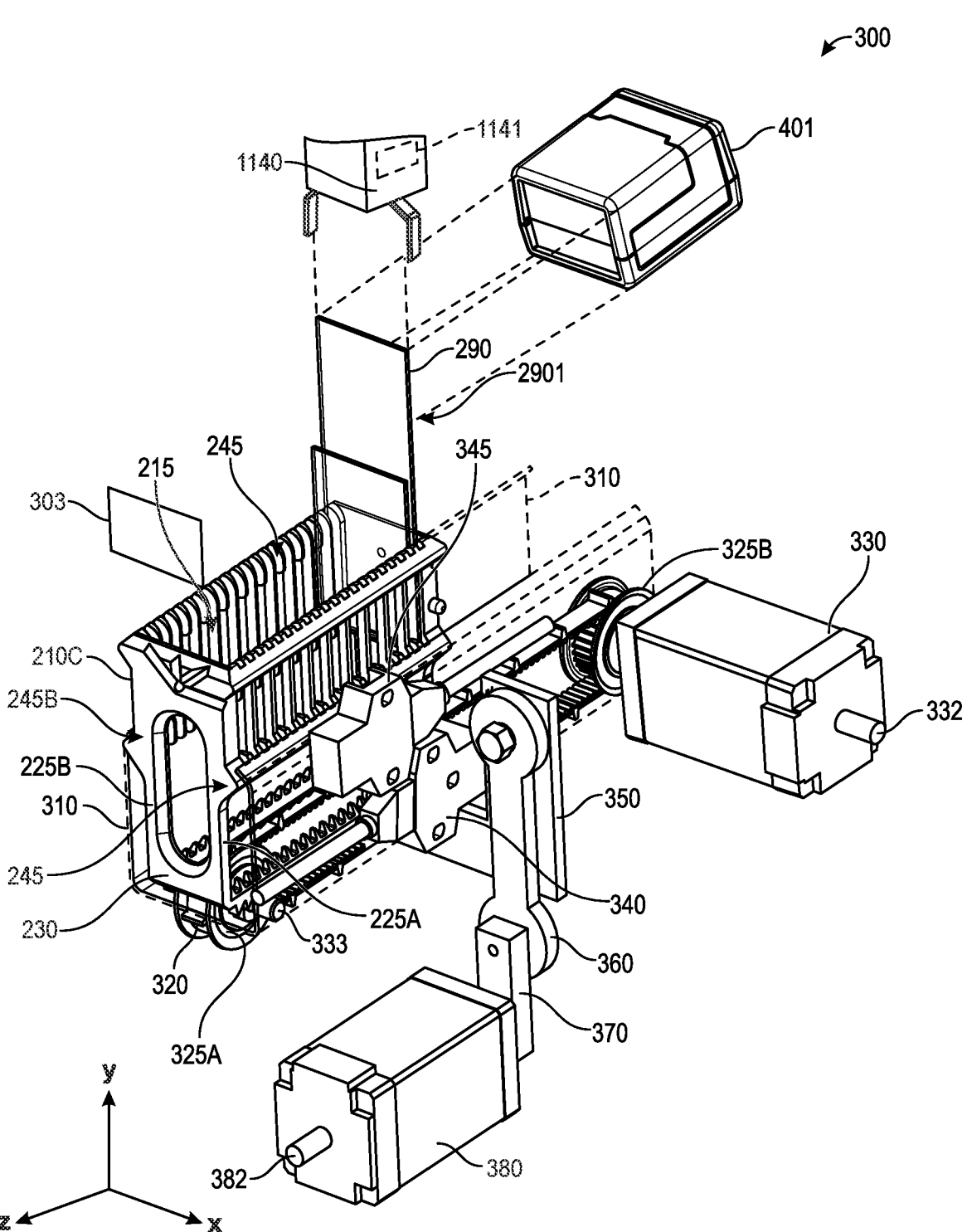
FIG. 5 shows a top left side perspective view of the scanning and/or imaging apparatus of FIG. 4 with the base, the support, the track and the pedestal removed.

FIG. 5 shows apparatus 300 of FIG. 4 with bracket 301, base 302, support 304, track 324 and pedestal 306 removed. As illustrated, a base of tray 310 has an opening through much of its length. Disposed within the opening is belt or track 320 such as a plastic belt. In one embodiment, belt 320 is disposed on roller 325A and roller 325B. Rollers 325A and 325B may be separated by a distance of approximately a length of tray 310. Each of roller 325A and roller 325B may have a number of equally spaced teeth defining their circumference. One side of belt 320 (the side facing rollers 325A and 325B) has similar spaced teeth operable to mate with the teeth on a roller. The spacing of the teeth on the roller and belt 320 may be similar to a spacing between notches 245 in slide basket 210C that separate one longitudinally positioned slide from another such that the belt can stop slide basket 210C notch 245-by-notch 245. Roller 325B may be connected to motor 330 by way of a rod or axle 332. In one example, motor 330 is an electrically powered step motor operable to rotate roller 325B. Roller 325A is disposed on axle 333 and is rotatable thereon.

FIG. 4 and FIG. 5 also show a motorized assembly for lifting the individual slides in slide basket 210C. Apparatus 300 includes, in this example, U-shaped push bar 350 with one end of a vertical projection of push bar 350 being positioned to move vertically within an opening of a base of tray 310 and through an opening and in base 230 of slide basket 210C. The other vertical projection of push bar 350 is positioned outside of tray 310. Connecting rod 360 is connected to push bar 350 at one end and at a second end to L-shape rotating arm 370. Rotating arm 370 is connected to motor 380 through rod 382. In one embodiment, motor 380 is an electrically operated motor operable to rotate rod 382. A rotation of rod 382 rotates rotating arm 370. Rotating arm 370 is pivotably connected to connecting rod 360 and a rotation of rotating arm 370 moves connecting rod 360 up and down. The up and down movements of connecting rod 360 are transferred to push bar 350 which itself moves up and down with rotation of motor 380. The upward movement advances the vertical arm of push bar 350 into and out of slide basket 210C (into and out of a base of the slide basket) to lift an individual slide (e.g., slide 290) in slide basket 210C vertically (a Y-direction) relative to a position where one end of the slide is seated at a base of slide basket 210C. Upon lifting an individual slide (slide 290) from slide basket 210C, an area 2901 of the slide is exposed and may be read and/or sensed (e.g., scanned and imaged) by sensor 401.

Figure 6:
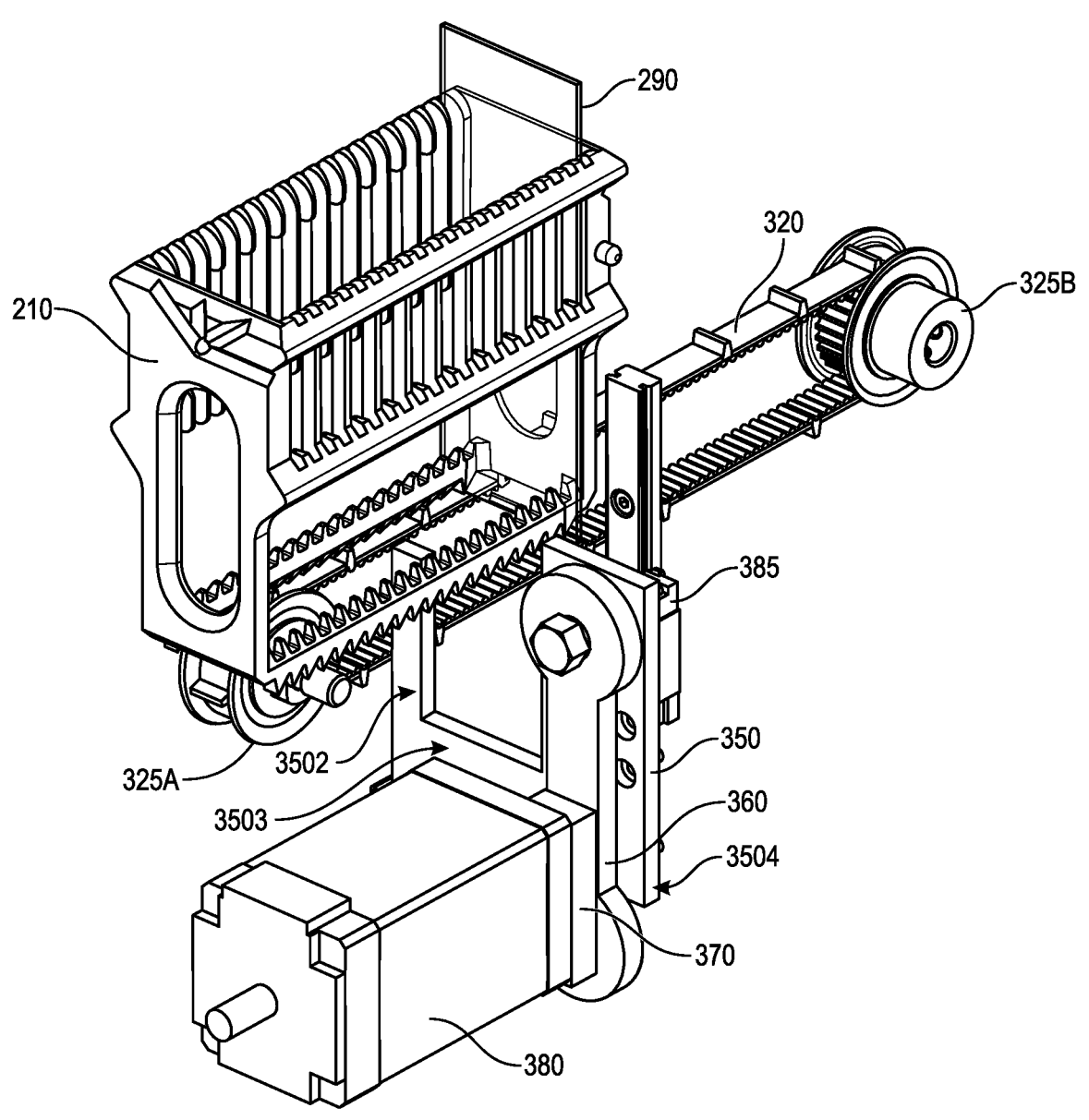
FIG. 6 shows a top side perspective views of the scanning and/or imaging apparatus of FIG. 4 with the base, the support, the track and the pedestal removed and shows the lifting mechanism in a down or return position below a slide in the slide basket.
Figure 7:
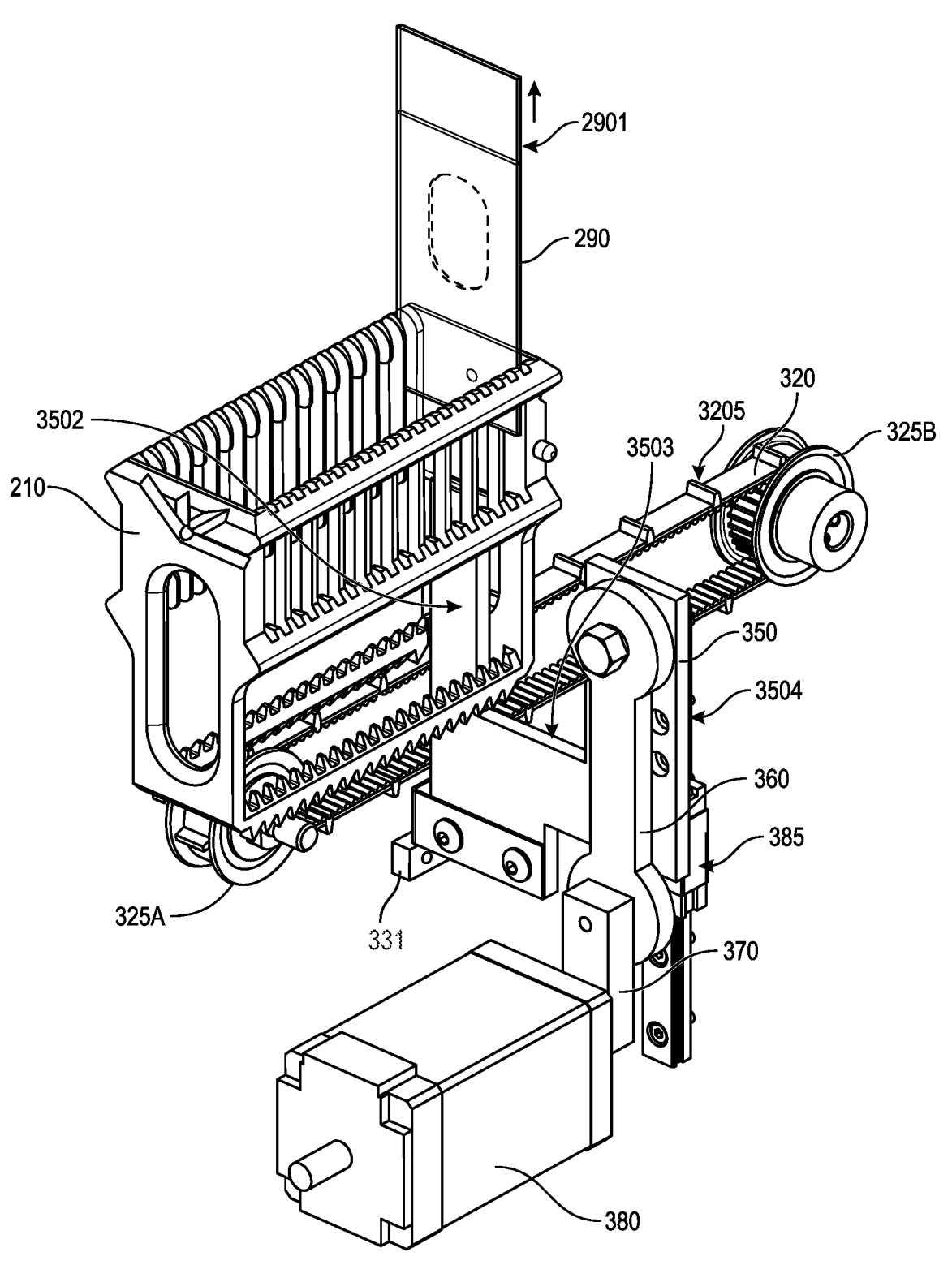
FIG. 7 shows a top side perspective views of the scanning and/or imaging apparatus of FIG. 4 with the base, the support, the track and the pedestal removed and shows the lifting mechanism in a up or advanced position below a slide in the slide basket.

FIG. 6 and FIG. 7 show top side perspective views of apparatus 300 with bracket 301, base 302, screen 303, support 304, track 324 and pedestal 306 removed and show the lifting and return of a slide in basket 210. Referring to FIG. 6 and FIG. 7, the figures show push bar 350 including vertical projection 3502 and vertical projection 3504 and separated by lateral projection 3503. In this embodiment, vertical projection 3502 of push bar 350 has a width that can be accommodated within slide basket 210C (e.g., through an opening in base 230 of slide basket 210C) and a thickness approximately equivalent to a thickness of slide 290 and no thicker than a width of notch 245. FIG. 6 shows vertical portion 3502 of push bar 350 beneath slide basket 210C (beneath a base of the slide basket) and slide 290 resting in a slot at base 230 of slide basket 210C. In FIG. 6, rotating arm 370 is in a down position. FIG. 7 shows rotating arm 370 in an up position. By moving rotating arm 370 from a down to an up position, connecting rod 360 lifts push bar 350 upward a representative distance on the order of 63 mm to 75 mm (2.5 inches to 3 inches). A slide in the slide basket may be lifted a sufficient distance to expose a label on the slide as well as a section on the slide (a section being a sample embedded in and surrounded by embedding medium (e.g., paraffin)). Exposing the section may allow an image of the section to be captured by sensor 401. As push bar 350 is lifted, portion 3502 of push bar 350 enters slide basket 210C and pushes against an end of slide 290 and pushes slide 290 upward so that an end of slide 290 is no longer adjacent to or in contact with base 230 of slide basket 210C. The vertical movement of push bar 350 is guided by linear guide 385. Slide 290 is in an up position with a greater length portion outside of slide basket 210C relative to other slides that might be nested in slide basket 210C. Portion 2901 of the slide may be sensed (e.g., scanned and imaged) by a sensor as described above.

Once a slide basket (e.g., slide basket 210C) is placed on track 324 of apparatus 300 so that it is over a portion of belt 320 in slide identification station 1120, belt 320 engages teeth at the base of the slide basket (teeth 250, see FIG. 4) and detection sensor 345 detects the presence of the basket. Belt 320 may then be advanced by motor 330 automatically (e.g., in response to detection sensor 345 sending a signal to motor 330) and basket 210C is advanced in a direction toward sensor 401. As slide basket 210C is advanced, detection sensor 340 detects the presence of a slide in slide basket 210C, motor 380 is activated and drives push bar 350 upward to lift a slide in slide basket 210C. Detection sensor 331 senses the advancement of push bar 350. A signal from detection sensor 331 to sensor 401 will alert to a raised slide, allowing sensor 401 to then sense information on the raised slide (e.g., read and image). After sensing, the slide is lowered into slide basket 210C (block 470) and belt 320 is then advanced by motor 330 to advance slide basket 210C until detection sensor 340 detects another slide in basket 210. If a slide is detected the slide is raised and sensed.

Apparatus 300 may be electrically connected to processor 136 that coordinates the movement of motor 330 and motor 380. Processor 136 may be operable to receive or retrieve signals from each of detection sensor 331, detection sensor 340 and detection sensor 345. Processor 136 contains non-transitory machine-readable instructions that when executed cause push bar 350 to be raised and sensor 401 to detect (e.g., read and image) a slide raised by push bar 350. The executable instructions also include instructions to lower push bar 350 and then step motor 380 a distance to position push bar 350 under another slide position in slide basket 210C. The executable instructions may further include instructions to eject slide basket 210C from tray 310 when all slides in the basket are individually sensed by sensor 401.

Sensor 401 may be connected to a memory of processing assembly 100 (e.g., memory 137) and/or a laboratory information system (LIS) that is a software system that records, manages and stores data for clinical laboratories. Where sensor 401 is, for example, bar code reader or scanner, sensor 401 is operable to read and optionally record one or a plurality of bar codes that is/are printed on a slide (e.g., on a slide label or frosted area of the slide). This information may include but is not limited to patient data (name, admitting physician, ordering department, specimen type, etc.) and a staining or other protocol for the specimen on the slide (e.g. accessioning number). The information that is read by sensor 401 may be transmitted to processor 136 or the LIS to allow the system to track the slide and also subsequently perform any required staining protocol or other preparation protocol for the specimen. The information that is read may also be displayed on display 135 and stored in memory 137. It is appreciated that a bar code reader or scanner is one example of a sensor that is operable to sense information from a slide. In another embodiment, sensor 401 may be a camera or other reader (e.g., radio frequency identification (RFID) reader). Representatively, sensor 401 may include reader 4012 and scanner/imager 4014 as shown in FIG. 4. Reader 4012 may be a bar code reader or scanner (or other reader or scanner of identification information on a slide) and scanner/imager 4014 may be operable to capture (e.g., scan) an image of a sample on a slide. Screen 303 behind the slide may be a rectangular body approximately the size (length and width dimensions) of a slide or a portion of a slide (e.g., a portion of a slide lifted from the basket). Screen 303 is positioned behind the lifted slide and may be of a solid color such as gray or black that provides a backdrop to improve the detection by sensor 401 of information on the lifted slide. As a slide is initially introduced into core module 110, a sample on the slide may be disposed in and/or infiltrated with an embedding medium such as paraffin commonly referred to a section. The embedding medium typically occupies a larger area on a surface of a slide than the sample disposed in the embedding medium. The executable instructions in processor 136 may direct scanner/imager 4014 to read a label or other identification information on a slide and to capture an image of a portion of the section, including the entire portion so that a possible initial identification of the sample in the section can be determined. The captured image of the section may be stored or saved in memory 137. Often, with an embedding medium such as paraffin, a sample in the section may appear a different color (e.g., more opaque) than the surrounding embedding medium (e.g., paraffin). Processor 136 may use this difference in color to approximate a location of the sample on the slide. For example, the executable instructions in processor 136 may include instructions to overly a grid on the stored image captured by scanner/imager 4014 and detect the sample in the section by its color difference relative to a color of the embedding medium (e.g, using wavelength differences). Using Cartesian coordinates associated with the grid, an approximate location of the sample may be determined and this location stored or saved in member 137. Still further, processor 136 may keep a count of the slide(s) in a basket that are scanned so that processor 136 knows a total number of slides in processing system 100 or that have been processed in processing system 100.

In some instances, it may be desirable to sort slides in a basket into two or more baskets. Examples include but are not limited to sorting slides based on a case (e.g., a patient)

and sorting slides based on a staining or other protocol (e.g., an antigen retrieval process). One way slides can be sorted is following the detecting of the slide in slide identification station 1120. When information about a slide or sample on a slide is detected (e.g., scanned), that information can be used to sort the slide into a particular basket. If, for example, processor 136 or other LIS determines based on information detected from the slide in slide identification station 1120, that a slide should be transferred from slide basket 210C to another basket, executable instructions in processor 136 may include instructions to direct robot mechanism 1140 to transfer the slide to slide basket 210D or slide basket 210E in sorting station 105. Robot mechanism 1140 shown in FIG. 2 and FIG. 3 may include an end effector that may securely grasp a slide (e.g., grasp at opposite side edges) to transport the slide between slide baskets. To aid in the grasping of a slide, the slide may be grasped when it is in a raised or lifted position within basket 210C in slide identification station 1120 (e.g., when it is raised or lifted by push bar 350). This may be immediately after information is detected or later (e.g., after all slides in a basket have been detected). As noted above, robot mechanism 1140 includes robot controller 1141 (see FIG. 3 or FIG. 5) that may control robot motion (e.g., movement of robot mechanism 1140 on track 1145 and processing tasks to be performed by robot mechanism 1140). Robot controller 1141 is linked either through hardwiring or wirelessly to processor 136. In this instance, machine-readable program instructions transmitted from processor 136 to robot controller 141 may be to move to a position over slide basket 210C and grasp a lifted slide and take such slide to slide basket 210D. As noted, robot mechanism 1140 may be used at different times to grasp and transport individual slide baskets as well individual slides. Robot mechanism 1140 may use one end effector to accomplish either task, such as an end effector with two projecting arms, blades or forks whose separation distance can be adjusted depending on whether the end effector was grasping a basket (wider width) or a slide (narrow width). Alternatively, robot mechanism 1140 may have access to different end effectors to perform certain tasks. For example, one end effector may be one with projecting arms, blades or forks for grasping a slide basket by opposite sides of the slide basket while another end effector might be a vacuum suction apparatus for grasping an individual slide through a vacuum suction connection on the face of the slide. The separate end effectors may be stored inside processing assembly 100 and executable instructions from processor to robot mechanism 1140 (e.g., to robot controller 1141) may include instructions that the robot mechanism select an appropriate end effector before performing a task.

Once all the slides in a slide basket (e.g., slide basket 210C) are detected by sensor 401 and optionally sorted (e.g., some removed from slide basket 210C and placed in slide basket 210D), slide basket 210C may be removed from slide identification station 1120 by robot mechanism 1140 by moving robot mechanism 1140. From slide identification station 1120, a protocol may be to transfer a slide basket (e.g., slide basket 210C) to baking and dewaxing station 1110. Rail or track 1145 may be positioned at a height sufficient to allow an end effector of robot mechanism 1140 (e.g., two projecting arm, blades or forks spaced a distance apart to grasp opposing sides of slide basket 210C) to be maneuvered on respective sides of slide basket 210C and then grip the slide basket and then ascend to raise the slide basket by the handle. The slide basket (e.g., slide basket 210C) may then be raised and then transferred to baking and dewaxing station 1110.

Prior to staining/printing a sample (e.g., a tissue sample) on a slide, paraffin-embedded samples may be baked to affix the sample to the slide and then de-paraffinized (dewaxed) to expose the samples to allow aqueous solutions to penetrate the samples (a first exposure). At baking and dewaxing station 1110, a slide basket containing one or more slides each containing a paraffin-embedded sample may be subjected to a series of operations to bake and then dewax the sample. These operations are performed while the slide(s) are in a slide basket allowing multiple samples to be baked and dewaxed together. Representatively, baking and dewaxing station 1110 includes three tanks or compartments, each with a dedicated lid. Each lid may be connected to a hinge that may be automatically actuated via instructions from processor 136. FIG. 3 representatively shows a lid of tank or compartment 1112 open and a lid of tank or compartment 1114 and a lid of tank or compartment 1116 closed. FIG. 3 also shows an end effector of robot mechanism 1140 that is two projecting arms, blades or forks grasping slide basket 210B and robot mechanism 1140 positioning slide basket 210B into a volume of the tank or compartment. Tank or compartment 1112 is operable to heat the slide(s) in a slide basket as part of a baking operation. The heat treatment should be sufficient to allow a sample on a slide to adhere or further adhere to a slide (a glass slide) and possibly to soften the embedding medium associated with a section on the slide. Representatively, tank or compartment 1112 may be lined on one or more sides of its exterior with resistive heating elements that are sufficient to bring a temperature inside a volume of tank or compartment 1112 to a temperature on the order of 55° C. to 70° C. Tank or compartment 1114 includes a volume of a dewaxing solution such as xylene sufficient to submerge the sample portion of slide(s) positioned lengthwise in a slide basket. Tank or compartment 1114 may be a series of tanks or compartments containing similar or different dewaxing solutions. One example of multiple tanks or compartments for tank or compartment 1114 is a first tank or compartment that contains a volume of xylene and a second tank or compartment that contains a volume of alcohol (e.g., ethyl alcohol). Tank or compartment 1116 includes a volume of a washing solution, such as water or other aqueous wash solution.

A baking and dewaxing process may proceed automatically under the control of executable instructions in processor 136. Such instructions may include instructions to individually open one or more lids on the tanks or compartments, the placement of a slide basket into a tank or compartment, a time for an operation (e.g., baking, dewax, etc.), the removal of a slide basket from a tank or compartment and the closing of the one or more lids. As an example of a baking and dewaxing process to adhere and dewax samples on slide(s) in a slide basket, a lid on tank or compartment 1112 is automatically opened and then a slide basket (e.g., slide basket 210B as shown) is placed by robot mechanism 1140 in tank or compartment 1112 and subject to a baking process sufficient to adhere the samples to individual slides and melt the paraffin on individual slides (e.g., 5 minutes to 60 minutes). Robot mechanism 1140 may transfer the slide basket into tank or compartment 1112 and disengage with the slide basket. A door or lid may then be automatically closed over the top of the tank or compartment 1112 for the duration of a baking operation. Following a baking operation, a door or lid over tank or compartment 1112 may be automatically opened and robot mechanism 1140 may then engage the slide basket (e.g. slide basket 210B) and transfer the slide basket toward tank or compartment 1114. A door or lid over tank or compartment 1114 may be automatically actuated to open and the robot mechanism 1140 may transfer the slide basket into tank or compartment 1114 and disengage with the slide basket. Tank or compartment 1114 may contain an amount (a volume) of a dewaxing solution or solutions sufficient to submerge at least the sample on slide(s) in the slide basket in the dewaxing solution or solutions. Following the automatic transfer of the slide basket into tank or compartment 1114, the door or lid of the tank may be automatically closed. The slides in the basket may subjected to a representative dewaxing operation for, for example, 3 minutes to 5 minutes. Tank or compartment 1114 may include an agitator (e.g., a magnetic stirrer) to agitate the dewaxing solution or solutions therein during the dewaxing operation. Alternatively, the door or lid of tank or compartment 1114 may be left open and rather than disengage the slide basket upon transfer of the slide basket into tank or compartment 1114, robot mechanism 1140 may lift and lower the slide basket during the dewaxing operation to agitate the dewaxing solution or solution in the tank or compartment. Following the dewaxing operation, robot mechanism 1140 automatically transfers the slide basket toward tank or compartment 1116. The door or lid over tank or compartment 1114 may then be automatically closed and a door or lid over tank or compartment 1116 may be automatically actuated to open and the robot mechanism 1140 may then transfer the slide basket into tank or compartment 1116. Tank or compartment 1116 may contain an amount (a volume) of a wash solution or solutions sufficient to submerge at least the sample on slide(s) in the slide basket in the washing solution or solutions. The slides in the basket may be subjected to a representative wash operation for 3 minutes to 5 minutes. A door or lid associated with tank or compartment 1116 may be closed during the wash operation and the wash solution(s) therein may be agitated. Alternatively, robot mechanism 1140 may maintain engagement with the slide basket during the wash operation and repeatedly lift and lower the slide basket to agitate the wash solution(s).

Following processing of a slides contained in a slide basket in baking and dewaxing station 1110, a slide basket may be transferred to staining module 120. A slide basket may be transferred using a robotic transfer assembly, such as robot mechanism 1140. As illustrated in FIG. 2, rail or track 1146 may be positioned in staining module 120 (e.g., extending from a front wall to a back wall) and/or rail or track 1145, oriented perpendicularly to rail or track 1146 may have a length that extends into a portion of staining module 120. Machine readable program instructions transmitted between processor 136 and robot controller 1141 (e.g., from processor 136 to direct robot controller 1141) to perform a protocol to transfer a slide basket (e.g., slide basket 210A or 210B, FIG. 3) from baking and dewaxing station 1110 to antigen retrieval station 1240 in staining module 120 (see FIG. 2). Robot mechanism 1140 may grasp a slide basket with its end effector, rail or track 1145 may be moved toward a front of processing assembly 100 and robot mechanism 1140 may be transferred along rail or track 1140 to staining module 120 to a position above and adjacent antigen retrieval station 1240.

Figure 8:
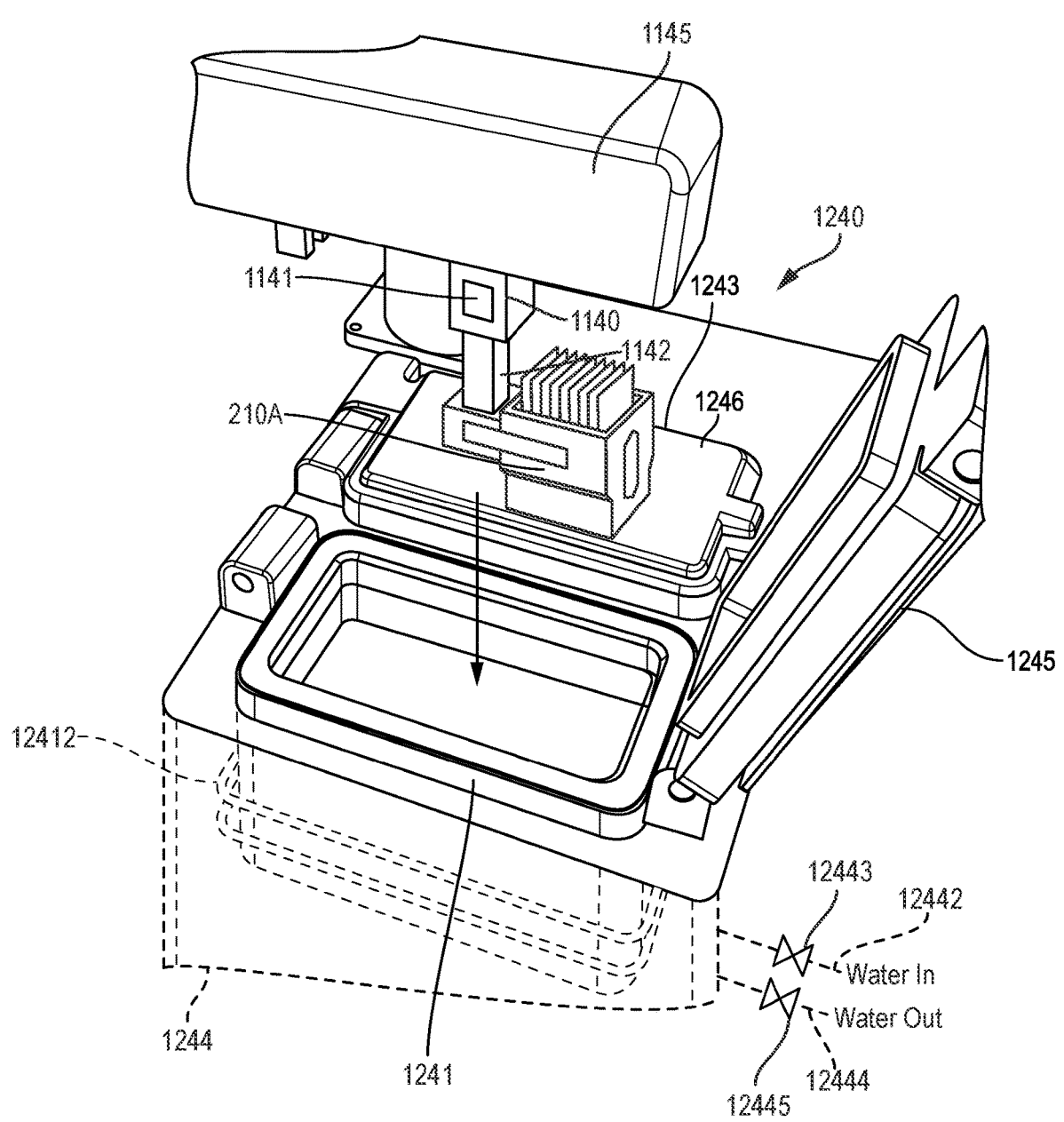
FIG. 8 shows a top front side magnified view of a portion of a staining module or portion of the processing assembly of FIG. 1 with a top exterior portion of the external housing removed to expose the interior compartment of the module, the magnified view showing a portion of the staining module or portion that includes an antigen retrieval station.

FIG. 8 shows a magnified view of a portion of staining module 120 that includes antigen retrieval station 1240. At antigen retrieval station 1240, the slides may be subjected to an antigen retrieval process at elevated temperature and pressure to expose antigenic sites in or on a sample (a second exposure). Antigen retrieval station 1240 may include one or more chambers for retrieval agents to be contained. Two or more chambers provide an opportunity to use the same or different retrieval reagents. Representatively, one chamber may contain a low pH antigen retrieval solution (e.g., pH 6, sodium citrate retrieval solution) and the other chamber may be a higher pH antigen retrieval solution (e.g., pH 8 to pH 10, Tris retrieval solution).

FIG. 8 shows two chambers, chamber 1241 and chamber 1243 arranged side-by-side within processing platform 1201. Pivotally connected to a side of each of chamber 1241 and chamber 1243 is a lid (lid 1245 and lid 1246, respectively) that can be automatically actuated open or closed by instructions from processor 136. FIG. 8 shows lid 1245 in an open position exposing the contents of chamber 1241 and lid 1246 in a closed position concealing the contents of chamber 1243. Lid 1245 and lid 1246 allow the respective chambers to be pressurized during an antigen retrieval process. Chamber 1241 and chamber 1243 as well as lid 1245 and lid 1246 may be made of a material or include a liner of a material (the liner exposed to the contents of chamber) such as porcelain that will resist violent boiling of an antigen retrieval solution in the respective chambers.

Slides in a slide basket (e.g., slide basket 210A) may be brought to antigen retrieval station 1240 by robot mechanism 1140. Robot mechanism 1140 may be directed by instructions from, for example, robot controller 1141 that may be linked processor 136. End effector 1142 of robot mechanism 1140 may grasp a slide basket on opposite slides thereof and deposit the slide basket in chamber 1241 or chamber 1243 of antigen retrieval station 1240 when the respective lid is opened. When the slide basket deposition is complete, the lid (e.g., lid 1245) is closed and an antigen retrieval process may proceed. A lid may be opened and closed automatically by executable instructions from processor 136 (e.g., instructions may direct an electric motor associated with a hinge of a lid to open actuate the lid open or closed). With lid 1245 closed, a sealed chamber is created allowing an antigen retrieval process to be performed under an elevated pressure, such as a pressure of 1.0 to 1.06 bar (15 psi) above atmospheric. A representative antigen retrieval process may utilize a tris or citrate-based retrieval solution at temperatures of 100° C. to 121° C. and pressures up to 1.06 bar above atmospheric for 3 minutes to 15 minutes. Utilizing an elevated pressure allows an antigen retrieval process to be expedited to, for example, a process time of five minutes compared to prior process times of 45 minutes or more under atmospheric conditions in a similar bath.

To achieve an elevated pressure and temperature, chamber 1241 and chamber 1243 may be, for example, lined on one or more sides of its exterior with heating elements (e.g. inductive or resistive heating elements 12412 around chamber 1241) that are sufficient to bring a temperature of the solution inside a volume of the chamber to a desired elevated temperature. Heating the antigen retrieval solution in a sealed chamber will have the effect of raising the pressure. Alternatively or additionally, a volume of each chamber may be reduced once its lid is closed to increase a pressure of the gas (e.g., air) in the chamber. In addition to heat and increased pressure, the antigen retrieval solution may be agitated during an antigen retrieval process or operation with, for example, a magnetic stirrer in the solution.

FIG. 8 shows chamber 1241 and chamber 1243 disposed in a jacket or larger vessel 1244. The larger vessel may be charged with water or other fluid to heat or to cool the chambers. Fluid may be introduced to vessel 1244 through inlet 12442 and discharged from vessel 1244 through outlet 12444. Inlet 12442 may be connected to a fluid source (e.g., water source) and outlet 12444 to a waste or recycle tank. A temperature of the fluid may be reduced by an inline cooler or refrigerant or heated by an inline heater as desired. Each of inlet 12442 and outlet 12444 may be controlled by a valve linked to processor 136 (valve 12443 and valve 12445, respectively). In an example where a fluid source is used to cool chamber 1241 and/or chamber 1243, an antigen retrieval process may be performed where an antigen retrieval solution in chamber 1241 and/or chamber 1243 is heated to a temperature on the order of, for example, 120° C. (248° F.) for 3 minutes to 13 minutes. Following the heat treatment, cool fluid (e.g., water at ambient or a temperature below ambient) may be introduced through inlet 12442 into vessel 1244 to cool the antigen retrieval solution in chamber 1241 and/chamber 1243 to, for example, 50° C. (122° F.) or less. The fluid may be introduced into vessel 12442 and remain present around chamber 1241 and chamber 1243 for the cooling process or the fluid may be circulated through the vessel (in through inlet 12442 and out through outlet 12444) for the cooling process. A representative time to cool an antigen retrieval solution from 120° C. (248° F.) to 50° C. (122° F.) is on the order of 8 minutes or less, such as 5 minutes or less, or such as 3 minutes to 5 minutes using a cooling fluid of water at approximately ambient temperature. In another example, heated fluid (e.g., water at greater than ambient temperature) may be introduced through inlet 12442 to assist in elevating a temperature of the antigen retrieval solution in chamber 1241 and/or chamber 1243 during an antigen retrieval process. The heated fluid could then be replaced by a cooling fluid following the antigen retrieval process to cool the antigen retrieval solution. Optional heating coils 12412 may be disposed around each of chamber 1241 and chamber 1243 to assist in heating. The coils (e.g., coils 12412 around chamber 1241) may be controlled by processor 136. Although one vessel (vessel 1244) is shown around both chamber 1241 and chamber 1243, it is appreciated that each chamber may be disposed in a respective individual vessel with fluid inlet and outlet.

Each of chamber 1241 and chamber 1243 may be connected at its base (below processing platform 1201) with a respective supply and waste tank to allow an antigen retrieval solution in chamber 1241 and chamber 1243 to be periodically replaced. The supply tank and waste tank below processing platform 1201 may contain a level sensor in communication with processor 136. A level of the supply tanks and waste tanks may be indicated on a screen of display 135 to allow an operator to view a level. When a supply tank is empty or near empty, processor 136 may send an alert to an operator (e.g., an alert on display 135 or alarm), so that the supply tank may be replaced. Similarly, when a waste tank is full or near full, processor 136 may send an alert to an operator (e.g., an alert on display 135 or alarm), so that the waste tank may be replaced.

Following an antigen retrieval process, a slide basket containing one or more slides may be brought to a wash or holding tank in preparation for staining. FIG. 2 shows robot mechanism 1255 on tracks or rails 12553 (two parallel tracks) allowing robot mechanism 1255 to move within stainer module 120 in an x-direction. Robot mechanism 1255 may include a multi-joint arm having, for example, three, four or six or more rotational joints that permit movement of the arm in arcuate paths about a horizontal plane or rotary action along a joint axis. A translational or prismatic joint permits movement of the arm in an axial direction (along a joint axis). Robot mechanism 1255 has an end effector 12552 at an end of the arm that is operable to grasp a slide basket by opposite sides thereof allowing the movement and transport of the slide basket. Robot mechanism 1255 may have controller or processor 12551 therein that is operable to communicate with processor 136. In one example, executable instructions associated with processor 136 direct that a slide basket be removed from chamber 1241 or chamber 124 in antigen retrieval station 1240 by robot mechanism 1140. In one example, the instructions from processor 136 direct that a slide basket in chamber 1241 or chamber 1243 be retrieved by robot mechanism 1255 and be brought directly to wash tank 1247. Alternatively, the instructions may direct that a slide basket retrieved by robot mechanism 1140 be deposited in antigen retrieval station 1240 adjacent chamber 1241 or chamber 1243 or in area 1200 where it can be engaged by end effector 12552 of robot mechanism 1255. Instructions associated with processor 136 may then direct robot mechanism 1255 to grasp the slide basket and take the slide basket to wash tank 1247.

Similar to robot mechanism 1140, robot mechanism 1255 may have access to different end effectors to perform certain tasks. For example, one end effector may be one with projecting arms, blades or forks for grasping a slide basket by opposite sides of the slide basket while another end effector might be a vacuum suction apparatus for grasping an individual slide through a vacuum suction connection on the face of the slide. The separate end effectors may be stored inside processing assembly 100 and executable instructions from processor to robot mechanism 1255 (e.g., to robot controller 12551) may include instructions that the robot mechanism select an appropriate end effector before performing a task.

Representatively, wash tank 1247 may be similar to the tanks or compartments in baking and dewaxing station 1110 including a volume or compartment having a size to accommodate one or more slide baskets and a dedicated lid. The lid may be connected to a hinge that may be automatically actuated via instructions from processor 136. Although one wash tank (wash tank 1247) is shown, it is appreciated that process assembly 100 may include two or more wash tanks.

Wash tank 1247 may contain an amount (volume) of a wash solution such as TBS or phosphate-buffered saline containing a surfactant. In certain situations, an individual slide or slides may need priority over other slides. Wash tank 1247 containing a wash buffer provides an environment for slide retention prior to a staining/printing operation. Such retention includes retention due to scheduling as in the situation where a slide or slides having higher priority need to be brought to printing station over other slides that were perhaps loaded and processed ahead of the high priority slide(s). Wash tank 1247 may be connected at its base to a supply tank to supply a wash buffer and to a waste tank to collect used wash buffer. Access to the supply tank and waste tank (e.g., to drain used wash buffer in wash tank 1247 into the waste tank and then refill wash tank 1247 with wash buffer from supply tank) may be controlled by processor 136. The supply tank and waste tank below processing platform 1201 may contain a level sensor in communication with processor 136. A level of the supply tanks and waste tanks may be indicated on a screen of display 135 to allow an operator to view a level. When a supply tank is empty or near empty, processor 136 may send an alert to an operator (e.g., an alert on display 135 or alarm), so that the supply tank may be replaced. Similarly, when a waste tank is full or near full, processor 136 may send an alert to an operator (e.g., an alert on display 135 or alarm), so that the waste tank may be replaced.

A wash solution in wash 1247 may also contain a stain such as eosin or hematoxylin that may at least temporarily color or stain a sample on a slide. The slides in a basket may be automatically transferred by robot mechanism 1255 into wash tank 1247 (the slides may remain in the basket in the wash solution in wash tank 1247). The slides may be removed individually from the slide basket for staining/printing leaving the basket in wash tank 1247.

Prior to staining/printing, a sample on a sample on a slide may be detected again. In such instance, a basket containing one or more slides may be removed from wash tank 1247 by robot mechanism 1255 and brought to slide identification station 1221 based on instructions from processor 136. Slide identification station 1221 may be similar to slide identification station 1120 and may include a reader for scanning or reading slide identification information and a scanner/imager for capturing (e.g., scanning) an image of a sample on a slide. In an example where a stain such as eosin or hematoxylin is added to a solution in wash tank 1247, a sample on a slide may be colored with a portion of that stain. A scanner/imager in slide identification station 1221 may be able to capture an image of the sample so that a location of the sample on the slide may be determined. Executable instructions in processor 136 may direct robot mechanism 1255 to retrieve a slide basket containing one or more slides and bring the slide basket to slide identification station 1221. There, executable instructions in processor 136 may direct a scanner/imager in slide identification station 1221 to capture an image of a portion of a sample on a slide, including the entire portion. The captured image of the sample may be stored or saved in memory 137. Processor 136 may approximate a location of the sample on the slide from the stored or saved image. For example, the executable instructions in processor 136 may include instructions to overly a grid on the stored image and detect the sample by its color difference relative to a color of the slide (e.g, using wavelength differences). Using Cartesian coordinates associated with the grid, an approximate location of the sample may be determined and this location stored or saved in memory 137. Alternatively, or additionally, the stored image of the sample captured at slide identification station 1221 can be compared with the image captured and saved earlier from slide identification station 1120. Based on this comparison done by an analysis in executable instructions associated with processor 136, a location of a sample on a slide may be determined. This location information may be saved in memory 137 for use later in a staining/printing operation to focus jetting of a printing medium on the sample and minimize waste associated with printing in areas where no sample is present. In situations where there is no stain added to a wash solution or the stain is not sufficient to allow an image to be accurately captured at slide identification station 1221, the stored/saved location information of the sample from first slide identification station 1120 may later be used in a printing operation.

As described above with respect to slide identification station 1120, slide identification station 1221 may include a track onto which a slide basket may be placed and the slides in a basket may be raised or lifted one by one and detected with a sensor mounted on a pedestal at one end and detection optionally aided by a screen or backdrop behind the slide (the lifted slide is between the sensor and the screen or backdrop). Once a slide is detected (e.g., scanned/image captured), robot mechanism 12552 of robot mechanism 1255 may include an end effector that may securely grasp the raised or lifted slide (e.g., grasp at opposite side edges or grasp a face or backside with a vacuum grip) to transport staining module 1270. This grasp and transfer of a slide may be directed by instructions from processor 136 to occur immediately after information is detected or later (e.g., after all slides in a slide basket have been detected). As an alternative, once all slides have been detected, the instructions from processor 136 may direct robot mechanism 1255 to grasp a slide basket in slide identification station 1221 and return the slide basket to wash tank 1247. There the slides may remain until it is desired to individually bring slides to printing station 1270 at which time, processor 136 may direct robot mechanism 1255 to grasp and transfer such slides individually from a slide basket in wash tank 1247 to printing station 1270. Slides may be individually transported to printing station 1270 leaving other slides in wash tank 1247.

Figure 9:
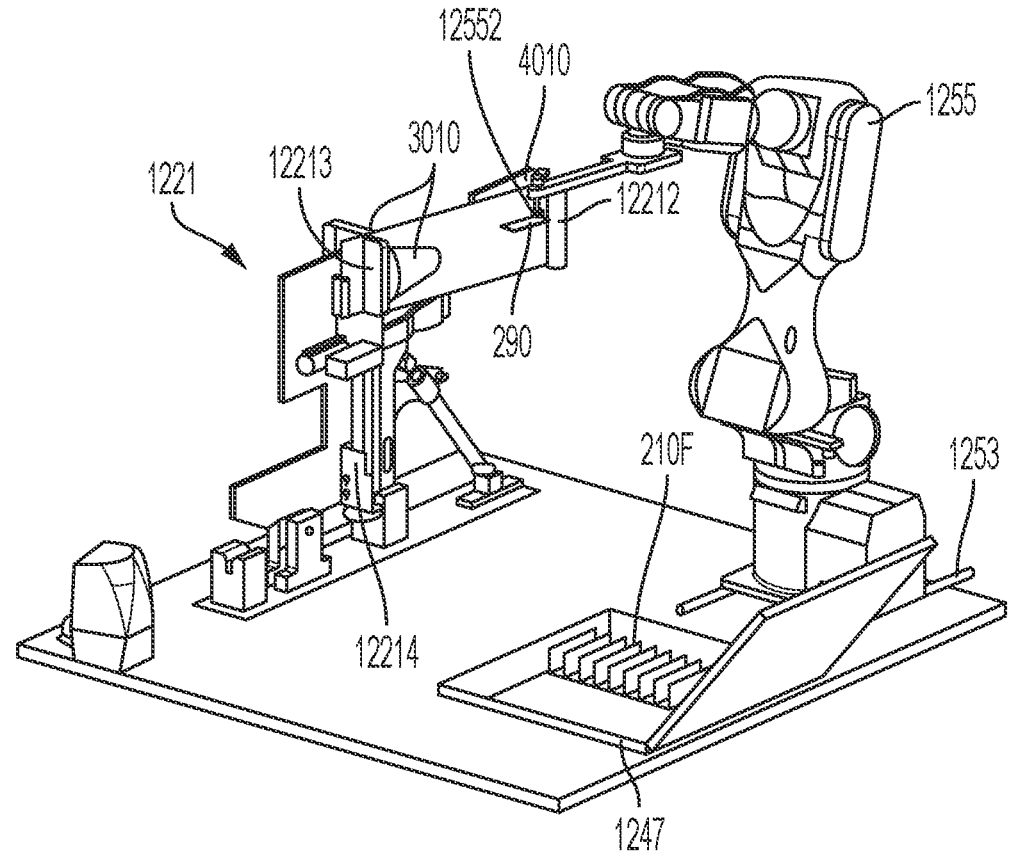
FIG. 9 shows a perspective front side view of a robot mechanism and a slide identification station in the staining module or portion of the processor assembly of FIG. 1.

FIG. 9 shows a front side perspective view of robot mechanism 1255 and another example of slide identification station 1221. As noted above, a slide basket containing slides may be present in wash tank 1247 and slides individually removed therefrom. FIG. 9 shows wash tank 1247 containing slide basket 210F containing a number of slides. As illustrated a depth of a solution in wash tank 1247 needs only to at a level that covers a representative area on a slide containing a sample. That representative area is approximately around a midportion or middle section of a slide. FIG. 9 shows that a portion of each slide that does not contain a sample may be above a level of a solution in wash tank 1247. That portion might be a slide label or slide identification portion. FIG. 9 also shows robot mechanism 1255 including end effector 12552 that has its end a suction member connected to a vacuum source associated with the robot mechanism. Instructions from processor 136 may direct robot mechanism 1255 to retrieve slides individually from wash tank 1247 by grasping or gripping a slide on its face or backside with the suction member (e.g., suction member contacting the slide identification portion). FIG. 9 shows end effector 12552 holding a slide. Such instructions include lifting a grasped or gripped slide and removing it from slide basket 210F and bring the removed slide to slide identification system 1221.

Slide identification station 1221 in the example shown in FIG. 9 may be similar to slide identification station 1120 and may include a reader for scanning or reading slide identification information and a scanner/imager for capturing (e.g., scanning) an image of a sample on a slide. Rather than receiving slides in a slide basket, however, slide identification station 1221 receives slides individually. Receiving slides individually reduces fluid build-up or spillage around slide identification station as compared to if a slide basket containing one or more slides is brought from a wet environment of wash tank 1247 to slide identification station 1221. The slides are placed in slide identification station 1221 on a long or length side edge supported by end clamps or vertical slots 12212 and 12213, respectively in stand 12214. A slide (e.g., slide 290) is placed so that a sample on the slide and a slide identification are on a same side as sensor 4010 or a barcode reader or scanner and an imager. Sensor 4010 may be positioned at an angle to capture a sample on a slide as well as a label. Slide identification station 1221 may also include screen 3010 on the same side of the slide as sensor 4010 and/or on an opposite side to block glare or unwanted light images from sensor 4010. In an example where a stain is added to the wash solution at baking and dewaxing station 1110, a sample on a slide may be colored with a portion of that stain. A scanner/imager in slide identification station 1221 may read slide identification information on the slide and relay that information to processor 136. Processor 136 may then retrieve the appropriate processing (staining/printing) regimen for a sample on the slide. Slide identification station 1221 may also be able to capture an image of the sample so that a location of the sample on the slide may be determined. Executable instructions in processor 136 may direct a scanner/imager in slide identification station 1221 to capture an image of a portion of the sample, including the entire portion. The described process may capture an image of a sample on a slide after an antigen retrieval process before staining/printing. It is appreciated that the capturing of an image (the second capture as described, the first being in slide identification station 1120) may alternatively be done prior to an antigen retrieval process. According to such alternative, the capturing of an image of a sample may occur after a slide basket containing one or more slides each with a sample thereon is processed through baking and dewaxing station 1110. In such instance, tank 1116 in baking and dewaxing station 1110 may optionally contain a stain such as eosin or hematoxylin that may at least temporarily stain or color a sample on the slide. Alternatively, a slide basket may be transferred from baking and dewaxing station 1110 directly to wash tank 1247 and from wash tank 1247 to a slide identification station such as slide identification station 1221 or slide identification station 1120.

Figure 10:
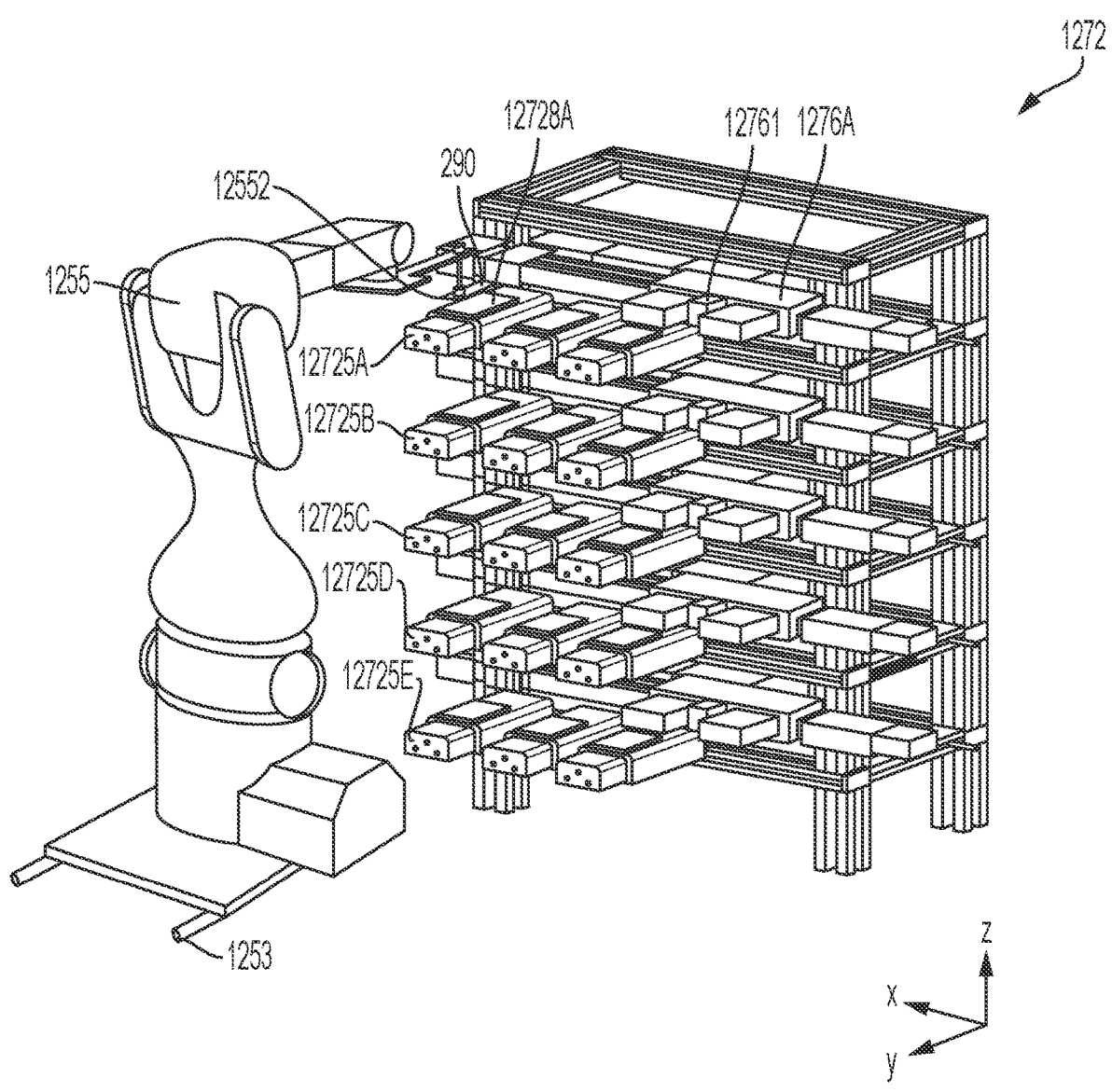
FIG. 10 shows a perspective front side view of a portion of a printing station that is housed in the staining module or portion of the processor assembly of FIG. 1 and shows a robot mechanism loading a slide into the printing station.
Figure 11:
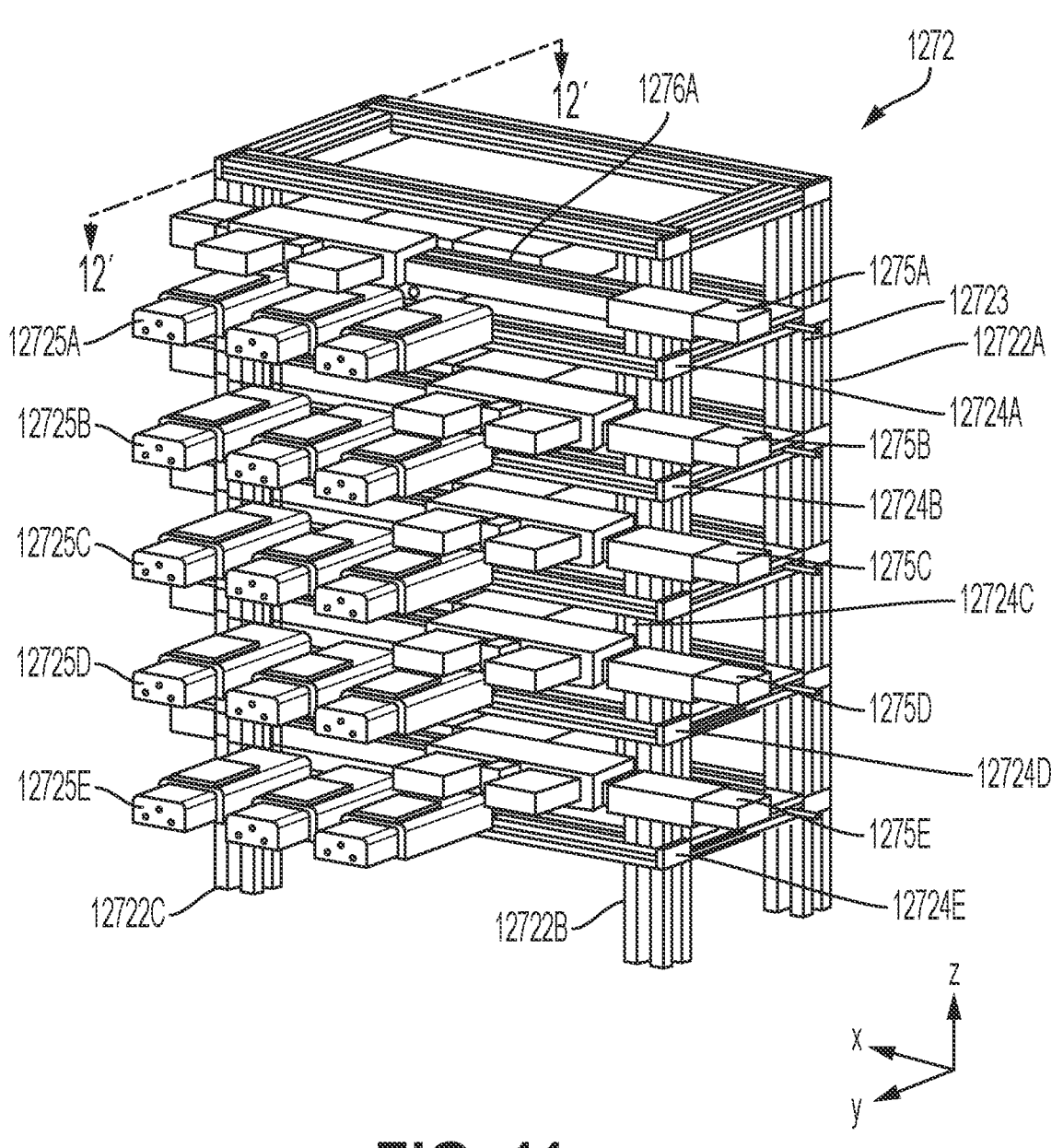
FIG. 11 shows a magnified front side view of components of a printing station that is housed in the staining module or portion of the processing assembly of FIG. 1 and includes a humidor rack assembly.

Once a slide is read/scanned and possibly imaged a slide identification station, executable instructions from processor 136 direct robot mechanism 1255 to remove the slide from slide identification station 1221 and transport the slide to printing station 1270. FIG. 10 shows an end effector grasping slide 290 by a vacuum connection and loading the slide on slide carrier 12728A (on a platen portion of slide carrier 12728A) in humidor rack assembly 1272 of printing station 1270. At printing station 1270, an inkjet printing process is performed to print a reagent such as a primary antibody that binds to targeted exposed antigens on a sample or a detection agent (e.g., secondary antibody, peroxidase conjugate, substrate) that may react or otherwise link to the primary antibody. FIG. 11 shows a magnified front side view of components of printing station 1270. Included in these components is humidor rack assembly 1272 that, in this example, consists of a rack (e.g., a metal rack) having a frame of opposite pairs of vertical supports 12722A, 12722B and 12722C shown with five horizontal struts 1273 separating each pair in a y-direction (e.g., horizontal struts 1273 between vertical support 12722A and vertical support 12722B). Humidor rack assembly also includes five horizontal supports 12724A, 12724B, 12724C, 12724D and 12724E separating the opposite pairs of vertical supports in an x-direction and defining rows. Connected to a superior surface of each horizontal support 12724A-12724E are slide carrier linear rails. For illustration purposes, FIG. 11 shows slide carrier linear rail 12725A as one of three such slide carrier linear rails connected to a superior surface of support 12724A; slide carrier linear rail 12725B as one of three such slide carrier linear rails connected to a superior surface of support 12724B; slide carrier linear rail 12725C as one of three such slide carrier linear rails connected to a superior surface of support 12724C; slide carrier linear rail 12725D as one of three such slide carrier linear rails connected to a superior surface of support 12724D; and slide carrier linear rail 12725E as one of three such slide carrier linear rails connected to a superior surface of support 12724E. In one example, humidor rack assembly can accommodate up to five slide carrier linear rails connected to a horizontal support (e.g., support 12724A, support 12724B, support 12724C, support 12724D or support 12724E) and evenly spaced between one another between vertical supports (e.g., between vertical supports 12722B and 12722C) and in another example, up to eight slide carrier linear rails.

Figure 12A:
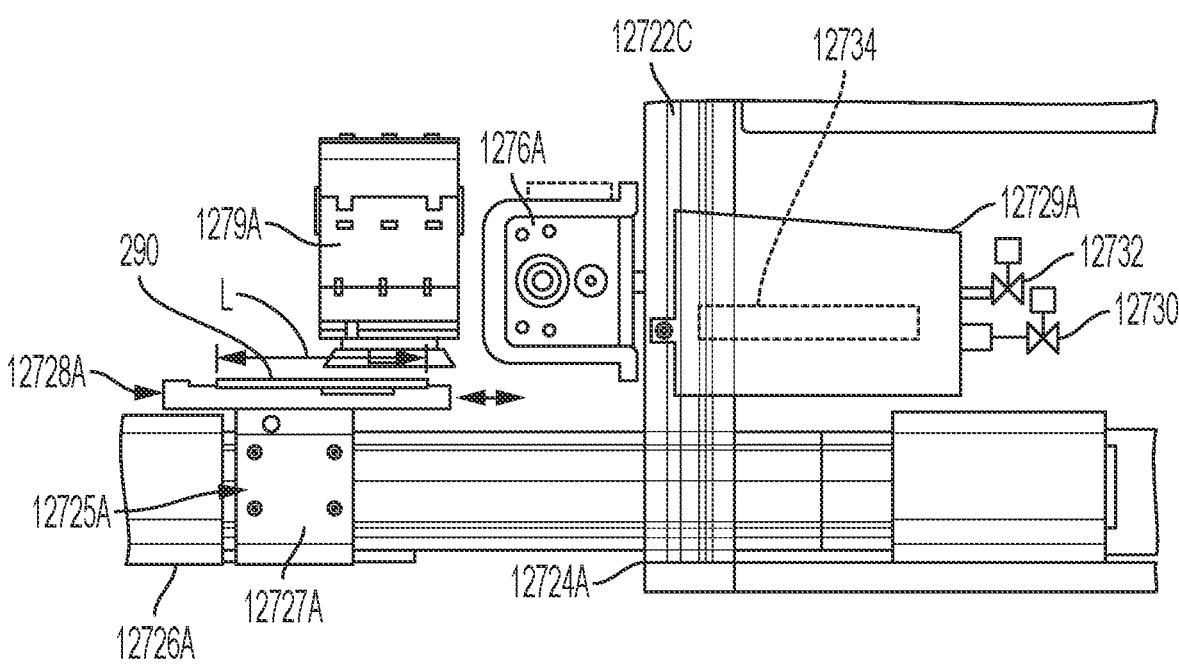
FIG. 12A shows a view through line 12-12' of the humidor rack assembly of FIG. 11 and shows a slide platen on a slide carrier linear rail and a slide on the slide platen in a position under a printer.
Figure 12B:
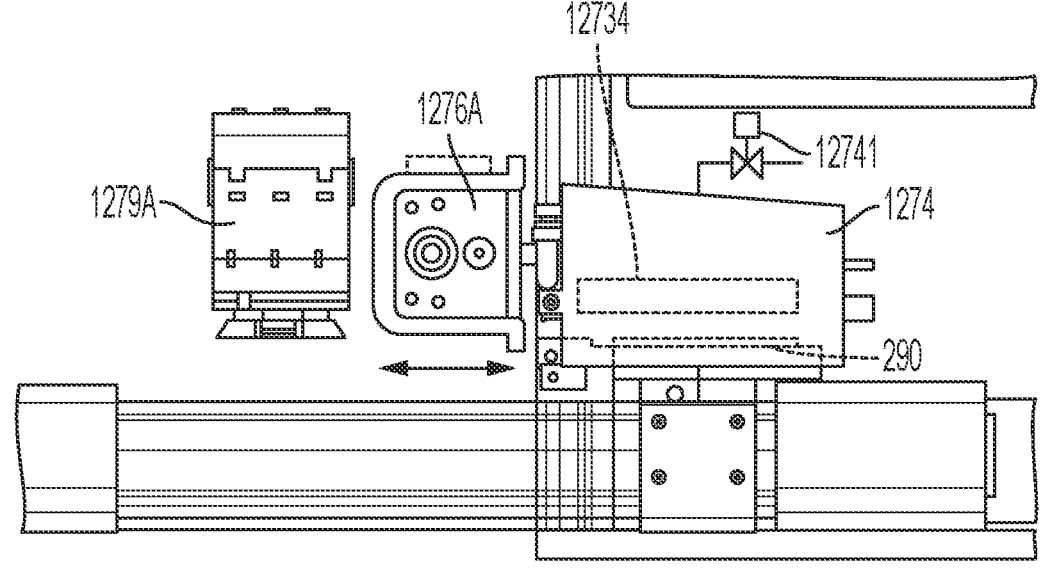
FIG. 12B shows a view through line 12-12' of the humidor rack assembly of FIG. 11 and shows a slide platen on a slide carrier linear rail and a slide on the slide platen in a position under a humidor housing.

FIG. 12A and FIG. 12B show a cross-section of a portion of humidor rack assembly 1272 through line 12-12' of FIG. 11. FIG. 12A and FIG. 12B show slide carrier linear rail 12725A connected to a superior surface of support 12724A and having a proximal portion projecting forward from vertical support 12722C and a distal portion projecting rearward. Each slide carrier linear rail has a representatively rectangular cross-section on to which a bracket is attached in a manner to be slidable in a y-direction. FIG. 12A representatively shows bracket 12727A on linear rail 12725A forward of vertical support 12722C and FIG. 12B representatively shows bracket 12727A rearward of vertical support 12722C. Each bracket (e.g., bracket 12727A) may be electrically connected to processor 136 and is operable to move on a slide carrier linear rail (e.g., slide carrier linear rail 12725A) based on instructions from processor 136. On a superior surface of each bracket is attached a slide platen. FIG. 12A and FIG. 12B show slide platen 12728A connected to a superior surface of bracket 12727A. Each slide platen (e.g., slide platen 12728A) has dimensions to accommodate a slide therein. The slide platen may be oriented so that a slide is accommodated with a length dimension defined by the y-axis or an x-axis (an x-axis defined into and out of the page in FIG. 12A and FIG. 12B). Also connected to each slide carrier linear rail is a humidor housing. FIG. 12A and FIG. 12B show humidor housing 12729A positioned behind vertical support 12727C. Each humidor housing (e.g., humidor housing 12729A) has a top, two opposing sidewalls and a front and back wall. A base of each humidor housing is formed by a slide platen when the slide platen is positioned rearward of vertical support 12722C. FIG. 12A defines an open position, where a slide and slide platen 12728A are exposed and FIG. 12B defines a closed position, where a slide and slide platen are within humidor housing 12729A. The movement of slide platen 12728A on slide carrier linear rail 12725A from an open to closed position or from a closed to open position may be controlled by instructions from processor 136 that direct the movement.

An individual humidor defined by a humidor housing (e.g., humidor housing 12729A) and a slide carrier (e.g., slide carrier 12728A) is operable to create a humidity-controlled environment for a slide prior to and/or following a printing process to reduce evaporation of the staining reagents at the samples on the respective slides. Representatively, humid air may be introduced into or circulated through an interior of the humidor by control valve 12730 to maintain a certain humidity level that may be monitored by a monitor linked to processor 136 (e.g., processor 136 may contain executable instructions to control the rate of humid air through the control valve). In one example, a conduit and valve assembly may be connected to a water supply (possibly heated) below processing platform 1201. The conduit may extend into a wall of the humidor (e.g., a back wall as shown). A fan or blower may introduce air and water into the conduit and into humidor 1272.

As shown in FIG. 12B, each humidor includes a wash nozzle 1274 mounted, for example, inside the top of a humidor housing (e.g., humidor housing 12729A). Wash nozzle 1274 may be a spray nozzle or mister operable to spray a solution such as an aqueous solution containing defined concentrations of one or more salts, one or more buffers, a surfactant, a preservative, and other excipients as required. A mode of action is expected to be flooding of the surface of a slide as required before and/or possibly after a reagent is printed on the sample. In one example, a conduit and valve assembly may be connected to an aqueous solution supply tank below processing platform 1201. The conduit may extend to wash nozzle 1274. Flow of a solution from a supply tank through wash nozzle 1274 may be controlled by valve 12741. Valve 12741 may be connected to processor 136. When a slide is in humidor housing (e.g., humidor housing 12729A), processor 136 may signal valve 12741 to actuate the valve to open to spray an aqueous solution inside the humidor housing. The humidor housing may also include a fluid removal device, such as an air knife therein. A fluid removal device that is an air knife may direct pressurized air or inert gas at a slide surface to remove excess aqueous solution on a slide if desired. The pressurized air or inert gas may be mixed with moisture to resist drying of the specimen by exposure to the air or gas. FIG. 12A shows valve 12732 and a conduit system that may provide the air or other gas to humidor housing 12729A from a pressurized air tank below processing platform 1201. Valve 12732 may be controlled by instructions from processor 136.

Many detection assays such as immunohistochemical (IHC) assays for which printing station 1270 may be employed may be performed at ambient or near ambient temperatures. Some assays, such as some in situ hybridization (ISH) assays often require individual steps to be performed at higher temperatures. Humidor housing 12729A may accommodate different temperature assays through the inclusion of a temperature-controlled humidor that may be operated at a non-ambient temperature (either above or below ambient). A representative range of hybridization temperatures above ambient may be, for example, 45-70° C. for an ISH process. Temperature control may be achieved with heating tape or cable that may be encased electrical wire and may be controlled by instructions from processor 136. An alternative or addition to a temperature-controlled humidor may be a dedicated tank that is operable to contain a heated solution (e.g., a buffer solution). For example, a DNA melting protocol may require that a sample on a slide be heated to a temperature of 90° C. or more. A dedicated tank adjacent, for example, humidor 1372 may contain a solution heated to the desired temperature and controlled by instructions from processor 136. Such a tank would allow for relatively high temperature processing protocols such as DNA melting.

Humidor housing 12729A may also be pressurized when a slide is in the humidor housing. Increased pressure (above ambient) may accelerate a reaction time of reagents with targets in or on samples and reduce evaporation of reagents. Pressure may be increased by creating a sealed chamber with humidor housing 12729A and a slide carrier (e.g., slide carrier 12728A) and introducing a gas into the chamber.

Figure 13:
FIG. 13 shows a magnified front side view of a portion of the humidor rack assembly of FIG. 11, the magnified view showing a printer and two reagent cartridges connected to the printer.

Referring again to FIG. 11, positioned above each horizontal support 12724A-12724E and slide carrier linear rail 12725A-1275E are respective horizontally disposed ink cartridge rails. FIG. 11 shows ink cartridge rail 1275A connected to vertical supports 12722B and 12722C above (based on a z-direction) horizontal support 12724A and slide carrier linear rail 12725A; ink cartridge rail 1275B connected to vertical supports 12722B and 12722C above horizontal support 12724B and slide carrier linear rail 12725B; ink cartridge rail 1275C connected to vertical supports 12722B and 12722C above horizontal support 12724C and slide carrier linear rail 12725C; ink cartridge rail 1275D connected to vertical supports 12722B and 12722C above horizontal support 12724D and slide carrier linear rail 12725D; and ink cartridge rail 1275E connected to vertical supports 12722B and 12722C above horizontal support 12724E and slide carrier linear rail 12725E. Connected to each ink cartridge rail is a printer adapted to receive an ink cartridge. FIG. 11 shows printer 1276A connected to and extending forward from ink cartridge rail 1275A. Printer 1276A is sized to accommodate one or more ink cartridges connected thereto, such as two ink cartridges of similar or different sizes (dimensions). Each printer is connected to its respective ink cartridge rail by a bracket that is operable to move in an x-direction. Each printer may contain a sensor to capture an image of a sample on a slide in a slide carrier (in a platen of a slide carrier). FIG. 13 shows a top perspective view of a portion of humidor rack assembly 1272, showing ink cartridge rail 1275A and printer 1276A connected thereto. Printer 1276A is connected to ink cartridge rail 1275A through bracket 1277A. Bracket 1277A is connected to ink cartridge rail 1275A in a manner that the bracket and printer 1276A are slidable there on (moveable in an x-direction along ink cartridge rail 1275A). FIG. 13 also shows cable assembly 1278A connected to printer 1276A. Cable assembly 1278A may consist of a power cable for printer 1276A as well as a communication cable to link printer 1276A to processor 136 so that instructions from processor 136 can direct the movement of printer 1276A along ink cartridge rail 1275A and the dispensing of reagent onto slides by one or more (e.g., two) reagent cartridges in a slide carrier linear rail (e.g., slide carrier linear rail 12725A). FIG. 13 also shows sensor 12761 that is operable to capture an image of a slide below printer 1276A as viewed. Cable assembly 1278A may also be connected to sensor 12761 to provide power to the sensor as well as a communication link between sensor 12761 and processor 136.

FIG. 13 further shows two reagent cartridges connected to printer 1276A. As noted above, in one example, each printer may accommodate one or more reagent cartridges and dispense reagent from the one or more reagent cartridges as directed by processor 136. In this example, printer 1276A includes reagent cartridge 1279A and reagent cartridge 1280A. Reagent cartridge 1279A has dimensions larger than reagent cartridge 1280A. Representatively, reagent cartridge 1279A has a y-direction depth on the order of 67.4 millimeters (mm), an x-direction width of 58 mm and a z-direction height of 98.5 mm while reagent cartridge 1280A has a similar depth and width as reagent cartridge 1279A (e.g., $W_2$ is equal to $W_1$) and a height of 70.8 mm ($H_2$ is less than $H_1$). In another example, reagent cartridge 1280A may have a similar depth and height as reagent cartridge 1279A but a smaller width. Representatively, reagent cartridge 1280A may contain a volume of a primary antibody and reagent cartridge 1279A may be primary antibodies or detection agents such as secondary antibodies, enzymes, conjugates, etc. Each reagent cartridge may be drop on demand-type cartridges, preferably thermal drop on demand-type cartridges with each cartridge including an individual printhead. The printhead may be positioned at a base of each reagent cartridge so that when the reagent cartridge is inserted in a respective printer (e.g., printer 1276A), the ejection of contents in a reagent cartridge occurs through a base of the cartridge.

Figures 14A, 14B, 14C, 14D:
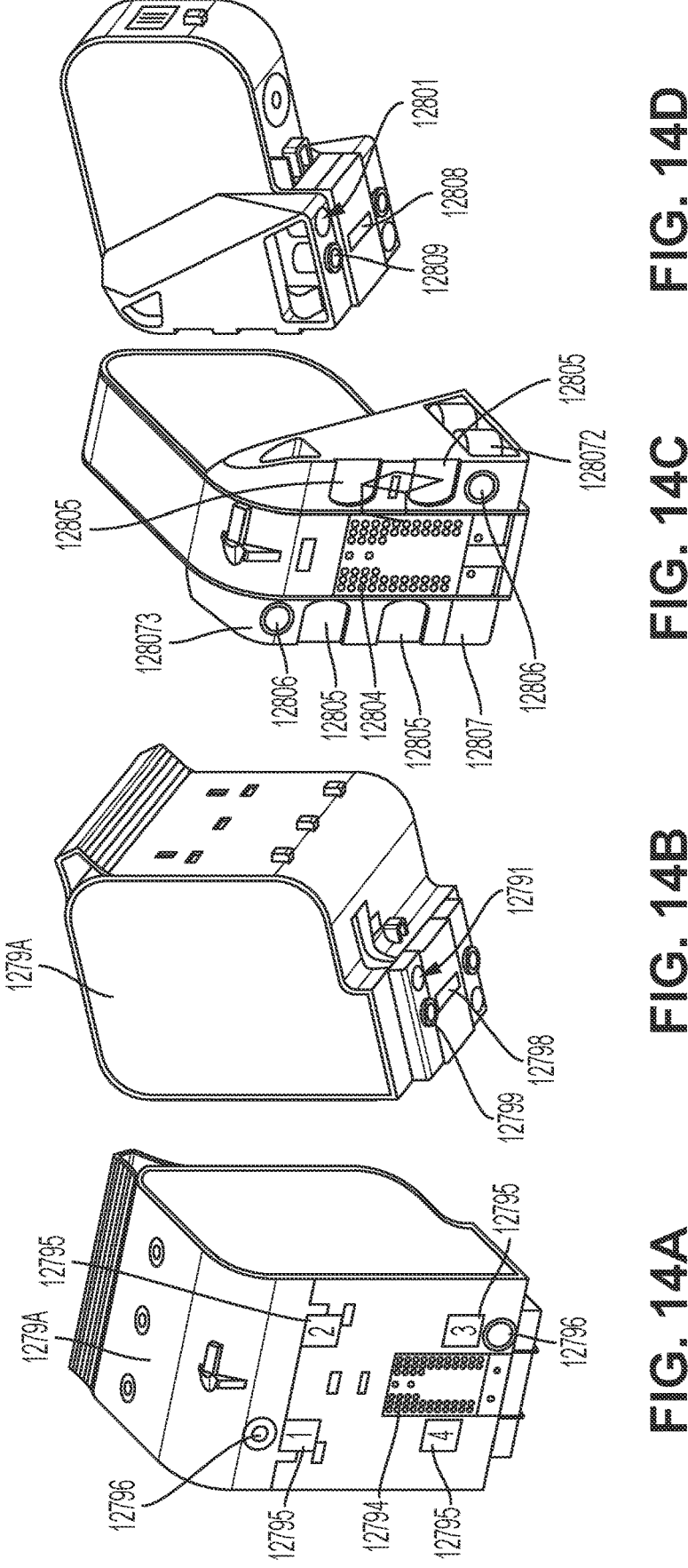
FIG. 14A shows a front side view of a first reagent cartridge that may be used in a printer in the humidor rack assembly of FIG. 11.
FIG. 14B shows a bottom side view of the first reagent cartridge of FIG. 14A that may be used in a printer in the humidor rack assembly of FIG. 11.
FIG. 14C shows a front side view of a second reagent cartridge that may be used in a printer in the humidor rack assembly of FIG. 11.
FIG. 14D shows a bottom side view of the first reagent cartridge of FIG. 14C that may be used in a printer in the humidor rack assembly of FIG. 11.

FIG. 14A and FIG. 14B show perspective side views of reagent cartridge 1279A. Reagent cartridge 1280A having a similar depth and width as reagent cartridge 1279A and a shorter height will have similar side views as in FIG. 14A and FIG. 14B. FIG. 14C and FIG. 14D show perspective side views of reagent cartridge 1281A, a third example of a reagent cartridge. Reagent cartridge 1281A has a depth on the order of 74.1 mm, a width of 38.8 mm and a height of 70.8 mm.

Figure 15:
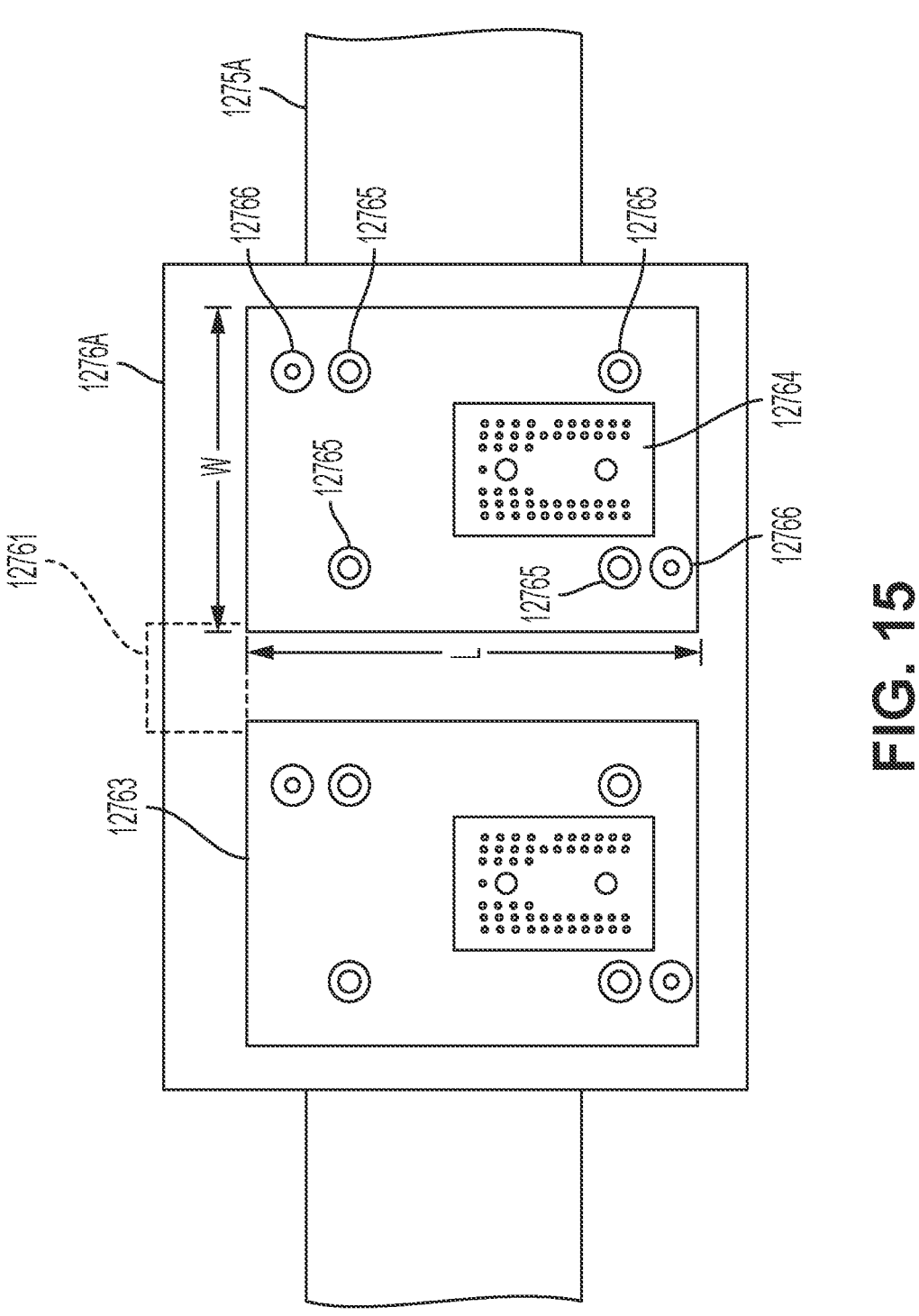
FIG. 15 shows a magnified front side view of a printer in the humidor rack assembly of FIG. 11 without a reagent cartridge connected to the printer.

Each reagent cartridge 1279A, 1280A and 1281A may contain a volume of a reagent and have a dedicated printhead. Each cartridge may be a single use cartridge. A single use cartridge in this context means that once the volume of the reagent in the cartridge is dispensed or used, the cartridge including its printhead is to be discarded or disposed of as opposed to being resupplied with a volume of reagent. An example of a single use cartridge is a thermal inkjet cartridge. Each of reagent cartridge 1279A, 1280A and 1281A may have an outer shell or body of a generally rectangular shape constructed of a plastic material (e.g., a hard plastic or polymer). FIG. 14A shows a back side of reagent cartridge 1279A that contacts and engages with printer 1276A. FIG. 14C similarly shows a back side of reagent cartridge 1281A that contacts and engages with printer 1276A. FIG. 15 shows a front side or face of printer 1276A without a reagent cartridge connected thereto. The front side or face of printer 1276A includes pocket or opening 12762 and pocket 12763 therein into each of which pocket or opening a reagent cartridge may be placed. Each pocket has a length, L, and a width, W, to accommodate a cartridge of dimensions of reagent cartridge 1279A (the taller of reagent cartridge 1279A and reagent cartridge 1280A and the taller and wider of reagent cartridge 1279A and 1281A). In one example, each pocket has a length dimension on the order of 72 mm and a width dimension, W, on the order of 60 mm. A base of each pocket includes electronic contacts or pins 12764 operable to mate with receptors on a back side of a reagent cartridge. A base of each pocket also includes four magnets 12765 each with a diameter on the order of, for example, 2 mm to 3 mm and spaced around contacts or pins 12764 and two alignment pins 12766 positioned diagonally on the base of each pocket.

Referring to FIG. 14A, reagent cartridge 1279A has length and width dimensions to fit snugly within either pocket 12762 or pocket 12763 of printer 1276A. A rear or backside of reagent cartridge 1279A includes electronic pin receptacles 12794 to mate with electronic contacts or pins 12764 in a pocket of printer 12764. A rear or backside of reagent cartridge 1279A also includes four strips, plates or sheets 12795 of a magnetic metal material (e.g., iron, steel) that will be attracted to a magnet inside a pocket of printer 1276A (e.g., magnet 12765). Each strip, plate or sheet 12795 has dimensions that coincide with a dimension of a magnet 12765. For example, if a magnet (magnet 12765) has a circular shape with a diameter of 2 mm to 3 mm, the strip, plate or sheet 12795 may have a circular shape with a similar representative diameter or a rectangular shape with length and width dimensions on the order of 2 mm to 3 mm. Each strip, plate or sheet 12795 is positioned around pin receptacles 12794 in a manner to be oriented with opposing magnets 12765 on or in a base of each pocket of printer 1276A. Magnets 12765 may serve to attract a reagent cartridge (e.g., reagent cartridge 1279A) to a correct position in a pocket in printer 1276A by attracting strips, plates or sheets 12795. A rear or backside of reagent cartridge 1279A also includes two diagonally spaced alignment sockets or openings 12796 that align with alignment pins 12766 on or in a base of each pocket. Alignment pins 12766 may aide in the alignment of reagent cartridge 1279A into a pocket of printer 1276A. It is appreciated that the magnets in the base of each pocket of the printer and the strips, plates or sheets 12795 in or on a backside of reagent cartridge 1279A could be reversed (e.g., the magnets could be in or on a backside of reagent cartridge 1279A and the strips, plates or sheets could be in or on a base of each pocket of printer 1276A). A backside of reagent cartridge 1280A includes similar components (e.g., pin receptacles; strips, plates or sheets; and alignment sockets or openings) oriented in a similar way as reagent cartridge 1279A.

As noted above, printer 1276A has pocket or opening 12762 and 12763 that each have a similar length and width dimension similar in size to reagent cartridge 1279A. FIG. 14C shows reagent cartridge 1281A that has a smaller height dimension than reagent cartridge 1279A (e.g., 70.8 mm compared to 98.5 mm) and a smaller width dimension (e.g., 38.8 mm width compared to 58 mm width of reagent cartridge 1279A). A rear or backside of reagent cartridge 1281A includes electronic pin receptacles 12804 to mate with electronic contacts or pins 12764 in a pocket of printer 12764 but an area of the rear or backside of reagent cartridge 1280A is not large enough to accommodate magnetic strips, plates or sheets or alignment sockets to attract and align the reagent cartridge into a pocket in printer 1276A. In order to take advantage of the attraction and alignment features, reagent cartridge 1281A may be fitted with optional spacer 12807 that, when fitted, a rear or backside surface of reagent cartridge 1281A is exposed and spacer provides additional width dimension to opposite sides (left and right sides) of the rear or backside of reagent cartridge, with the additional width dimension on each provided by a halve body (halve body 128072 and halve body 128073) each having a rear surface in a similar plane as a rear or backside of reagent cartridge 1281A. Spacer 12807 may be a plastic material of one piece with a connector over or under reagent container 1281A connecting the two halve bodies or the two halve bodies may not be connected (i.e., each halve body connects to respective opposite sides of reagent cartridge 1281A). Each halve body (halve body 128072 and halve body 128073) of reagent spacer 12807 includes two strips, plates or sheets 12805 and alignment socket 12806 to align/mate with magnets 12765 and alignment pins 12766, respectively, in a pocket of printer 1276A. As with reagent cartridge 1279A, each of strips, plates or sheets 12805 dimensions that coincide with a dimension of a magnet 12765. Spacer 12807 may be installed on reagent cartridge 1281A before the reagent cartridge is introduced into processing assembly 100 (e.g., an operator may attach spacer 12807 to reagent cartridge 1280A).

Referring to FIG. 14B and FIG. 14D, these figures show a base of reagent cartridge 1279A and reagent cartridge 1281A. A base of reagent cartridge 1280A would be similar to a base of reagent cartridge 1280A. A base of each reagent cartridge includes a printhead of a nozzle or an array of nozzles through which reagent is ejected or discharged through a thermal inkjet process. Reagent cartridge 1279A is shown with printhead 12798 and reagent cartridge 1280A is shown with printhead 12808. Each printhead includes a linear array (e.g., a single row or multiple rows) of nozzles allowing discharge of a reagent in a line(s) or row(s), such as across a slide. In a thermal inkjet printhead, heat may be used to create an air bubble of reagent vapor that is exploded as it is forced through a printhead nozzle. Each nozzle may have a diameter on the order of 20 microns to 80 microns, such as 20 microns to 50 microns. Referring to FIG. 12A, with slide positioned lengthwise in slide carrier 12728A (a length or longer dimension designated by "L"), a printhead of reagent cartridge 1279A is oriented into the page as viewed so that as the slide carrier is moved (e.g., moved toward humidor housing 12729A), reagent will be dispensed onto an upper surface of the slide (a surface having a sample thereon) between opposing side edges of the slide.

FIG. 14B and FIG. 14D also illustrate magnets fastened into a base of each cartridge. Magnets 12799 in reagent cartridge 1279A and magnets 12809 in reagent cartridge 1280A (e.g., two screws each) may be a material such as a ferromagnetic material (e.g., alnico or ferrite) that creates its own persistent magnetic field. Magnets 12799 and 12809 may respectively be utilized to secure a cap onto the base of each reagent cartridge as described below. FIG. 14B and FIG. 14D also illustrate alignment holes or divots 12791 in a base of reagent cartridge 1279A and alignment holes or divots 12801 in reagent cartridge 1281A. The two diagonally disposed alignment holes in the base of each reagent cartridge may be used to align a cap to a reagent cartridge through alignment pins in a cap as described below.

Referring again to FIG. 12A and FIG. 12B, a printing operation and storage operation is representatively shown. To load a slide onto slide carrier 12728A, instructions from processor 136 may direct bracket 12727A on slide carrier linear rail 12725A to move to a position away from humidor housing 12729A (an open position shown in FIG. 12A). A slide is then loaded onto slide carrier 12728A in staining module 1270 by robot mechanism 12552 of robot mechanism 1255 based on instructions from processor 136. Instructions from processor 136 may then direct bracket 12727A to move slide carrier 12728A to a position below humidor housing 12729A (a closed position shown in FIG. 12B) until the system is prepared to print or dispense reagent onto a portion of a sample on the slide. When the system is prepared to print or dispense reagent onto a portion of a sample on the slide, instructions from processor 136 will direct bracket 12727A to move slide carrier 12728A to the open position away from humidor housing 12729A (the open position shown in FIG. 12A). Instructions from processor 136 will also direct the movement of printer 1276A along ink cartridge rail 12725A to a position above slide carrier 12728A such that reagent cartridge 1279A or reagent cartridge 1280A/reagent cartridge 1281A in printer 1276A is over the sample on the slide. FIG. 12A shows reagent cartridge 1279A over or above slide carrier 12728A. Further instructions will then direct the dispensing of reagent onto a slide in slide carrier 12728A (onto a portion of the sample on the slide). During a printing or dispensing operation, instructions from processor 136 may direct bracket 12727A to move along slide carrier linear rail 12725A under the printhead of reagent cartridge 1279A so that a desired portion or area of a sample on a slide receives reagent. As described above with respect to FIG. 14B and FIG. 14D, a printhead may include a linear array (e.g., a single row or multiple rows) allowing discharge of a reagent in a line(s) or row(s), such as across a slide. A movement of bracket 12727A along slide carrier linear rail 12725A may be controlled by processor 136 to allow a desired area of a sample to receive reagent in a line-by-line or sweeping action.

As described above, humidor rack assembly 1272 may include multiple ink cartridge rails, each respectively above (in a z-direction) a horizontal support and slide carrier linear rail. In one example, each ink cartridge rail contains one printer that is capable of holding one or more reagent cartridge and dispensing reagent therefrom. Printer 1276A is representative and as shown in FIG. 13, printer 1276A can hold two reagent cartridges. Referring to FIG. 11, there is shown five ink cartridge rails (ink cartridge rail 1275A, ink cartridge rail 1275B, ink cartridge rail 1275C, ink cartridge rail 1275D and ink cartridge rail 1275E) each containing a printer that can dispense a reagent onto a sample on a slide positioned in a platen on a slide carrier linear rail directly below the printer. FIG. 11 shows three slide carrier linear rails in each row defined by a horizontal support in humidor rack assembly 1272. As noted, each row may contain one, two, three, four, five or more slide carrier linear rails in a row with a slide platen connected to each slide carrier linear rail. By providing a linearly (x-direction) translatable printer on each ink cartridge rail, the system allows for multiple slides to be processed at the same time.

Figure 16:
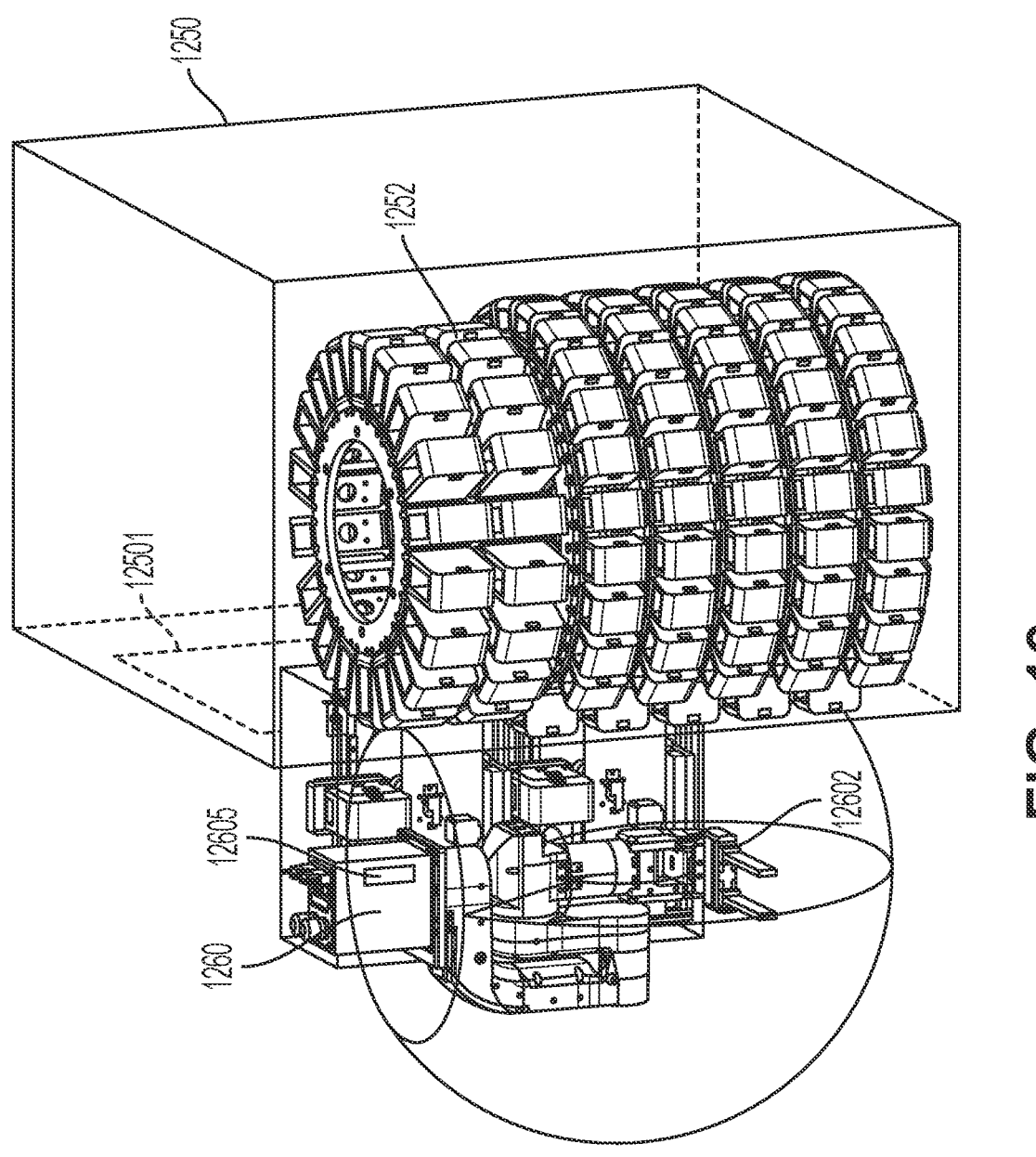
FIG. 16 shows a magnified front side view of a reagent storage cabinet and a robot mechanism adjacent the reagent storage cabinet that are each housed in the staining module or portion of the processing assembly of FIG. 1 and the reagent storage cabinet includes a carousel therein to contain reagent cartridges.
Figure 18:
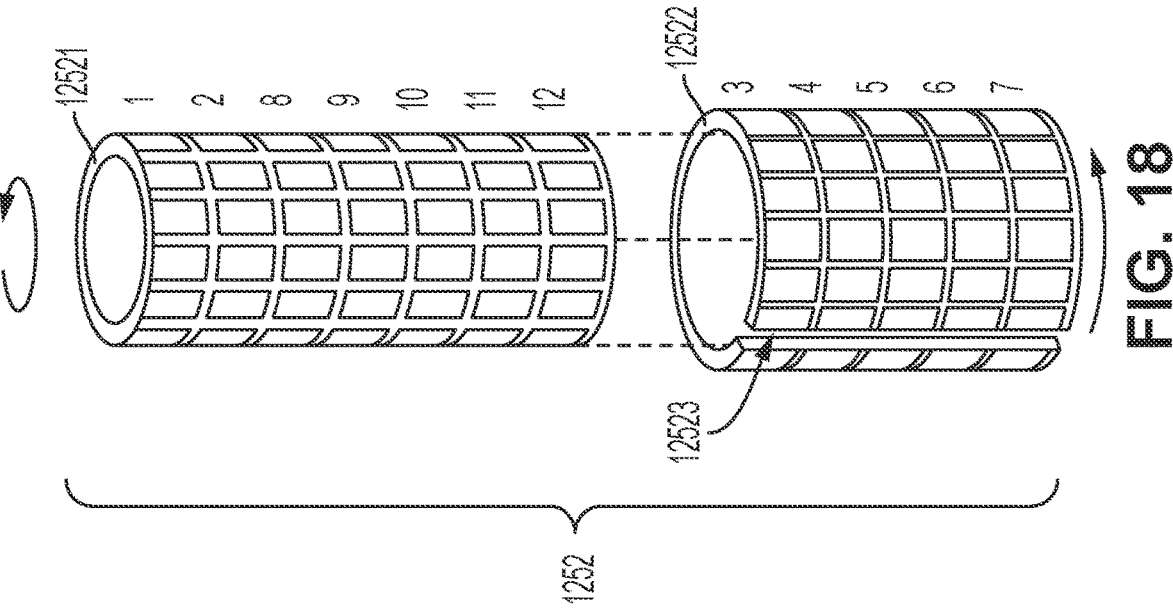
FIG. 18 shows an exploded front side view of the carousel of FIG. 17.
Figure 17:
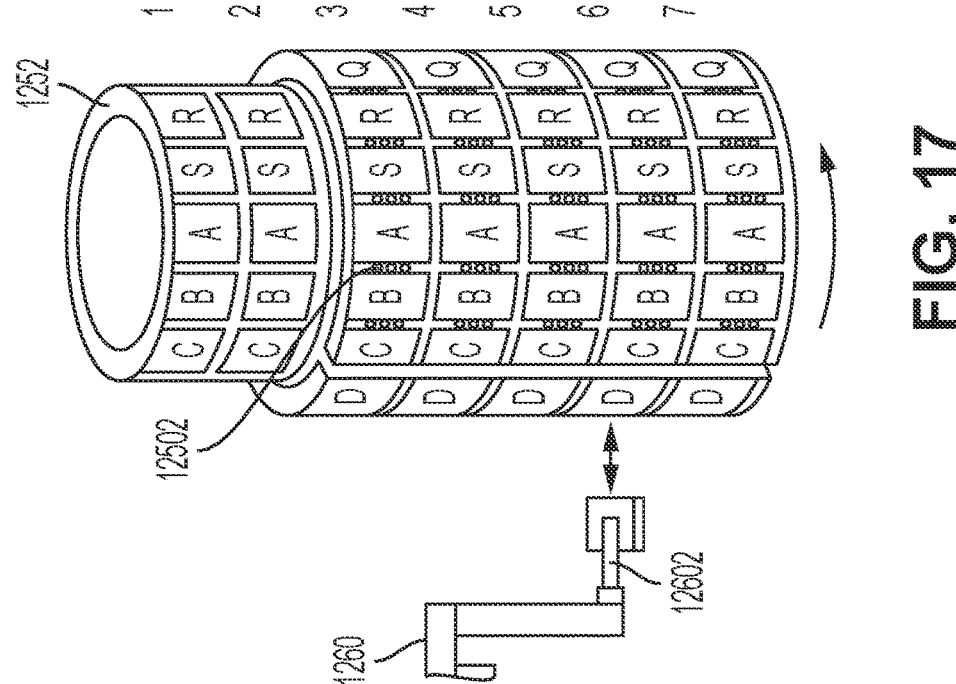
FIG. 17 shows a top front side view of a carousel that may be in the reagent storage cabinet of FIG. 16.

Referring to FIG. 2, adjacent printing station 1270 is reagent storage cabinet 1250. Reagent storage cabinet 1250 may be a refrigerated cabinet having slots to store a number of reagent cartridges therein. Each reagent cartridge may contain a volume of a reagent and have a dedicated printhead and may be stored in storage cabinet 1250 with a cap on or over its respective printhead. FIG. 16 shows an example of reagent storage cabinet 1250. In this example, reagent storage cabinet includes carousel 1252 on which reagent cartridges are stored. Carousel 1252 may comprise a tubular structure with slots in rows around the tubular structure into which reagent cartridges may be placed. Carousel 1252 may be connected at its base to a rotation mechanism such as a motorized belt and pulley system that is controlled by processor 136. FIG. 16 representatively shows a carousel with seven rows of slots and 18 slots around each row. Each slot may have an address so that a location of a reagent cartridge in the carousel may be known and located. FIG. 17 representatively shows an empty carousel. For an addressing example, FIG. 17 shows that the rows are numbered 1 to 7 and the slots in each row labeled A to S. FIG. 16 and FIG. 17 also show a configuration where carousel 1252 may optionally be structured so that larger reagent cartridges such as reagent cartridge 1279A (e.g., having a width of 58 mm and a height of 98.5 mm) may be stored in rows 1 and 2, while smaller reagent cartridges such as reagent cartridge 1280A (e.g., having a width of 58 mm and a height of 70 mm) or reagent cartridge 1281A (e.g., a width of 38.8 mm and a height of 70.8 mm) are stored in rows 3 through 7. In another example, reagent cartridges are not separated in carousel 1252 by their dimensions. In one example, as shown in the exploded view in FIG. 18, carousel 1252 is comprised of inner carousel 12521 and outer carousel 12522. When assembled, a portion of inner carousel 12521 is exposed above (e.g., inner carousel 12521 is taller than outer carousel 12522 so that two rows of inner carousel 12521 are above outer carousel 12522 when assembled). In this example, inner carousel 12521 includes rows 1 and 2 as described plus rows 8 through 12 to hold additional reagent cartridges. In the example of an inner and outer carousel, access may be provided to slots/reagent cartridges on rows 8 through 12 of inner carousel 12521 through opening 12523 along a length of outer carousel 12522. Opening 12523 may be wide enough for a robot arm or end effector to place/remove a reagent carousel in/from a slot in one of rows 8 through 12 of inner carousel 12521. Further, inner carousel 12521 and outer carousel 12522 may rotate independently, such as through independent rotation mechanisms (e.g., belt and pulley mechanisms at a base of each of inner carousel 12521 and outer carousel 12522) that rotate independently based on instructions from processor 136. Each slot in carousel 1252 (e.g., each slot in inner carousel 12521 and outer carousel 12522) may be configured with a magnet and alignment pin configuration similar to a pocket in a printer (see pocket 12762, FIG. 15) to attract and secure a reagent cartridge therein.

Cabinet 1250 that houses carousel 1252 may be a refrigerated cabinet and include a refrigeration system to keep a temperature of the cabinet at, for example, 40° C. One example refrigeration system may include, among other components, a refrigerant that changes from liquid to gas; a compressor to convert the refrigerant gas to a refrigerant liquid; a condenser to cool the refrigerant gas into the refrigerant liquid; and a power source. Cabinet 1250 may include door 12501 (e.g., an automatic sliding door) through which reagent cartridges may be introduced into or taken from carousel 1252.

Positioned adjacent a door side of cabinet 1250 may be robot mechanism 1260. Robot mechanism 1260 may include controller 12605 that communicates with processor 136 and end effector 12602 that includes two blades extending therefrom and separated by a distance to allow end effector 12602 through the blades to grasp opposite sides of a reagent cartridge. Robot mechanism 1260 may include a multi-joint arm having, for example, three, four or six or more rotational joints that permit movement of the arm in arcuate paths about a horizontal plane or rotary action along a joint axis. A translational or prismatic joint permits movement of the arm in an axial direction (along a joint axis). FIG. 17 shows end effector 12602 at an end of the arm of robot mechanism 1260 gripping a reagent cartridge and placing the reagent cartridge into a slot in carousel 1252 or removing a reagent cartridge from a slot in carousel 1252.

As described above, the slots in carousel 1252 of storage cabinet 1250 may be arranged in a series of rows and columns with each slot being addressed by its row and column. Addresses may be stored in processor 136. Each cartridge may include an identifier such as a machine-readable identifier (e.g., one dimensional or two-dimensional bar code). The identifier may include a lot number and a unique serial number. The identifier may be read (e.g., read by a barcode reader or scanner) prior to being stored in storage cabinet 1250 (e.g., read by a barcode reader or scanner outside processing assembly 100. The reading may be transmitted and stored in processor 136. The identifier may also provide information such as an expiration date of a reagent and/or a number of operations (prints) that can be performed with the cartridge. Processor 136 may assign the cartridge an address (row and column address) of a slot in storage carousel 1252. A display screen on interface 135 may depict the slots and the cartridges therein. An alarm or display indicator on interface 135 may provide an alert when a cartridge that should be present is not in an assigned slot.

Referring again to FIG. 2, reagent cartridges to be placed in carousel 1252 of cabinet 1250 may be delivered to processing assembly 100 by an operator or robot. When loading, an operator or robot may deliver one or more reagent cartridges to inlet 1251. A robot apparatus operable to deliver reagent cartridges to processing assembly 100 is described in Application No. PCT/IB2020/059562, filed 12 Oct. 2020 and titled "Automatic Transfer Between Tissue Processing Modules," which is incorporated herein by reference. On processing platform 1201 of staining module 1201 within inlet 1251 and a portion of shelf 112 may be conveyor 12512 such as a belt conveyor system. Conveyor 12512 may include two or more pulleys with a closed loop of a belt that rotates about the pulleys. The pulleys are disposed below shelf 112/processing platform 1201 so that an upper or exposed side of the belt may be in a plane with shelf 112/processing platform 1201. The conveyor belt may have a width approximately as wide as inlet 1251 to allow one or more reagent cartridges to be placed thereon and may have an outer (upper) surface that is in a plane similar to the plane of processing platform 1201. One or both pulleys may be connected to a motor to rotate the pulley(s) forward (into staining module 120) or backward (out of staining module 120). A motor may be connected to processor 136. Executable instructions in processor 136 may include instructions to cause the belt of conveyor system 12512 to move forward or backward. A sensor associated with the belt or on a side of inlet 1251 (e.g., a photo-eye sensor) may sense the presence of the baskets and communicate with processor 136. In response to the presence of one or more reagent cartridges (e.g., basket 210C, basket 210D and basket 210E) at inlet 1251, executable instructions in processor 136 may cause one or both pulleys of conveyor 12512 to rotate the belt and bring the one or more reagent cartridges into staining module 120. Instructions from processor 136 may then direct robot mechanism 1260 to grasp an introduced reagent cartridge by end effector 12602 and place the reagent cartridge into storage cabinet 1250 or at a location so that it can be brought to printing station 1270 before going to storage cabinet 1250. If instructions from processor 136 are to place an introduced reagent cartridge into storage cabinet 1250, the instructions will further provide an address in carousel 1252 where the reagent cartridge is to be placed. In addition to placing reagent cartridges in storage cabinet 1250, robot mechanism 1260 may be used to transfer a reagent cartridge from printing station 1270 or storage cabinet 1250 to conveyor 12512 for removal from staining module 120 of processing assembly 100 if the reagent cartridge is, for example, expired or otherwise no longer useable (e.g., the reagent cartridge is empty) or no longer needed. Instructions from processor 136 may then direct conveyor 12512 to rotate its pulley(s) to move the belt backward toward inlet 1251.

Figure 19:
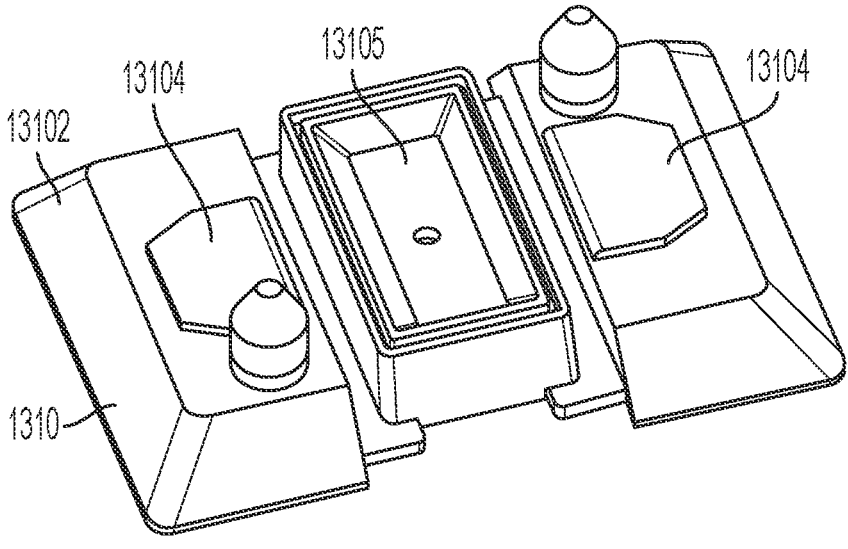
FIG. 19 shows a top perspective view of a cap for a reagent cartridge printhead suitable for the first or second reagent cartridges shown in FIGS. 14A-14D.
Figure 20:
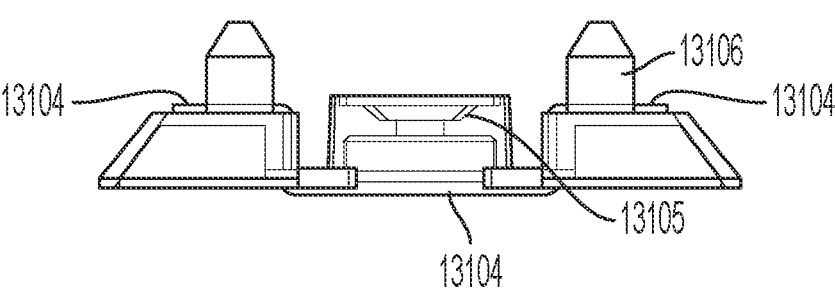
FIG. 20 shows a cross-sectional side view of a cap for a reagent cartridge printhead suitable for the first or second reagent cartridges shown in FIGS. 14A-14D.

Reagent cartridges are delivered to printing module 120 of processing assembly 100 with a cap covering a printhead. Reagent cartridges are also stored in cabinet 1250 with their respective cap in place covering the printhead. As described above with reference to FIG. 14B and FIG. 14D, reagent cartridges (e.g., reagent cartridge 1279A and reagent cartridge 1281A) include magnets fastened into a base of each cartridge. Magnets 12799 in reagent cartridge 1279A and magnets 12809 in reagent cartridge 1281A may be utilized to secure a cap onto the base of each reagent cartridge. Reagent cartridge 1280A will have a base similar to reagent cartridge 1279A. FIG. 19 and FIG. 20 show a top perspective side view and a side view of a cap that may be utilized on a reagent cartridge (e.g., reagent cartridge 1279A, reagent cartridge 1280A, reagent cartridge 1281A). Cap 1310 includes plastic housing 13102 that defines a generally linear base with two plateaus separating a midsection. Disposed in and across the plateaus and midsection in plate 13104 of a magnetic material such as iron (e.g., steel). The magnetic material of plate 13104 will be attracted to the magnets at the base of each reagent cartridge to secure the cap to a reagent cartridge. It is appreciated that the magnets in the base of each reagent cartridge and the magnetic material in cap 1310 could be reversed (e.g., the magnets could be in cap 1310 and a magnetic material that is attracted to the magnets could be in the base of each reagent cartridge). Disposed in the midsection of cap 1310 is vessel 13105 of an elastomeric material such as silicone rubber. Vessel has length and width dimensions to contain a printhead of reagent cartridge 1279A, reagent cartridge 1280A or reagent cartridge 1281A therein. Finally, FIGS. 19 and 20 show cap 1310 having two diagonally disposed alignment pins 13106 that may be used to align cap 1310 to a reagent cartridge through alignment holes or divots in a base of the printhead.

Figure 21:
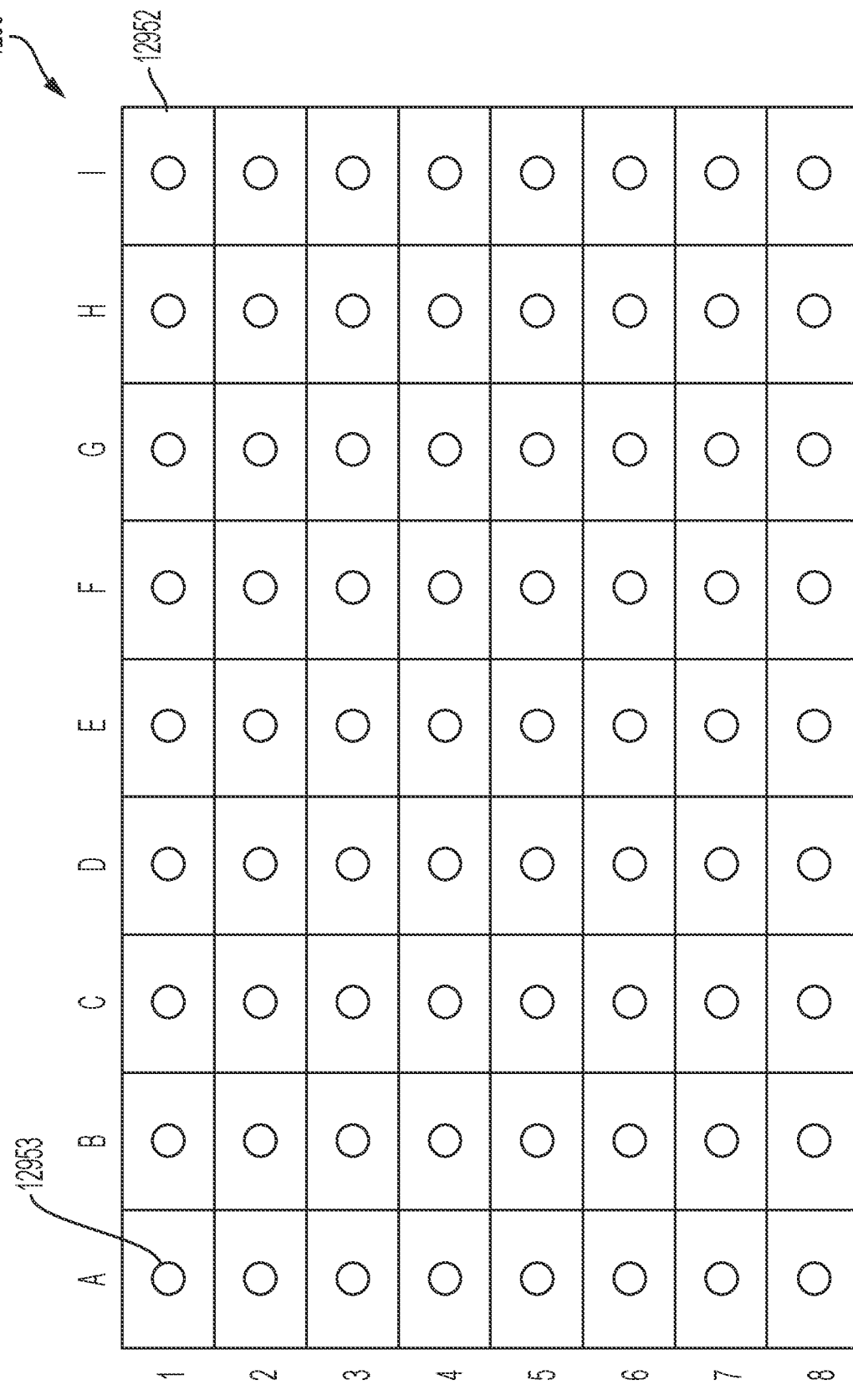
FIG. 21 shows a top view of a cap removal and storage station housed in the staining module or portion of the processor assembly of FIG. 1, the cap removal and storage station comprised of an array of cells each cell capable of containing a cap of a reagent cartridge.
Figures 22, 23, 24:
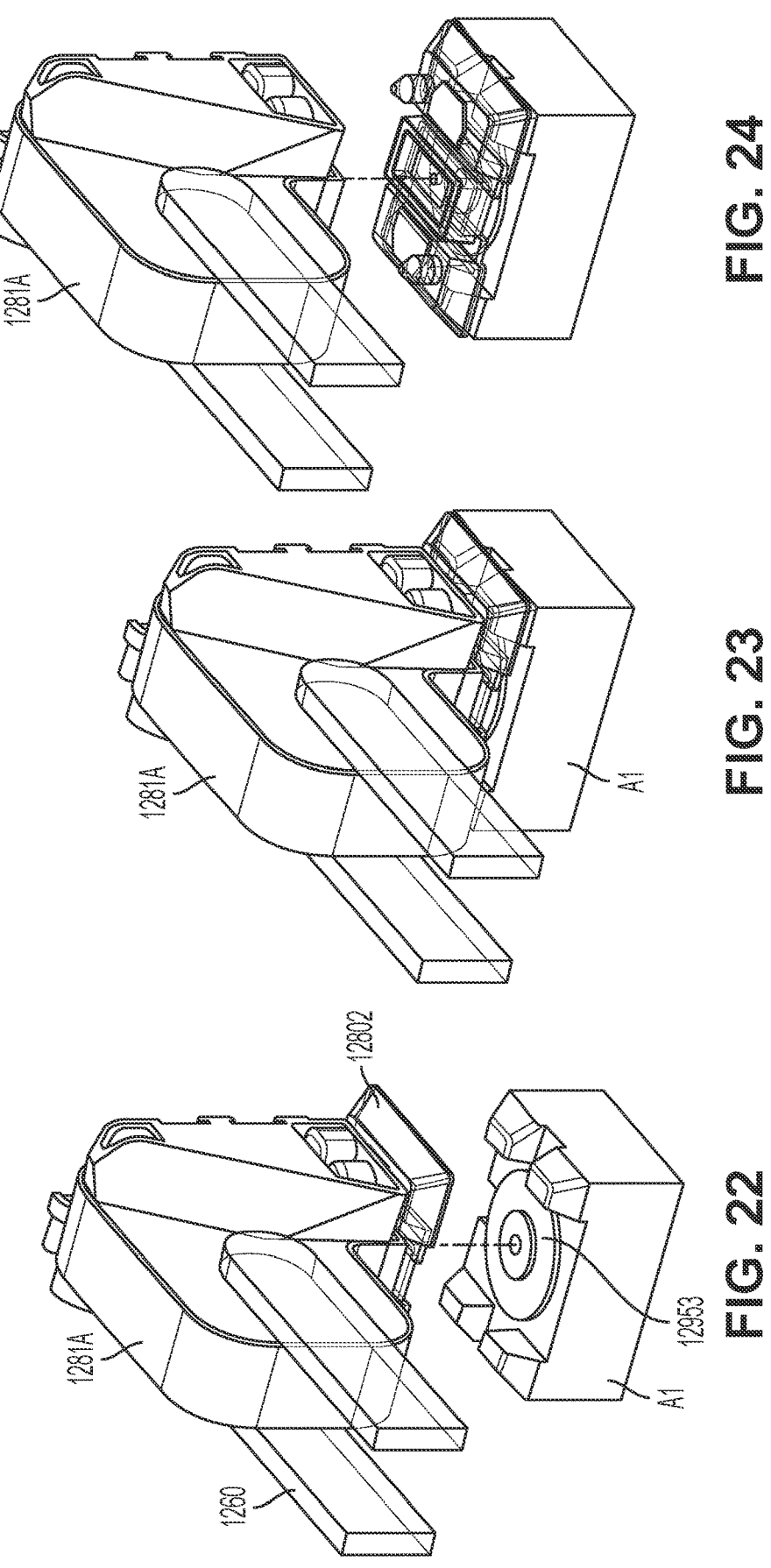
FIG. 22 shows a cell of the cap removal and storage station of FIG. 21 and a reagent cartridge over the cell in a process of removing a cap covering a printhead of the reagent cartridge.
FIG. 23 shows the cell and reagent cartridge of FIG. 22 following the placing of the cap in the cell in a process of removing a cap covering a printhead of the reagent cartridge.
FIG. 24 shows the cell and reagent cartridge of FIG. 22 following the removal and retention of the cap in the cell and the separation of the reagent cartridge from the cell in a process of removing a cap covering a printhead of the reagent cartridge.

A cap covering a printhead of a reagent cartridge must be removed before the reagent cartridge is loaded onto a printer in printing station 1270 (e.g., printer 1276A). FIG. 2 shows cap removal and storage station 1295 adjacent printing station 1270 and storage cabinet 1250. FIG. 21 shows a top side view of an example of a representation of cap removal and storage station 1295. In this example, cap removal and storage station 1295 includes area 12952 that is a grid framework defining a number of cells, with each cell having an area large enough to contain a reagent cartridge cap therein. Each cell may have an address, representatively illustrated by row number and column letter. The address allows the location of a cap of a reagent cartridge to be stored, for example, in memory 137 and accessed by processor 136 so that a stored cap can be returned to the same reagent cartridge when desired. Each cell contains a solenoid (see solenoid 12953 in cell A1) that is operable to be electrically actuated on to override, demagnetize or reverse a magnetic attraction of metal in a cap to magnets in a base of a reagent cartridge. FIG. 22 shows a side perspective view of cell A1 of area 12952 of cap and removal station 1295 and together with FIG. 23 and FIG. 24 show an operation of removing a cap from a reagent cartridge. In FIG. 22, solenoid 12953 in cell A1 may be off (actuated off by processor 136) and no cap is stored in the cell. FIG. 22 shows reagent cartridge 1281A, for example, having cap 12802 at its base covering its printhead. Reagent cartridge 1281A may be positioned above cell A1 by robot mechanism 1260. Cap 12802 must be removed for reagent cartridge 1281A to be used in a printing operation. As described above with reference to FIG. 14B and FIG. 14D, reagent cartridges (e.g., reagent cartridge 1279A, reagent cartridge 1280A, reagent cartridge 1281A) include magnets fastened into a base of each cartridge that secure a cap to the reagent cartridge by magnetic attraction. FIG. 23 shows robot mechanism 1260 having placed reagent cartridge 1281A in cell A1 or cap and removal station 1295. Once the reagent cartridge is placed with its cap in the cell, instructions from processor 136 may actuate solenoid 12953 to demagnetize or otherwise overcome or negate the magnetic attraction between magnets 12809 in a base of reagent cartridge 1281A and its cap. One example is instructions from processor 136 to pass an alternating current through solenoid 12953 to demagnetize or otherwise overcome or negate the magnetic attraction between magnets 12809 in a base of reagent cartridge 1281A and its cap. Following the demagnetization or overcoming of the magnetic attraction between the reagent cartridge and the cap, FIG. 24 shows robot mechanism 1260 separating reagent cartridge 1281A from cap 12802. Reagent cartridge 1281A may then be taken to printing station 1270 or service station 1290 (see FIG. 2). Cap 12802 may stay in cell A1 in cap removal and storage station 1295 until the reagent cartridge is to be returned to storage cabinet 1250 or discarded (discharged from staining module 120 of processing assembly 100) at which time the same cap is reattached to reagent cartridge 1281A by reversing the steps described with reference to FIGS. 22-24.

Figure 25:
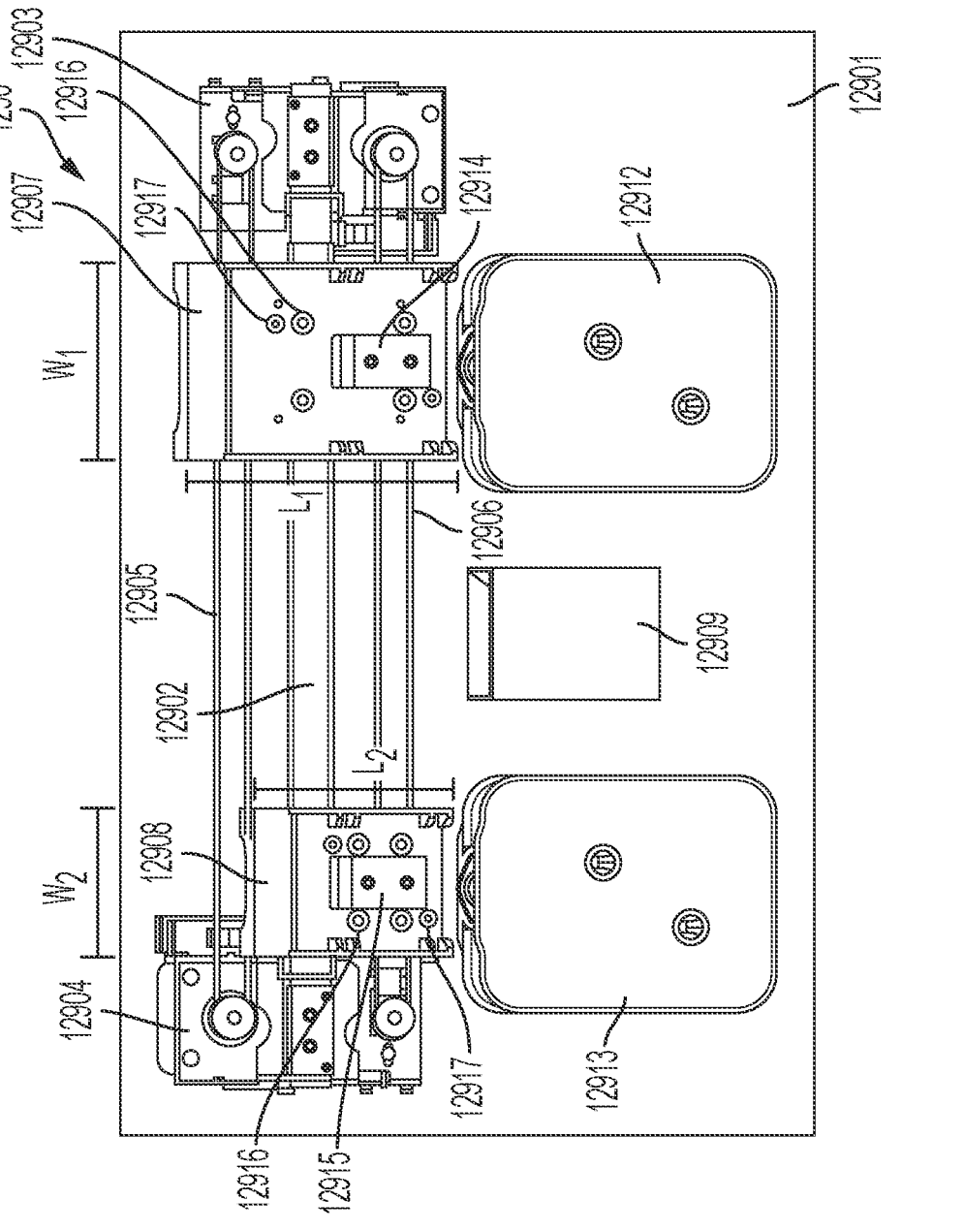
FIG. 25 shows a side view of a service station housed in the staining module or portion of the processing assembly of FIG. 1, the service station including two reagent cartridge carriages, a spittoon and two wiper assemblies.

Before a reagent cartridge is delivered to printing station 1270 or returned to storage cabinet 1250 from printing station 1270, the reagent cartridge may go to a service station. FIG. 2 shows service station 1290 adjacent cabinet 1250. Service station 1290 provides an area where a printhead of a reagent cartridge may tested and cleaned prior to and/or after use in printing station 1270. FIG. 25 shows a front side view of service station 1290. Service station 1290 in this example includes a rear wall 12901. Connected to rear wall 12901 are pulley support 12903 and pulley support 12904. Each of pulley support 12903 and pulley support 12904 include an upper roller and a lower roller. Disposed on the upper roller of each of pulley support 12903 and pulley support 12904 is belt 12905. Disposed on the lower roller of each of pulley support 12903 and pulley support

12904 is belt 12906. Disposed between and connected to each of pully support 12903 and pully support 12904 is rail 12902. Slidably connected to rail 12902 and belt 12905 and belt 12906 are carriage 12907 and carriage 12908. Carriage 12907 and carriage 12908 may have a configuration to secure a reagent container similar to a pocket of printer 1276 (see FIG. 15). Carriage 12907 has a length, $L_1$, and a width, $W_1$, for a reagent cartridge of a first size, such as reagent cartridge 1280A (e.g., $L_1$ of 100 mm and $W_1$ of 60 mm) and carriage 12908 has a length, $L_1$, and a width, $W_1$, for a reagent cartridge of a second size, such as reagent cartridge 1280A (e.g., $L_2$ of 72 mm and $W_2$ of 60 mm). It is noted in this example that carriage 12907 and carriage 12908 have similar width dimensions since a smaller cartridge such as reagent cartridge 1280A may be placed into carriage 12908 with a spacer on the reagent cartridge (e.g., spacer 12807) that extends the width of the reagent cartridge.

A base or backside as viewed of each of carriage 12907 and carriage 12908 includes electronic contacts or pins operable to mate with receptors on a back side of a reagent cartridge. FIG. 25 shows contacts or pins 12914 in carriage 12907 and contacts or pins 12915 in carriage 12908. A base of each pocket also includes four magnets 12916 each with a diameter on the order of, for example, 2 mm to 3 mm and spaced around their respective contacts or pins and two alignment pins 12917 positioned diagonally on the base of each carriage.

In one example, reagent cartridge 1279A has length and width dimensions to fit snugly within carriage 12907. As described above with respect to FIG. 14A, rear or backside of reagent cartridge 1279A includes electronic pin receptacles 12794 to mate with electronic contacts or pins 12764 in carriage 12907. A rear or backside of reagent cartridge 1279A also includes four strips or plates or sheets 12796 that will be attracted to a magnet inside carriage 12907 (e.g., magnet 12916). Magnets 12916 may serve to attract a reagent cartridge (e.g., reagent cartridge 1279A) to a correct position in carriage 12907 by attracting strips, plates or sheets 12796 in reagent cartridge 1279A. A rear or backside of reagent cartridge 1279A also includes two diagonally spaced alignment sockets or openings 12796 that align with alignment pins 12917 in carriage 12907 to aide in the alignment of reagent cartridge 1279A into carriage 12907. Reagent cartridge 1280A includes a similar backside configuration as reagent cartridge 1279A to engage with carriage 12907.

As described above with respect to FIG. 14C, reagent cartridge 1281A may have a smaller width dimension (e.g., 38.8 mm width compared to 58 mm width of reagent cartridge 1279A). A rear or backside of reagent cartridge 1281A includes electronic pin receptacles 12804 to mate with electronic contacts or pins 12915 in carriage 12908 but an area of the rear or backside of reagent cartridge 1281A is not large enough to accommodate magnetic strips, plates or sheets or alignment sockets to attract and align the reagent cartridge into carriage 12908. In order to take advantage of the attraction and alignment features in carriage 12908, reagent cartridge 1281A may be fitted with optional spacer 12807 that, when fitted, a rear or backside surface of reagent cartridge 1281A is exposed and spacer 12807 provides additional width dimension to opposite sides (left and right sides) of the rear or backside of reagent cartridge, with the additional width dimension on each provided by a halve body (halve body 128072 and halve body 128073) each having a rear surface in a similar plane as a rear or backside of reagent cartridge 1281A. Each halve body (halve body 128072 and halve body 128073) of reagent spacer 12807 includes two strips, plates or sheets 12805 and alignment socket 12806 to align/mate with magnets 12765 and alignment pins 12766, respectively, in carriage 12908.

FIG. 25 shows each of carriage 12907 and carriage 12908 connected to pulley support 12903 and pulley support 12904 through belt 12905 and belt 12906. Belt 12905 and belt 12906 may independently move or translate carriage 12907 and carriage 12908 laterally along rail 12902. Such movement allows each of carriage 12907 to bring a reagent container attached thereto to spittoon 12909 and to a wiping station (wiping station 12912 or wiping station 12913). Each carriage may be electrically connected and communicate with processor 136. Carriage 12907 and carriage 12908 contain electronics to operate a reagent cartridge similar to printer 1276 to dispense reagent. When a reagent cartridge is connected to carriage 12907 or carriage 12908, instructions from processor 136 can direct the dispensing of reagent from the reagent cartridge, for example, into spittoon 12909.

Figure 26:
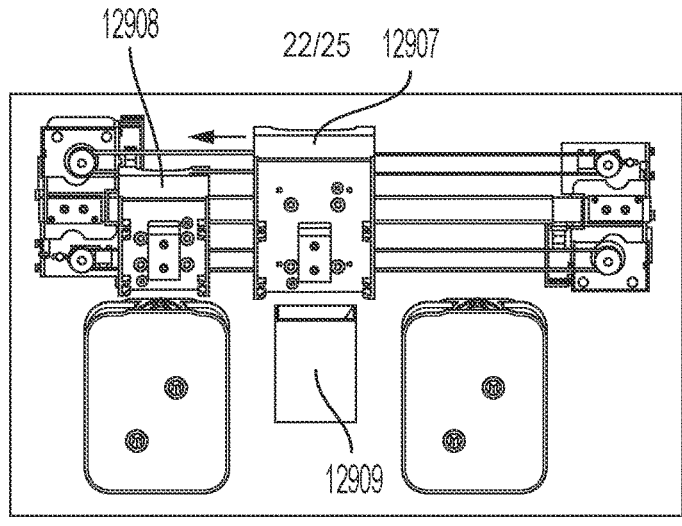
FIG. 26 shows a movement of one of the two reagent cartridge carriages over the spittoon in the service station of FIG. 25 in a process to load a reagent cartridge therein and service the reagent cartridge.
Figure 27:
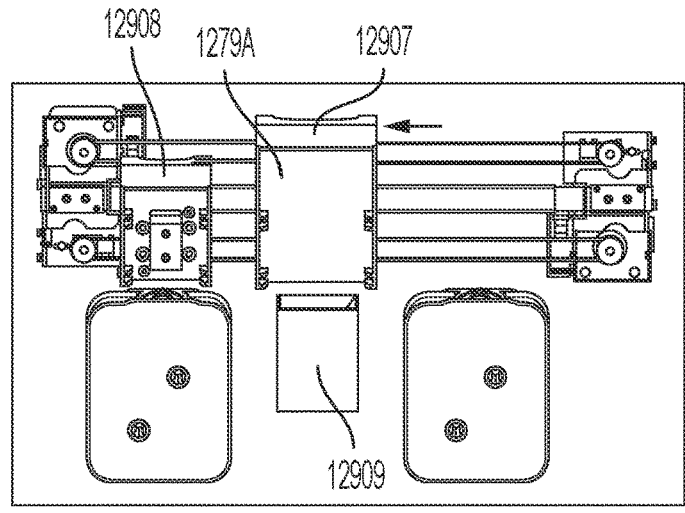
FIG. 27 shows the service station of FIG. 26 following the attachment of a reagent cartridge to the reagent cartridge carriage over the spittoon in a process to service the reagent cartridge.
Figure 28:
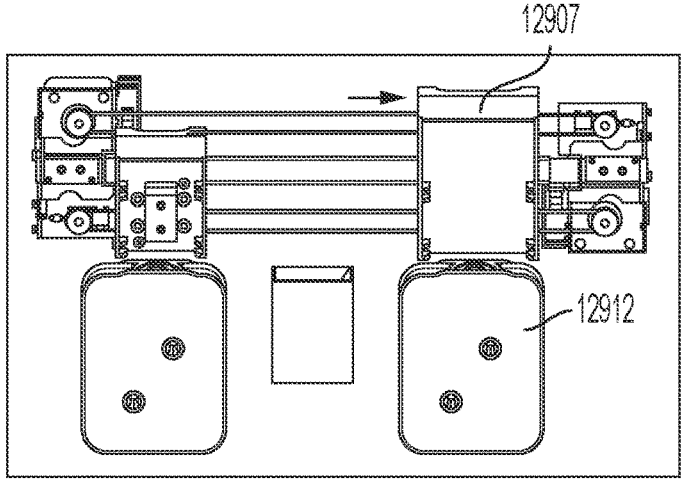
FIG. 28 shows a movement of the reagent cartridge carriage from over the spittoon to a wiping station in the service station of FIG. 25 in a process to service the reagent cartridge.
Figure 29:
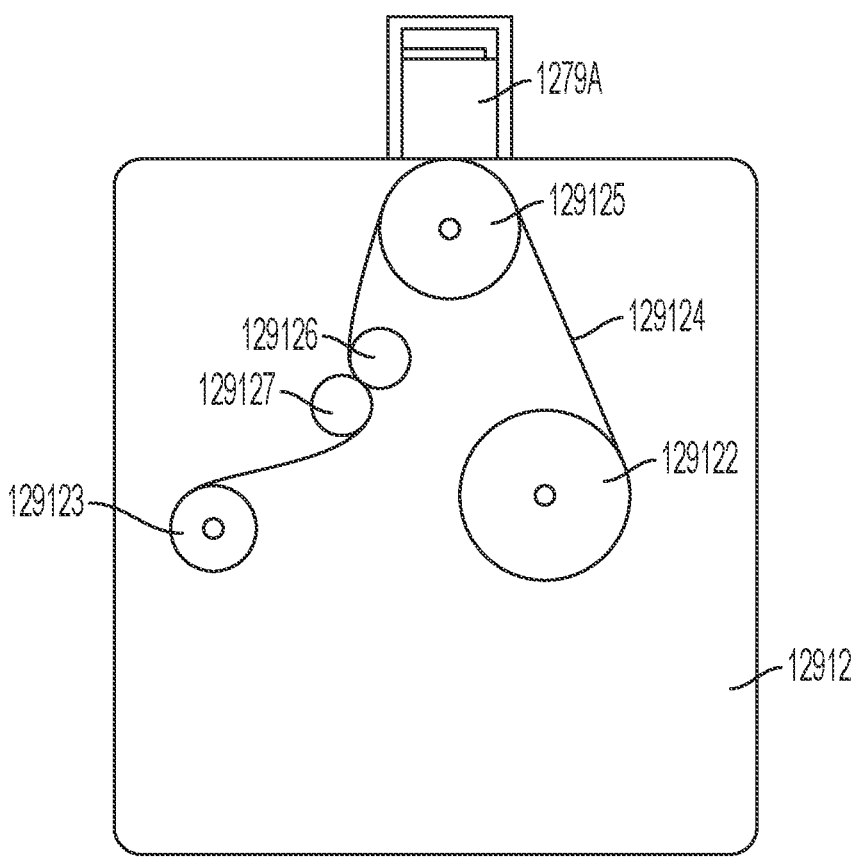
FIG. 29 shows a magnified front side view of a wiping station in the service station of FIG. 25 with a front cover of the wiping station removed.

FIG. 26, FIG. 27 and FIG. 28 show operations occurring at service station 1290. In a method of operation, instructions from processor 136 may direct a movement of one of carriage 12907 or carriage 12908 by belts 12905 and 12906 over spittoon 12909. FIG. 26 shows carriage 12907 brought to a region above spittoon 12909. At that time or a time before or after, instructions from processor 136 may also direct robot mechanism 1260 to remove a cap from a reagent container in cap removal and storage station 1295 and, once the cap is removed, to install the reagent cartridge in the moved carriage (e.g., carriage 12907). FIG. 27 shows reagent cartridge 1279A installed in carriage 12907 over spittoon 12909. Instructions from processor 136 may then include instructions to direct electronics in carriage 12907 to cause reagent cartridge to dispense or spit an amount of reagent into spittoon 12909 (e.g., an amount sufficient to wet the printhead and ensure it is not clogged). Following a dispensing operation, instructions from processor 136 may direct that reagent container 1279A be brought to a wiping station that can clean residual reagent on the printhead of reagent container 1279A through a wiping action. FIG. 28 shows reagent cartridge 1279A in carriage 12907 over wiping station 12912. Wiping station 12912 contains a ribbon of fabric, tape or other absorbent material exposed at its superior surface. A width of the ribbon may be at least as wide as a printhead of a reagent cartridge. FIG. 29 shows a front view of wiping station 12912 with its front cover removed. Wiping station includes feed roller 129122 including a ribbon 129124 wrapped around the roller. Ribbon 129124 is fed from feed roller 129122 onto contact roller 129125, through a series of tension rollers 129126 and 129127 and on to take-up roller 129123. Contact roller 129125 is shown at a top of wiping station 12912 and positioned so that ribbon on the contact roller may contact a printhead of reagent cartridge 1279A. In one example, at contact, ribbon 129124 does not move, but a printhead of reagent cartridge 1279A moves on ribbon 129124 in a wiping motion (e.g., left to right). Following the contact, reagent cartridge 1279A is moved away from wiping station toward spittoon 12909 as shown in FIG. 27. Ribbon 129124 may then be advanced from feed roller 129122 to take-up roller 129123 to provide a clean area of ribbon for wiping another printhead. In another example, a printhead of reagent cartridge 1279A is brought into contact with ribbon 129124 and momentarily remains in a static position. Ribbon 129124 is then advanced from feed roller 129122 to take-up roller 129123. After the advancement, reagent cartridge 1279A is moved away from wiping station toward spittoon 12909. Ribbon 129124 may be advanced in the first example or advance further, if necessary, in the second example to provide a clean area for another printhead. Following wiping, reagent cartridge 1279A may be removed from service station 1290 and delivered to printing station 1270 by, for example, robot mechanism 1255 or returned to storage cabinet 1250 from printing station 1270 by, for example, robot mechanism 1260. If reagent cartridge 1279A is to be returned to storage cabinet 1250, the reagent cartridge is initially brought to cap removal and storage station 1295 and reunited with its cap prior to be loaded into storage cabinet 1250.

Robot mechanism 1255 may include a robotic arm that includes end effector 12552 and robot controller 12551 that may control robot motion (e.g., movement of robot mechanism 1255 and necessary end effector 12552 and processing tasks to be performed by robot mechanism 1255). Robot controller 12551 is linked either through hardwiring or wirelessly to processor 136. Machine readable program instructions are transmitted between processor 136 and robot controller 12551 (e.g., from processor 136 to direct robot controller 12551) to perform a desired protocol. Robot controller 12551 may transmit a signal or signals back to processor 136 confirming the instructions and/or after completing an action directed by processor 136. One protocol may be to retrieve a reagent cartridge from service station 1290 or cap removal and storage station 1295 and place that reagent cartridge in a particular open slot in a printer on an ink cartridge rail in printing station 1270 (see FIG. 11 showing printer 1276A connected to and extending forward from ink cartridge rail 1275A). Robot controller 12551 may be provided a location of the reagent cartridge, such as in service station 1290 (at spittoon 12909), or an address of a reagent cartridge in cap removal and storage station 1295 (e.g., row and column information of a cell) and proceed to direct end effector 12552 to that location to retrieve the reagent cartridge. Robot controller 12551 may receive another address in printing station 1270 where the retrieved reagent cartridge is to be placed and subsequently direct end effector 12552 to that address to deposit the retrieved reagent cartridge in a desired printer in printing station 1270. Prior to depositing the retrieved reagent cartridge in a printer in printing station 1270, the protocol may direct that an identifier on the reagent cartridge be read to confirm that it is the desired reagent cartridge for a particular printer. Each reagent cartridge may have an identifier (e.g., a barcode) on a surface thereof (see FIG. 14B and FIG. 14D). Processing assembly may include reader 1299 (e.g., a barcode reader or scanner) positioned near printing station 1270 or near service station 1290 or cap removal and storage station 1295. Reader 1299 may provide the read information to processor 136 and processor 136 may include protocol instructions to confirm that the retrieved reagent cartridge is the desired reagent cartridge. The retrieved reagent cartridge may then be placed in a printer (e.g., printer 1276A in FIG. 11). A location of a reagent cartridge in a printer in printing station 1270 may be stored in a log in memory 137. Such log can later be utilized to verify that a sample on a slide was printed with a particular reagent in a reagent cartridge. Interface 135 may also include a user accessible screen that displays the printers in printing station 1270 and the reagent cartridge(s) in each printer.

Another protocol may be to retrieve a reagent cartridge from a printer and place the retrieved reagent cartridge in a particular slot in storage cabinet 1250. Instructions from processor 136 may direct robot mechanism 1255 to retrieve a reagent cartridge from printing station 1270. The reagent cartridge retrieved from a printer may initially be brought to reader 1299 and reader 1299 may read an identifier thereon and provide that information to processor. Processor 136 may confirm that the reagent cartridge has been correctly retrieved from a printer in printing station 1270. Instructions may then direct robot mechanism 1255 to take the reagent cartridge retrieved from printing station 1270 to service station 1290 for servicing (spitting and wiping). Following servicing, the protocol may direct robot mechanism 1260 to retrieve the reagent cartridge from service station 1290 and bring it to a location (a cell) in cap removal and storage station 1295 where the reagent cartridge may be reunited with its cap based on saved information in memory 137 that associates a cell containing a cap with a reagent cartridge. Once the cap is installed on the reagent cartridge (through a magnetic attraction of the cap to magnets in the reagent cartridge), processor 136 may direct robot mechanism 1260 to place the reagent cartridge in a slot in carousel 1252 of reagent storage cabinet 1250 (see FIG. 16 and FIG. 17). Based on the reagent cartridge identifier, its assigned slot address and its actual slot address, machine-readable instructions in processor 136 may than compare the assigned slot address and the actual address to confirm that a cartridge is in a correct slot. The instructions may include notification of confirmation of a correct slot address or an incorrect slot address (e.g., alarm) at interface 135 to a user of processing assembly 100. Interface may also include a user accessible screen that displays some or all the slots in storage cabinet 1250 and the reagent cartridges in each slot. A location of a reagent cartridge in a slot in reagent storage cabinet 1250 may be stored in a log in memory 137. Such log can later be utilized to verify that a sample on a slide was printed with a particular reagent in a cartridge.

Each reagent cartridge may include a chip that may store information such as an expiration date and a print or operation count. The print or operation count may be used to estimate a volume of reagent in a reagent cartridge. The print operation count may be changed each time a print operation is performed using a reagent cartridge. Referring to FIG. 17, adjacent each slot in storage cabinet 1250 may be a light array 12502 (e.g., red, yellow, green light emitting diodes) that provides an indication of a volume of reagent in a reagent cartridge based on the print or operation count. For example, a chip associated with a reagent cartridge may be electronically connected to a light array adjacent to a slot in storage cabinet when the cartridge is seated in the slot. A reagent cartridge may contain, for example, a volume of reagent suitable for 30 standard print operations (30 jettings). The chip may be programmed to trigger a green light in a RYG array when the count of the print operations performed using the cartridge are zero to 10; yellow when the print operations performed are 11-20; and red when the count of the print operations performed are 21-30. A chip in a reagent cartridge may be read, for example, when a cartridge is in storage cabinet 1250 and provided to processor 136 and the count stored in memory 137. The print count for each reagent cartridge in storage cabinet 1250 may also be provided on a screen on interface 135 by processor 136. Alternatively or additionally, array 12502 may be used to warn of an approaching reagent expiration date (e.g., a red light might be triggered within one month of the expiration).

With regard to printing samples on slides, each slide carrier linear rail in printing station 1270 (e.g., slide carrier linear rail 12725A) is assigned an address based, for example, on a row and column matrix, and the addresses are stored in memory 137. Executable instructions associated with processor 136 include instructions that associate a slide by its identifier with a slide carrier linear rail and store the associated information. Processor 136 may also display the associated slide and slide carrier linear rail on display 135 so that an operator can visualize a printing operation.

Slides may be printed one-by-one utilizing a printer that moves on a slide cartridge rail (e.g., slide cartridge rail 1275A, FIG. 11). A printer (e.g., printer 1276A) may be directed by instructions from processor 136. The instructions moving a slide into a humidor housing and washing a sample on the slide with an aqueous solution (e.g., a buffer). Following washing, excess wash solution may be removed by a gas or air spray in the humidor housing. The processing instructions may then expose a slide from humidor housing (e.g., humidor housing 12729A) and transfer the slide to a printing region for deposition of, for example, a primary antibody or a detection agent.

As described above, images were taken of a sample on a slide to show the location of the sample and/or areas of interest of the sample on the slide. These image(s) may be analyzed by processor 136 for placement of an amount of a reagent (e.g., a primary antibody or a detection agent) on the sample. A location of the sample may be obtained from the image of the sample taken at first slide identification station 1120 or the image of the sample taken at second slide identification station 1121 as described above or both (e.g., comparing one image to another). An image may be analyzed, such as by overlying a grid on the image followed by identifying the sample in the grid by, for example, a stained color of the sample (e.g., the sample stained with eosin in wash tank 1247) or a refractive index change to determine a location of a sample and such analysis may form the basis of a decision where a printhead of a reagent cartridge (e.g., reagent cartridge 1279A) is to print. Once a sample location is established, a sample area on to which a reagent will be applied is determined and instructions associated with processor 136 limit application (jetting) to that sample area. In this manner, reagent application (jetting) may be limited to an area where the sample is present rather a much larger area that would result in a waste of the reagent.

A drop-on-demand-type printhead utilized in the reagent cartridges (e.g., reagent cartridge 1279A) may dispense a reagent, such as a detection agent or antibody, in droplets having a volume of 1 picoliter (pL) to 10 nanoliters (nL), or 1 pL to 5 nL, or 1 pL to 1 nL, or 1 pL to 500 pL, or 1 pL to 250 pL or 1 pL to 100 pL, or 1 pL to 50 pL. The small volume allows for targeted dispensing of a reagent onto identified area(s) of a sample on a slide (identified previously by imaging or other technique). For example, an area of a sample such as a tissue section may be identified that may contain particular antigens in cells. Such antigens may be selectively identified by introducing antibodies in the targeted area by a drop-on-demand technique that bind (e.g., specifically bind) to the particular antigens if present. Visualization of antibody-antigen interaction can be accomplished, for example, by conjugating an enzyme that can catalyze a color-producing reaction or a fluorophore that exhibits a fluorescence when viewed. The enzyme may be dispensed with the antibody or subsequently by a drop-on-demand type printhead. Target dispensing of reagents such as antibodies or enzymes results in a reduction in utilization of the antibody, reagent carryover and associated waste compared to prior art techniques that covered an entire area of a sample on a slide with the reagent.

In one example, a colorant or stain may be added to a reagent to allow a visual indication that the reagent was applied as directed. The colorant or stain may be unique for a particular reagent. For example, a colorant or stain could be added to a primary antibody solution in a reagent cartridge. Following dispensing of the primary antibody solution onto a sample on a slide, the color of the primary antibody solution could be detected and captured and transmitted to memory 137. Each printer in printing station 1270 may contain a sensor that is operable to capture an image of a sample on a slide. FIG. 13 shows printer 1276A having sensor 12761 associated therewith (e.g., positioned between reagent cartridge 1279A and reagent cartridge 1280A). Sensor 12761 is positioned to capture an image of a sample on a slide while the slide lies horizontally on its platen of a slide carrier on a slide carrier linear rail. In another example, rather than having a sensor such as sensor 12761 associated with each printer, a single sensor may capture an image of each sample on slide in all rows, such as a sensor slidably connected to a horizontal rail in front of an open position where a slide and slide platen are exposed (e.g., between robot mechanism 1255 and printing station 1272). The horizontal rail may be slidably connected to a vertical rail so the horizontal rail could move up or down so as to capture images of slides in different platens associated with slide carrier linear rails in horizontal support 12724A-12724E. The vertical rail could be attached to platform 1201. The horizontal and vertical rail is similar to a 90° rotation of rail 1145 and rail 1146. Instructions from processor 136 may direct sensor 12761 to capture an image of a sample on the slide after a reagent has been dispensed on to the sample when slide carrier 12728A is in the open position away from humidor housing 12729A (the open position shown in FIG. 12A). The detection/capture of a reagent actually being applied to a sample (e.g., immediately after application) on a slide provides a quality control that (1) the reagent was applied and (2) the correct reagent was applied (due to its unique color characteristic). Instructions in processor 136 may be executed to evaluate the sample for a colorant or stain known to be added to a reagent (e.g., a primary antibody). If the colorant or stain is not detected, processor 136 may send an alert to display 135 and halt the processing (e.g., additional printing and/or subsequent processing) of the sample on the slide or samples on slides in slide carriers associated with a particular printer to allow evaluation of any potential issue with a particular reagent cartridge or the particular printer.

Following a printing process at printing station, a printed slide may be returned to its respective humidor housing for an incubation time period (to, for example, allow a primary antibody to bind to any targeted antigen). Following any incubation period, the slide may be washed one or more times with an aqueous solution and the rinse fluid removed. The rinse may remove any non-reacted/non-conjugated reagent as well as the colorant or stain that was added to the reagent. If the sample on the slide is to receive an additional reagent(s), the executable instructions from processor 136 may direct exposing the slide from the humidor housing and returning to a printing position under a printer and the printing process repeated. Following each printing operation, the slide may be rinsed as described.

Once all printing operations are finished for a slide, the slide may be removed from slide cartridge rail (e.g., slide cartridge rail 1275A) by robot mechanism 1255. Instructions from processor 136 may direct robot mechanism 1255 to grasp/grip a slide by end effector 12552 and return the slide to slide identification station 1221 (see, for example, FIG. 9). Instructions from processor 136 may direct slide identification station 1221 to scan slide identification information and optionally capture an image of a sample on the slide. In an example where a reagent is colored with, for example, a dye, capturing an image after a printing operation allows an analysis and verification at this point in the operation, that a slide received a desired reagent(s). Accordingly, executable instructions in processor 136 may analyze the sample for a presence of a desired reagent (e.g., based on coloring of a sample).

After a slide has been scanned and optionally imaged and analyzed, the slide may be placed lengthwise in a slide basket such as a slide basket stationed in an area where the slide basket can be retrieved by robot mechanism 1140 (such as area 1200, see FIG. 2). Area 1200 may have two or more slide baskets allowing slides to be sorted following a printing operation. Slides may be sorted according to a case (e.g., a patient) or the type of reagent received during a printing operation. Certain reagents, for example, may not be suitable for subsequent dehydration steps as described below or may be more suitable for a glass coverslip than a film coverslip. Instructions associated with processor 136 include instructions to sort a slide into a particular slide basket based on a sorting preference (e.g., a case, a deposited reagent, etc.).

Once basket 210A is loaded with one or more printed slides from staining module 120, basket 210A is transported from staining module 120 to core module 110. Processor 136 may track (e.g., count) the number of slides that are delivered to staining module 120, removed from a basket, printed and reloaded into a basket. Once it is confirmed that all slides are reloaded into a basket, instructions from processor 136 may direct the slide basket be brought to dehydration station 1130 in core module 110 by robot mechanism 1140. Robot mechanism 1140 may be directed by instructions from, for example, robot controller 1141 that may be linked processor 136. End effector 1142 of robot mechanism 1140 may grasp a slide basket on opposite slides thereof and deposit the slide basket in chamber 1241 or chamber 1243 of antigen retrieval station 1240 when the respective lid is opened.

Figure 30:
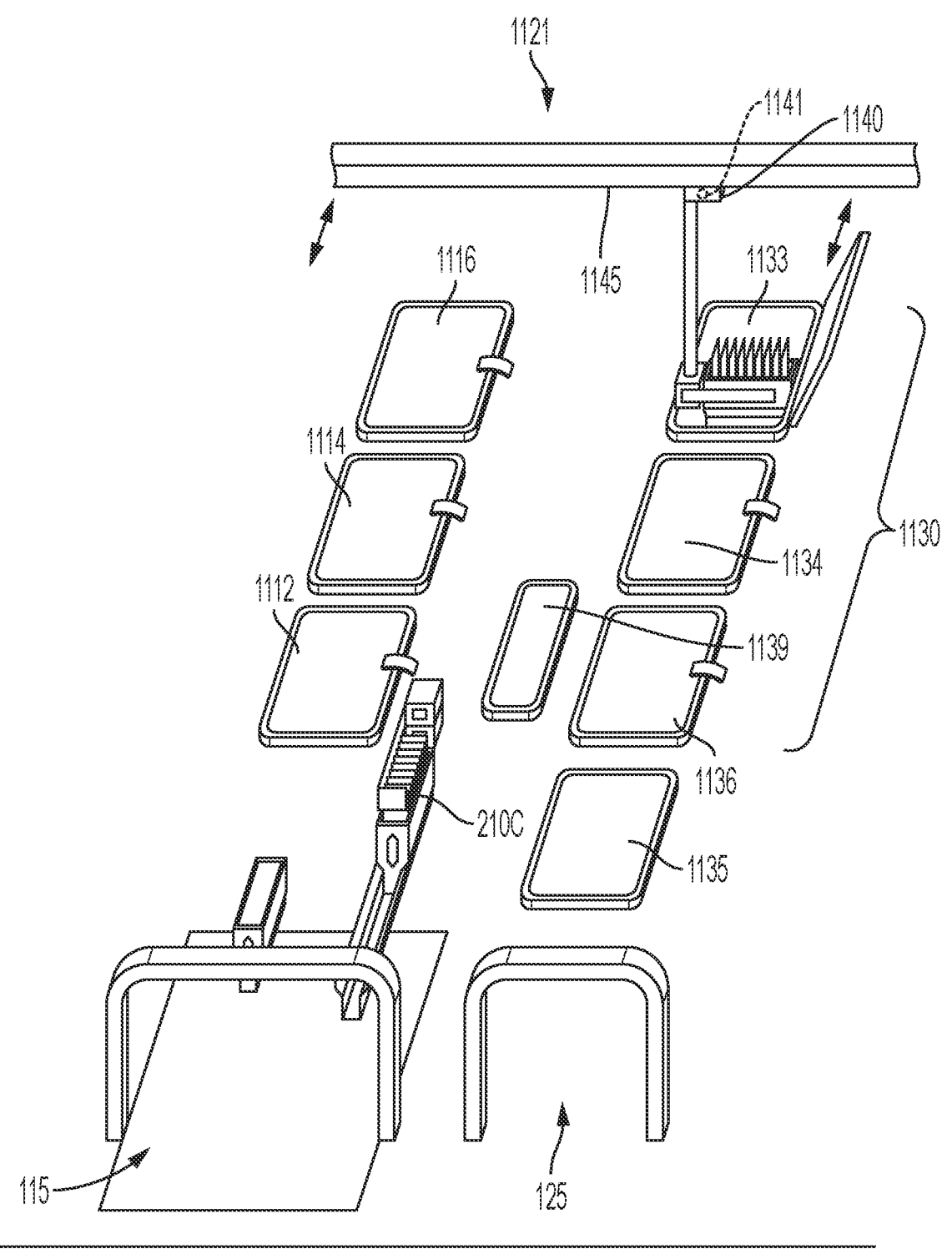
FIG. 30 shows a top front side magnified view of a core module or portion of the processing assembly of FIG. 1 with a top exterior portion of the external housing removed to expose the interior compartment of the module and shows a slide basket that has been brought from the staining module or portion to a dehydration station inside the core module or portion.

FIG. 30 shows a top front side magnified view of core module 110 of processing assembly 100 with a top exterior portion of the external housing removed to expose the interior compartment of the module and with slide basket 210G in core module and engaged by an end effector of robot mechanism 1140. Following a return of the slides in slide basket 210G to core module, the printed slides may be subject to a dehydration process at dehydration station 1130. Dehydration station, in this example, contains multiple tanks each recessed below processing platform 1101. Each tank may have an electrically actuatable lid with its operation directed by executable instructions in processor 136. Each tank may also contain an agitator (e.g., a magnetic stirrer). FIG. 30 shows tank 1133, tank 1134 and tank 1136 each operable to contain a volume of liquid reagent and each having a dimension to receive a slide basket therein (e.g., a TISSUE-TEK PRISMA® slide basket). Each of tank 1133, tank 1134 and tank 1136 may contain a dehydration reagent such as alcohol (e.g., 100 percent ethanol) or xylene. Representatively, tank 1133 contains ethanol, tank 1134 contains ethanol and tank 1136 contains xylene. A dehydration process may involve transferring a slide basket such as slide basket 210G containing one or more printed slides into each of tank 1133, tank 1134 and tank 1136 sequentially.

To begin a dehydration process or protocol at dehydration station 1130, machine readable instructions executed by robot controller 1141 direct robot mechanism 1140 to transfer a slide basket (slide basket 210G) to tank 1133. Robot mechanism 1140 includes robot controller 1141 that may control robot motion (e.g., movement of robot mechanism 1140 on track 1145 and processing tasks to be performed by robot mechanism 1140). Robot controller 1141 is linked either through hardwiring or wirelessly to processor 136. Machine readable program instructions are transmitted between processor 136 and robot controller 1141 (e.g., from processor 136 to direct robot controller 1141) to automatically perform a desired protocol. Robot controller 1141 may transmit a signal or signals back to the processor 136 confirming the instructions and/or after completing an action directed by processor 136. For a dehydration process, a protocol may be to transfer a slide basket (e.g., slide basket 210G) from tank 1133 to tank 1134 and then to tank 1136. Rail 1145 may be positioned at a height sufficient to allow an end effector of robot mechanism 1140 (e.g., two separated arms, forks or blades) to grasp or otherwise engage the slide basket by, for example, grasping opposite sides of the slide basket and take slide basket 210G to dehydration station 1130. The robot mechanism may raise and lower the slide rack into and out of a dehydration tank to increase agitation and speed up the dehydration process. The slide basket may then be raised and then transferred to a subsequent tank. As one example, a slide basket may remain in tank 1133 of 100 percent ethanol for 30 seconds, tank 1134 of 100 percent ethanol for one minute and then tank 1136 of xylene for two minutes. Following the dehydration protocol, the program instructions may direct robot mechanism 1140 to transfer a slide basket to drip platform 1139 on processing platform 1101. From drip platform 1139, the program instructions may further direct that robot mechanism to transfer a slide basket to outlet opening 125 in core module 110.

Certain reagents when printed onto samples on slides may not be compatible with a dehydration process involving alcohol and/or xylene. Examples may include certain chromogen or fluorescent reagents. For samples that have been processed with reagents that may not be compatible with a dehydration process involving alcohol and/or xylene, processor 136 may direct robot mechanism 1140 to transfer a slide basket containing slides with such treated samples to holding tank 1135 in dehydration station 1130. Holding tank 1135 may contain an aqueous buffer solution. Following optional time in holding tank 1135, a slide basket containing slides may be transferred by robot mechanism 1140 to drip platform 1139.

Reagents in tank 1133, tank 1134, tank 1136 and tank 1135 as well as other tanks contained in core module 110 may be connected through plumbing equipment (e.g., conduits and valves) to respective supply tanks and waste tanks below processing platform 1101. Reagents may be periodically replaced based on processing instructions from processor 136 by draining reagent into a waste tank and then filling a drained tank with fresh reagent. A determination of when a reagent in a tank should be replaced may be made by, for example, measuring a density (weight per volume) of a reagent present in the tank and comparing that density to a density of the same reagent in a fresh or unused state or a predetermined acceptable density that might be different than a density of the reagent in a fresh or unused state (e.g., a density of a reagent at a point where the reagent may have been used, but is still acceptable for use in performing the function desired). Each tank in core module 110 and staining module 120 may contain a liquid density monitor that provides a density measurement of a reagent in a respective tank to processor 136. If the difference in density between the measured density and the fresh or predetermined density is beyond a chosen value stored in memory 137, instructions from processor 136 may direct the replacement of the reagent in the tank. Another method for determining when a reagent in a tank should be replaced may be based on a conductivity of a reagent. A concentration of salts in a reagent may change over usage events which may cause a change in a measured conductivity of the reagent. Each tank in core module 110 and staining module 120 may contain a liquid density monitor that provides a density measurement of a reagent in a respective tank to processor 136. If the conductivity is measured beyond a predetermined value stored in memory 137, instructions from processor 136 may direct a replacement of the reagent in the tank. A further method for determining when a reagent in a tank should be replaced may be based on a color of the reagent. Representatively, reagents in a fresh or unused state may have an absorbance value (a starting value) or may be colored with dye to provide a starting value that is stored in memory 137. Instructions from processor 136 may direct that a reagent in a tank be periodically screened for its absorbance. When an absorbance value of a reagent deviates by a predetermined percentage, instructions from processor 136 may direct a replacement of the reagent in the tank. A still further method for determining when a reagent in a tank should be replaced may be through the use of a hydrometer or a device floating in a reagent based on buoyancy. A hydrometer or floating device in a tank may be connected to a sensor in communication with processor 136. As a reagent becomes contaminated, its density or other property may change and the hydrometer or floating device will trigger the sensor or other convey information to processor 136 to trigger a replacement of reagent in the tank. Each of the supply tanks and waste tanks below processing platform 1101 may contain a level sensor in communication with processor 136. A level of the supply tanks and waste tanks may be indicated on a screen of display 135 to allow an operator to view a level. When a supply tank is empty or near empty, processor 136 may send an alert to an operator (e.g., an alert on display 135 or alarm), so that the supply tank may be replaced. Similarly, when a waste tank is full or near full, processor 136 may send an alert to an operator (e.g., an alert on display 135 or alarm), so that the waste tank may be replaced.

Before a slide basket containing processed (stained/printed) slides is discharged through outlet opening 125, a glass or film coverslip may be applied to individual slides (e.g., one or more slides) in the slide basket. Depending on the reagent printed onto a sample on a slide, some slides may be suitable for a glass coverslip while others may be suitable for a film coverslip. FIG. 2 shows glass coverslip station 1230A and film coverslip station 1230B in staining module 120. Representatively, a sample on a slide that was printed with a chromogen or fluorescent reagent may not be compatible with a film coverslip. Based on the processing that a sample on the slides in a slide basket received at printing station 1270, instructions from processor 136 may direct robot mechanism 1140 to transfer that slide basket to glass coverslip station 1230A or film coverslip station 1230B. Representatively, glass coverslip station 1230A may be similar or contain similar features as a Tissue-Tek Film® Glas™ Automated Glass Coverslipper commercially available from Sakura Finetek USA, Inc. Representatively, film coverslip station 1230B may be similar or contain similar features as a Tissue-Tek Film® Coverslipper commercially available from Sakura Finetek USA, Inc. Each of the Tissue-Tek Film® Glas™ Automated Glass Coverslipper and the Tissue-Tek® Automated Coverslipper accept slide baskets and process slides therein individually in an automated process.

Following a dehydration or holding process in dehydration station 1130 and optionally coverslipping in coverslip station 1230A or coverslip station 1230B, instructions from processor 136 may direct robot controller 1140 to transfer a slide basket to outlet opening 125 in core module 110. On processing platform 1101 within outlet opening 125 and a portion of shelf 112 may be conveyor 1103 such as a belt conveyor system. Conveyor 1103 may be similar to conveyor 1102A or conveyor 1102B associated with inlet opening 115 and inlet opening 114, respectively. Instructions from processor 136 may direct robot controller 1140 to place a slide basket on conveyor 1103 and additional instructions may direct conveyor 1103 to carry the slide basket out to shelf 112. Alternatively, operation of conveyor 1103 may be triggered by a sensor that the senses the presence of an object thereon (e.g., a slide basket) and in response causes a belt of the conveyor to move.

Figure 31:
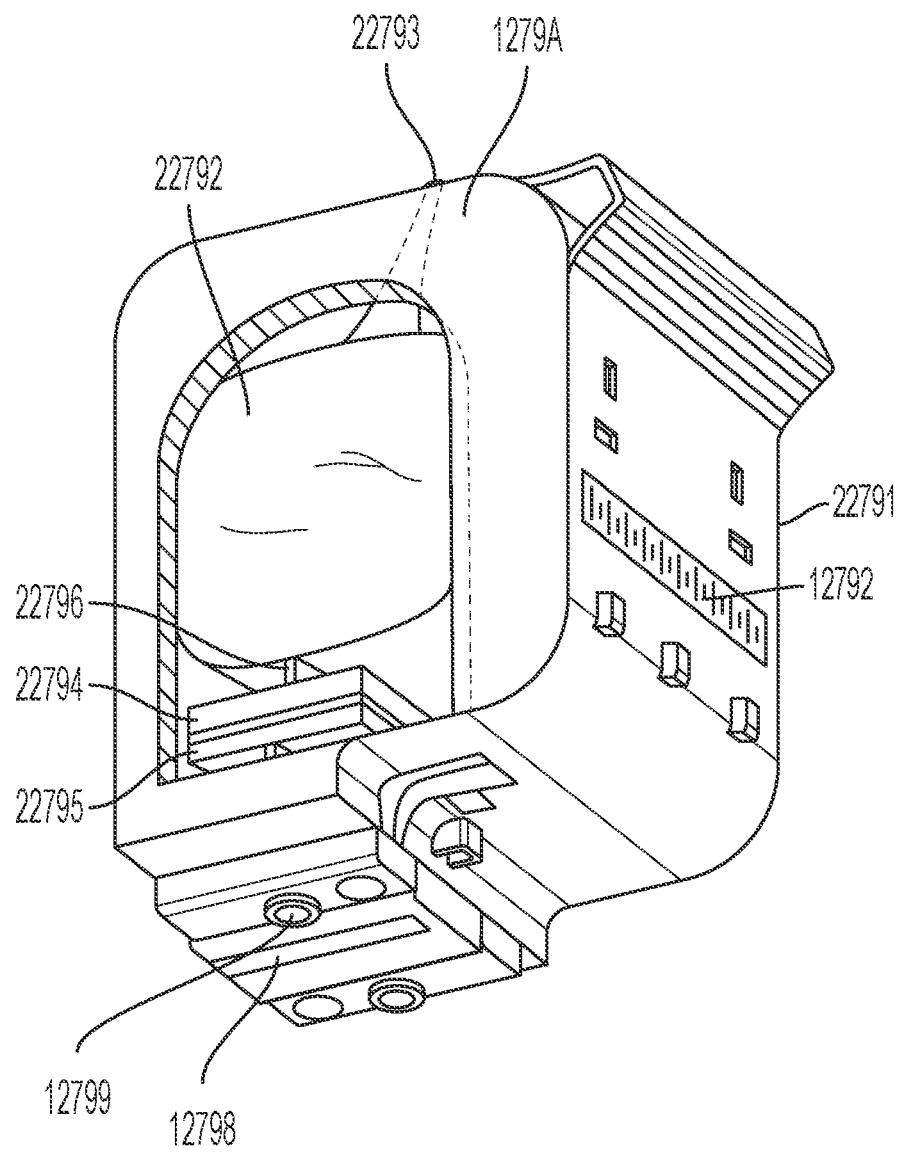
FIG. 31 shows a front side view of a reagent cartridge 1279A that may be used in a printer in the humidor rack assembly of FIG. 11.

FIG. 31 shows a front side view of a reagent cartridge 1279A that may be used in a printer in the humidor rack assembly of FIG. 11. In FIG. 31, a side of reagent cartridge 1279A is cut out to reveal the contents of the cartridges. Reagent cartridge 1279A contains body 22791 of a plastic material. Body 22791 may have identifier 12792 on a side thereof. Identifier 12792 may provide identification information of a reagent in reagent cartridge 1279A as well as expiration and/or other data. Identifier 12792 may be, for example, a barcode, that may be read by a reader in processing assembly 100. Body 22791 defines a container having a volume therein. Disposed in a volume of body 22791 is bag 22792 of a plastic or nonmetal material that may be filled with reagent through spout 22793, also of a plastic material. At outlet 22796 (e.g., a plastic or otherwise non-metal spout) at a base of bag 22792 in a volume of body 22791 is regulator 22794 also of a plastic or a nonmetal material that may serve to regulate a flow of reagent from bag 22792 toward printhead 12798. Also, in a volume of body 22791 between regulator 22794 and printhead 12798 is filter 22795 of a plastic or nonmetal material. Reagent cartridge 1279A offers a contact fluid path for a reagent in bag 22792 with minimal metal exposure. Possible metal sources may be limited to any in the nozzle and resistor of a printhead, but metal sources such as a metal spring often associated with an inkjet cartridge are not present. A non-metal or non-metallic fluid path to at least the printhead avoids issues with reagents that may react with metal (e.g., reagents containing hydrogen peroxide).

The following numbered clauses summarize certain aspects of the invention:

1. A processor assembly comprising:

an exposure station operable to expose a sample on a slide;

a printing station operable to apply a reagent to the exposed sample through a thermal inkjet process; and a robotic transfer mechanism to transfer the slide from the exposure station to the printing station.

2. The processor assembly of clause 1, further comprising:

a processor including non-transitory machine-readable instructions that when executed cause the processor to direct application of a reagent from a reagent cartridge in the printing station onto a portion of the sample on the slide.

3. The processor assembly of clause 2, further comprising:

an imager operable to capture an image of the sample prior to the directed application of the reagent onto the sample and the processor includes non-transitory machine-readable instructions that when executed cause the processor to determine a target location on the sample based on the captured image for application of the reagent from the reagent cartridge.

4. The processor assembly of clause 2 or clause 3, wherein the reagent cartridge is positioned in a printer at the printing station and the processor assembly further comprises a storage station operable to store a plurality of reagent cartridges, wherein prior to directing application of the reagent from the reagent cartridge, the instructions cause the cartridge to be automatically retrieved from the storage station and coupled to the printer.

5. The processor assembly of any of the preceding clauses, wherein the printing station comprises a humidor housing, wherein the processor includes non-transitory machine-readable instructions that when executed cause the slide to be removed from the humidor housing and transferred to the printer.

6. The processor assembly of any of the preceding clauses, wherein the exposure station comprises a first exposure station operable to bake and dewax the sample and a second exposure station operable to expose antigenic sites on the sample utilizing pressure, wherein the processor includes non-transitory machine-readable instructions that when executed cause the slide to be transported to the antigen retrieval station and, after an antigen retrieval process, transported to the printing station.

7. The processor assembly of any of the preceding clauses, further comprising a dehydration station, wherein, after application of a reagent at the printing station, the processor includes non-transitory machine-readable instructions that when executed cause the slide to be transported to the dehydration station.

8. The processor assembly of any of the preceding clauses, wherein the exposure station comprises a baking station and a dewaxing station.

9. The processor assembly of any of the preceding clauses, further comprising an identification station comprising a sensor operable to identify label information on the slide or to identify label information on the slide and capture an image of the sample on the slide.

10. The processor assembly of clause 9, further comprising a sorting station operable to contain a plurality of slide baskets, wherein the processor includes non-transitory machine-readable instructions that when executed cause the slide to be sorted into one of the plurality of slide baskets in the sorting station based on label information on the slide.

11. The processor assembly of clause 10, wherein the instructions cause the slide to be sorted based on a reagent to be applied to the slide.

12. The processor assembly of any of the preceding clauses, wherein in the exposure station, the slide is in a slide basket operable to contain a plurality of slides and the processor assembly further comprises a processor including non-transitory machine-readable instructions that when executed cause the slide to be removed from the basket for a printing operation in the printing station.

13. The processor assembly of any of clauses 3-12, wherein the reagent cartridge is coupled to the printer through magnetic attraction.

14. The processor assembly of any of clauses 4-13, wherein the printing station comprises a plurality of slide platens each of the plurality of slide platens operable to contain a slide thereon and coupled to a respective slide carrier linear rail in a print position such that the printer can apply the reagent to a sample on a slide in each of the plurality of slide platens.

15. The processor assembly of clause 14, wherein the printer is slidably coupled to a rail and the executable instructions in the processor cause the printer to move to individually move to a position to apply the reagent to a sample on a slide in each of the plurality of slide platens.

16. The processor assembly of clause 14 or clause 15, wherein each of the plurality of slide platens is operable to be automatically moved to between the print position and a position comprising a humidor housing.

17. The processor assembly of any of clauses 12-16, wherein the printer is operable to contain a plurality of reagent cartridges and individually discharge reagent from each of the plurality of reagent cartridges.

18. The processor of any of clauses 12-17, further comprising a sensor coupled to the printer, the sensor operable to capture an image of a sample on a slide when a slide platen is in the print position.

19. The processor assembly of any of clauses 2-18, further comprising a service station comprising a spittoon and a wiping ribbon, the wiping ribbon disposed between a feed roller and a take-up roller, wherein one of a printhead of an ink cartridge and the wiping ribbon is operable to move with respect to the other to cause a wiping action across the printhead.

20. A reagent cartridge comprising:
a body defining a container having a volume therein;
a nonmetallic bag in the container operable to contain a reagent; and
a printhead at a base of the body, the printhead coupled to an outlet of the bag.

21. The reagent cartridge of clause 20, further comprising a regulator in the container, the regulator coupled to the outlet of the bag such that the regulator is disposed between the outlet of the bag and the printhead.

22. The reagent cartridge of clause 20 or clause 21, wherein the body comprises a side operable to be coupled to a printer, and the side comprises a material to couple to a printer through a magnetic attraction.

23. The reagent cartridge of any of clause 20-2, wherein a base of the body comprises a material to couple to a cap through a magnetic attraction.

24. The reagent cartridge of clause 23, wherein the base of the body comprises a magnet.

25. A method comprising:
exposing a sample on a slide in a processor assembly;
robotically transferring the slide to a printing station of the processor assembly; and
applying a reagent to the exposed sample at the printing station by a thermal inkjet printing process.

26. The method of clause 25, wherein exposing a sample on a slide comprises placing a basket containing the slide in at least one of a baking station and a dewaxing station.

27. The method of clause 25 or clause 26, wherein exposing comprises exposing antigenic sites of the sample.

28. The method of clause 27, wherein exposing antigenic sites of the sample comprises placing the slide in an antigenic retrieval solution under elevated temperature and pressure.

29. The method of any of clauses 25-28, wherein robotically transferring the slide comprises robotically transferring a basket containing the slide, the basket having a volume to contain a plurality of slides.

30. The method of clause 29, wherein prior to applying the reagent to the exposed sample, the method comprises removing the slide from the basket.

31. The method of clause 30, wherein prior to applying the reagent to the exposed sample, the method comprises placing the slide in a humidor housing.

32. The method of clause 30 or clause 31, wherein prior to and/or after applying the reagent to the exposed sample, the method comprises washing the slide with an aqueous solution.

33. The method of clause 32, wherein after washing the slide with an aqueous solution, the method comprises removing at least some of the washing solution.

34. The method of any of clauses 30-34, wherein after applying reagent to the exposed sample, the method comprises capturing an image of the sample while the slide is in a print position in the printing station.

35. The method of any of clauses 25-34, wherein after applying a reagent to the exposed sample, the method further comprises dehydrating the sample.

36. The method of any of clauses 25-35, wherein prior to robotically transferring the slide to the printing station, the method comprises sensing information from the slide.

37. The method of clause 36, wherein sensing information comprises:
capturing at least one of a first image of a sample on the slide prior to exposing a sample on the slide and capturing a second image of the sample on the slide after exposing the sample on the slide; and
determining a location of at least a portion of the sample based on the first image or the second image or a comparison of the first image and the second image.

38. The method of clause 37, wherein prior to capturing a second image of the sample on the slide, the sample is exposed to a stain.

39. The method of clause 37 or clause 38, wherein applying a reagent comprises selectively applying reagent to the location of the portion of the sample.

40. The method of any of clauses 25-39, wherein prior to applying a reagent to the sample, the method comprises retrieving a reagent cartridge comprising the reagent from a storage station and coupling the reagent container to a printer in the printing station.

41. The method of any of clause 25-40, wherein applying a reagent comprises applying more than one reagent.

42. The method of clause 41, wherein applying a reagent to the exposed sample comprises:
applying a first reagent;
after applying the first reagent, washing the sample on the slide; and
after washing the sample on the slide, applying a second reagent.

43. The method of any of clauses 25-42, wherein after applying a reagent to the exposed sample, sensing information of the sample.

44. The method of clause 43, wherein sensing information comprises sensing identification information and/or sensing an image of the sample on the slide.

45. The method of any of clauses 25-44, wherein prior to exposing a sample on the slide, the method comprises sensing identifying information from a label or label area on the slide and sorting the sample into one of a plurality of slide baskets based on the identifying information.

46. The method any of clauses 25-45, wherein prior to applying a reagent to the exposed sample at the printing station, robotically transferring a reagent cartridge containing the reagent to the printing station from a storage station.

47. The method of clause 46, wherein the reagent cartridge has a cap covering a printhead and prior to transferring the reagent cartridge to the printing station, the method comprises removing the cap.

48. The method of clause 47, wherein removing the cap comprises overcoming a magnetic attraction between the cap and the printhead.

49. The method of any of clause 44-48, further comprising:

robotically transferring the reagent cartridge to a service station prior to and/or after transferring the reagent cartridge to the printing station; and servicing the reagent cartridge at the service station, servicing comprising actuating the discharge of reagent from a printhead of the reagent cartridge and, after actuating the discharge, exposing the printhead to a wiping action with a ribbon.

Algorithms, instructions and displays presented herein with respect to processor 136 and/or the operation of processing assembly 100 are not inherently related to any particular computer or other apparatus. Various general-purpose systems may be used with programs in accordance with the teachings herein or it may prove convenient to construct a more specialized device to perform the described method. In addition, the invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media, optical storage media, flash memory devices or other type of machine-accessible storage media.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. For example, a reagent cartridge as disclosed herein (e.g. reagent cartridge 408) may contain solvent or water instead of a reagent and used for purposes other than, for example, staining a sample on an underlying slide. The specification and drawings are, accordingly, to be regarded in an illustrative rather than a restrictive sense.

What is claimed is:

1. A processor assembly comprising:
an exposure station operable to expose a sample on a slide;

a printing station comprising a printer operable to apply a reagent to the exposed sample through a thermal inkjet process;

a robotic transfer mechanism to transfer the slide from the exposure station to the printing station;

a storage station operable to store a plurality of reagent cartridges; and a processor including non-transitory machine-readable instructions that when executed cause the processor to:

automatically retrieve a reagent cartridge from the storage station and couple the retrieved reagent cartridge to the printer; and direct application of a reagent from the retrieved reagent cartridge onto a portion of the sample on the slide.

2. The processor assembly of claim 1, further comprising:

an imager operable to capture an image of the sample prior to the directed application of the reagent onto the sample and the processor includes non-transitory machine-readable instructions that when executed cause the processor to determine a target location on the sample based on the captured image for application of the reagent from the reagent cartridge.

3. The processor assembly of claim 1, wherein the printing station comprises a humidor housing, wherein the processor includes non-transitory machine-readable instructions that when executed cause the slide to be removed from the humidor housing and transferred to the printer.

4. The processor assembly of claim 1, wherein the exposure station comprises a first exposure station operable to bake and dewax the sample and a second exposure station operable to expose antigenic sites on the sample utilizing pressure, wherein the processor includes non-transitory machine-readable instructions that when executed cause the slide to be transported to the antigen retrieval station and, after an antigen retrieval process, transported to the printing station.

5. The processor assembly of claim 1, further comprising a dehydration station, wherein, after application of a reagent at the printing station, the processor includes non-transitory machine-readable instructions that when executed cause the slide to be transported to the dehydration station.

6. The processor assembly of claim 1, wherein the exposure station comprises a baking station and a dewaxing station.

7. The processor assembly of claim 1, further comprising a service station comprising a spittoon and a wiping ribbon, the wiping ribbon disposed between a feed roller and a take-up roller, wherein one of a printhead of the retrieved ink cartridge and the wiping ribbon is operable to move with respect to the other to cause a wiping action across the printhead.

8. The processor assembly of claim 1, wherein in the exposure station, the slide is in a slide basket operable to contain a plurality of slides and the processor assembly further comprises a processor including non-transitory machine-readable instructions that when executed cause the slide to be removed from the basket for a printing operation in the printing station.

9. The processor assembly of claim 8, wherein the printer is operable to contain a plurality of reagent cartridges and individually discharge reagent from each of the plurality of reagent cartridges.

10. The processor of claim 8, further comprising a sensor coupled to the printer, the sensor operable to capture an image of a sample on a slide when a slide platen is in the print position.

11. The processor assembly of claim 1, wherein the printing station comprises a plurality of slide platens each of the plurality of slide platens operable to contain a slide thereon.

12. The processor assembly of claim 11, wherein the printer is slidably coupled to a rail and the executable instructions in the processor cause the printer to move to individually move to a position to apply the reagent to a sample on a slide in each of the plurality of slide platens.

13. The processor assembly of claim 11, wherein each of the plurality of slide platens is operable to be automatically moved to between the print position and a position comprising a humidor housing.

14. The processor assembly of claim 1, further comprising an identification station comprising a sensor operable to identify label information on the slide or to identify label information on the slide and capture an image of the sample on the slide.

15. The processor assembly of claim 14, further comprising a sorting station operable to contain a plurality of slide baskets, wherein the processor includes non-transitory machine-readable instructions that when executed cause the slide to be sorted into one of the plurality of slide baskets in the sorting station based on label information on the slide.

16. The processor assembly of claim 15, wherein the instructions cause the slide to be sorted based on a reagent to be applied to the slide.

\* \* \* \* \*